US012441997B2

(12) United States Patent
Pi et al.

(10) Patent No.: US 12,441,997 B2
(45) Date of Patent: Oct. 14, 2025

(54) METHOD OF PREPARING SELF-CIRCULARIZED RNA

(71) Applicant: GENSCRIPT USA INC., Redmond, WA (US)

(72) Inventors: Fengmei Pi, Redmond, WA (US); Jarred Rensvold, Redmond, WA (US); Cheng-Hsien Wu, Redmond, WA (US)

(73) Assignee: GENSCRIPT USA INC., Redmond, WA (US)

( * ) Notice: Subject to any disclaimer, the term of this patent is extended or adjusted under 35 U.S.C. 154(b) by 0 days.

(21) Appl. No.: 18/775,784

(22) Filed: Jul. 17, 2024

(65) Prior Publication Data

US 2024/0368589 A1 Nov. 7, 2024

Related U.S. Application Data

(63) Continuation of application No. PCT/US2023/084296, filed on Dec. 15, 2023.

(60) Provisional application No. 63/476,864, filed on Dec. 22, 2022.

(51) Int. Cl.
| | | |
|---|---|---|
| C12N 15/113 | (2010.01) | |
| C12N 15/11 | (2006.01) | |
| C12N 15/66 | (2006.01) | |
| C12N 15/85 | (2006.01) | |

(52) U.S. Cl.
CPC ............ *C12N 15/111* (2013.01); *C12N 15/66* (2013.01); *C12N 15/85* (2013.01); *C12N 2310/532* (2013.01); *C12N 2840/203* (2013.01)

(58) Field of Classification Search
CPC .... C12N 15/113; C12N 15/102; C12N 15/63; C12N 2310/20; C12N 15/111; C12N 15/66; C12N 2310/532; C12N 2840/203; C12N 2310/124; C12N 15/67; C12N 15/64; C12P 19/34
See application file for complete search history.

(56) References Cited

U.S. PATENT DOCUMENTS

| | | |
|---|---|---|
| 6,030,830 A | 2/2000 | Saxon |
| 9,297,013 B2 | 3/2016 | Guo |
| 9,732,337 B2 | 8/2017 | Shapiro |
| 9,822,378 B2 | 11/2017 | Kruse |
| 10,584,144 B2 | 3/2020 | Guo et al. |
| 10,590,417 B2 | 3/2020 | Guo et al. |
| 10,900,035 B2 | 1/2021 | Hill |
| 11,203,767 B2 | 12/2021 | Anderson |
| 11,352,641 B2 | 6/2022 | Anderson |
| 11,447,796 B2 | 9/2022 | Anderson et al. |
| 2011/0033706 A1 | 2/2011 | Krishnan |
| 2019/0330633 A1 | 10/2019 | Yen |
| 2019/0345503 A1 | 11/2019 | Chang |
| 2021/0198688 A1 | 7/2021 | Anderson et al. |
| 2021/0277393 A1 | 9/2021 | Livia |
| 2022/0010299 A1 | 1/2022 | Das |
| 2022/0047728 A1 | 2/2022 | Guo et al. |
| 2022/0177540 A1 | 6/2022 | Wesselhoeft |
| 2022/0184230 A1* | 6/2022 | Getts ................... C12N 9/1276 |
| 2022/0251578 A1 | 8/2022 | Chang |
| 2022/0288176 A1 | 9/2022 | Chang |

FOREIGN PATENT DOCUMENTS

| | | |
|---|---|---|
| WO | 2019134791 A1 | 7/2019 |
| WO | 2021236855 A1 | 11/2021 |
| WO | 2022191642 A1 | 9/2022 |

OTHER PUBLICATIONS

International Search Report and Written Opinion issued in International Application No. PCT/US23/84296 (Apr. 15, 2024).
De Hoon, et al., "Prediction of Transcriptional Terminators in Bacillus subtills and Related Species," PLoS Computation Biology, vol. 1, No. 3, pp. 212-221 (Sep. 12, 2005).
Wesselhoeft, "Engineering circular RNA for potent and stable translation in eukaryotic cells," Nature Communications, vol. 9, article 2629 (Jul. 6, 2018).
Shu, et al., "Stable RNA nanoparticles as potential new generation drugs for cancer therapy," Advanced Drug Delivery Reviews, 66, 74-89 (2014).
Staple, et al., "Pseudoknots: RNA Structures with Diverse Functions," PLoS Biology, vol. 3, No. 6, pp. 956-959 (Jun. 2005).
Binzel, et al., "Mechanism of three-component collision to produce ultrastable pRNA three-way junction of Phi29 DNA-packaging motor by kinetic assessment," RNA. 22(11): 1710-1718 (Nov. 2016).
Shu, et al., "Thermodynamically stable RNA three-way junction for constructing multifunctional nanoparticles for delivery of therapeutics," Nature Nanotechnology vol. 6, pp. 658-667 (2011).

(Continued)

*Primary Examiner* — J. E. Angell
(74) *Attorney, Agent, or Firm* — McBee Moore & Vanik IP, LLC

(57) ABSTRACT

A method of preparing a circular RNA includes transcribing a vector to form a precursor RNA, in which the vector includes the following elements operably connected to each other and arranged in the following sequence: a) a 5' element, b) a 3' Group I self-splicing intron fragment containing a 3' splice site dinucleotide, c) none or an element containing an internal ribosome entry site (IRES) and a protein coding region or an element containing a noncoding region, d) a 5' Group I self-splicing intron fragment containing a 5' splice site dinucleotide, and e) a 3' element, in which 5' element and 3' element form a stable structure with a Gibbs free energy (ΔG) from −190 kcal/mol to −9.0 kcal/mol, provided that the stable structure is not a duplex with at least 95% base pairing between the 5' element and 3' element, in which 3' Group I self-splicing intron fragment and 5' Group I self-splicing intron fragment form a self-cleaving and self-ligating RNA molecule, thereby generating circular RNA.

25 Claims, 29 Drawing Sheets

Specification includes a Sequence Listing.

(56) References Cited

OTHER PUBLICATIONS

Zhang, et al., Crystal structure of 3WJ core revealing divalent ion-promoted thermostability and assembly of the Phi29 hexameric motor pRNA, RNA. 9(9):1226-37 (Sep. 2013).

Chen, et al., "Circular RNA: Biosynthesis in vitro," Frontiers in Bioengineering and Biotechnology, vol. 9, pp. 1-11 Nov. 30, 2021.

Chen, et al., "Engineering circular RNA for enhanced protein production," Nat Biotechnol 41, 262-272 2023.

Dasgupta, et al., "The hammerhead self-cleaving motif as a precursor to complex endonucleolytic ribozymes," RNA, 27:1017-1024 2021.

Holdt, et al., "Circular RNAs as Therapeutic Agents and Targets," Front. Physiol., Mini Review, vol. 9, Article 1262 Oct. 9, 2018.

Liu, et al., "Advancements in 3WJ-based RNA nanotechnology and its application for cancer diagnosis and therapy," Front. Biosci. (Landmark Ed) ; 27(2): 061 Feb. 14, 2022.

Muller, et al., "In vitro circularization of RNA," RNA Biology, vol. 14, No. 8, pp. 1018-1027 2017.

Qi, et al.," Engineering circular RNA regulators to specifically promote circular RNA production," Theranostics, vol. 11, issue 15, pp. 7322-7336 May 24, 2021.

Santer, et al., "Circular RNAs: A Novel Class of Functional RNA Molecules with a Therapeutic Perspective," Molecular Therapy, vol. 27, No. 8, pp. 1350-1363 Aug. 2019.

Zhou, et al., "Circular RNA: metabolism, functions and interactions with proteins," Molecular Cancer, vol. 19:172 (19 p) 2020.

Chen, et al., "Mg2+ Ions Regulating 3WJ-PRNA to Construct Controllable RNA Nanoparticle Drug Delivery Platforms," Pharmaceutics, 14, 1413 (10 p.) Jul. 6, 2022.

Schmidt, CA, et al., "A method for expressing and imaging abundant, stable, circular RNAs in vivo using tRNA splicing." Methods in enzymology, vol. 572, pp. 215-236. Academic Press, 2016.

Zhong, et al., "How RNA catalyzes cyclization." Nature Chemical Biology, vol. 11, No. 11, pp. 830-831, 2015.

Zhang, Yi, Jun Wang, and Yi Xiao. "3dRNA: 3D structure prediction from linear to circular RNAs." Journal of Molecular Biology (2022): 167452.

Cervera A, de la Peña M. Small circRNAs with self-cleaving ribozymes are highly expressed in diverse metazoan transcriptomes. Nucleic Acids Res. May 21, 2020;48(9):5054-5064. doi: 10.1093/nar/gkaa187. PMID: 32198887; PMCID: PMC7229834.

de la Peña, Marcos, Raquel Ceprian, John L. Casey, and Amelia Cervera. "Hepatitis delta virus-like circular RNAs from diverse metazoans encode conserved hammerhead ribozymes." Virus evolution 7, No. 1 (2021): veab016.

Binzel, Daniel W., Emil F. Khisamutdinov, and Peixuan Guo. "Entropy-driven one-step formation of Phi29 pRNA 3WJ from three RNA fragments." Biochemistry 53, No. 14 (2014): 2221-2231.

Khisamutdinov, EF, et al., "Enhancing immunomodulation on innate immunity by shape transition among RNA triangle, square and pentagon nanovehicles", Nucleic Acids Research, vol. 42, No. 15, pp. 9996-100004 (2014). doi:10.1093/nar/gku516.

\* cited by examiner

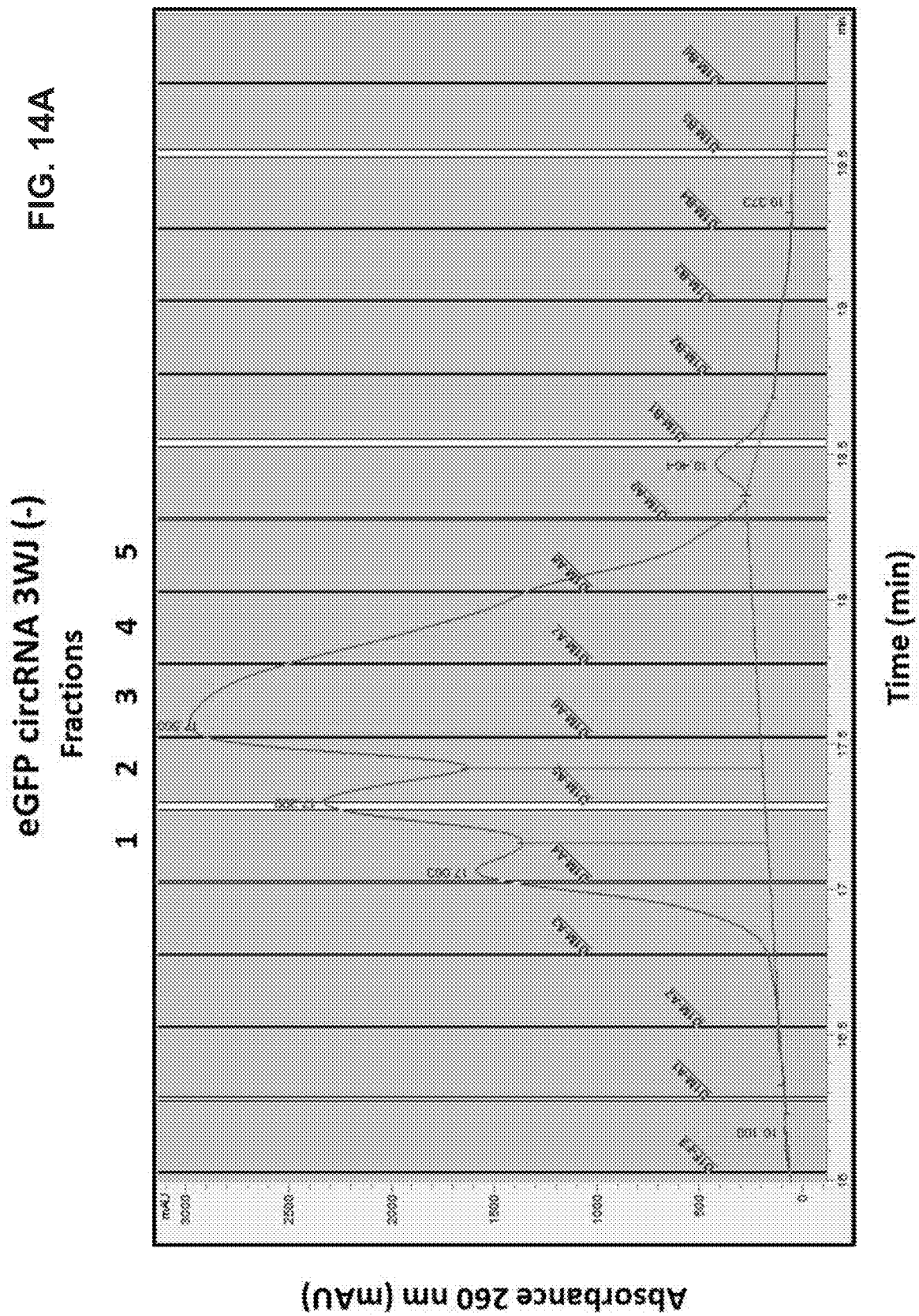

METHOD OF PREPARING SELF-CIRCULARIZED RNA

REFERENCE TO RELATED APPLICATIONS

The present application is a continuation application of an International (PCT) Application PCT/US2023/084296, filed on Dec. 15, 2023 claiming priority to U.S. Provisional Patent Application No. 63/476,864, filed on Dec. 22, 2022, the entire contents of which are hereby incorporated by reference for all purposes.

REFERENCE TO SEQUENCE LISTING SUBMITTED AS A COMPLIANT ASCII TEXT FILE (.xml)

Pursuant to the EFS-Web legal framework and 37 C.F.R. § 1.821-825 (see M.P.E.P. § 2442.03 (a)), a Sequence Listing in the form of an ASCII-compliant text file (entitled "3000076-009001 Substitute Sequence Listing ST26.xml" created on May 9, 2025, and 114,927 bytes in size) is submitted concurrently with the instant application, and the entire contents of the Sequence Listing are incorporated herein by reference.

BACKGROUND

Messenger RNA (mRNA) has broad potential for a range of therapeutic and engineering applications. One fundamental limitation to its use may be its relatively short half-life in biological systems. Thus, there is a need to extend the duration of protein expression from full-length RNA messages.

BRIEF SUMMARY

In one aspect, the present disclosure relates to method of preparing a circular RNA, including: transcribing a vector to form a precursor RNA, in which the vector comprises the following elements operably connected to each other and arranged in the following sequence: a) a 5' element comprising none or at least one stem-loop structure, b) a 3' Group I self-splicing intron fragment containing a 3' splice site dinucleotide, c) none or an element containing an internal ribosome entry site (IRES) and a protein coding region or an element containing a noncoding region, d) a 5' Group I self-splicing intron fragment containing a 5' splice site dinucleotide, e) a 3' element comprising none or at least one stem-loop structure; provided that, when the 5' element does not comprise a stem-loop structure, then the 3' element comprises at least one stem-loop structure; and, when the 3' element does not comprise a stem-loop structure, then the 5' element comprises at least one stem-loop structure, in which the 5' element and the 3' element form a thermodynamically stable multiple way junction RNA structure, in which the precursor RNA is capable of forming a circular RNA that is translatable and/or biologically active inside a cell.

In another aspect, thermodynamically stable multiple way junction RNA structure may be a 3-way junction (3WJ), a 4-way junction (4WJ), a 5-way junction (5WJ), hand in hand interaction, kissing loops, or pseudo knots. In hand in hand interaction structure, one loop sequence may have high affinity with another loop sequence to form a closed interacted dimer structure (Shu et al., "Stable RNA nanoparticles as potential new generation drugs for cancer therapy." Advanced drug delivery reviews. 66 (2014) 74-89; the content of which is hereby incorporated by reference in its entirety). Pseudoknot structure may contain at least two stem-loop structures, in which half of one stem may be interacted between the two halves of another stem (Staple et al., "Pseudoknots: RNA structures with diverse functions." PLOSBio 3 (6):e213; the content of which is hereby incorporated by reference in its entirety).

In another aspect, 3WJ may include a first branch of the 3WJ domain that may be formed from a 5' portion of the 3WJa sequence and a 3' portion of the 3WJc sequence and may include a first helical region, a second branch of the 3WJ domain may be formed from a 3' portion of the 3WJa sequence and a 5' portion of the 3WJb sequence and may include a second helical region, and a third branch of the 3WJ domain may be formed from a 3' portion of the 3WJb sequence and a 5' portion of the 3WJc sequence and may include a third helical region, in which each of said helical regions may include a plurality of RNA nucleotide pairs that form canonical Watson-Crick bonds.

In another aspect, 3WJa, 3WJb, and 3WJc sequences may be as follows:

the 3WJa comprises or consists of SEQ ID NO: 1, 3WJb comprises or consists of SEQ ID NO: 2, and 3WJc comprises or consists of SEQ ID NO: 3; or the 3WJa comprises or consists of SEQ ID NO: 4, 3WJb comprises or consists of SEQ ID NO: 5, and 3WJc comprises or consists of SEQ ID NO: 6; or the 3WJa comprises or consists of SEQ ID NO: 10, 3WJb comprises or consists of SEQ ID NO: 11, and 3WJc comprises or consists of SEQ ID NO: 12; or the 3WJa comprises or consists of SEQ ID NO: 13, 3WJb comprises or consists of SEQ ID NO: 2, and 3WJc comprises or consists of SEQ ID NO: 13; or the 3WJa comprises or consists of SEQ ID NO: 13, 3WJb comprises or consists of SEQ ID NO: 14, and 3WJc comprises or consists of SEQ ID NO: 3; or the 3WJa comprises or consists of SEQ ID NO: 13, 3WJb comprises or consists of SEQ ID NO: 15, and 3WJc comprises or consists of SEQ ID NO: 3; or the 3WJa comprises or consists of SEQ ID NO: 13, 3WJb comprises or consists of SEQ ID NO: 16, and 3WJc comprises or consists of SEQ ID NO: 3; or the 3WJa comprises or consists of SEQ ID NO: 1, 3WJb comprises or consists of SEQ ID NO: 14, and 3WJc comprises or consists of SEQ ID NO: 3; or the 3WJa comprises or consists of SEQ ID NO: 1, 3WJb comprises or consists of SEQ ID NO: 15, and 3WJc comprises or consists of SEQ ID NO: 3; or the 3WJa comprises or consists of SEQ ID NO: 1, 3WJb comprises or consists of SEQ ID NO: 16, and 3WJc comprises or consists of SEQ ID NO: 3; or the 3WJa comprises or consists of SEQ ID NO: 17, 3WJb comprises or consists of SEQ ID NO: 15, and 3WJc comprises or consists of SEQ ID NO: 18; or the 3WJa comprises or consists of SEQ ID NO: 19, 3WJb comprises or consists of SEQ ID NO: 20, and 3WJc comprises or consists of SEQ ID NO: 18; or the 3WJa comprises or consists of SEQ ID NO: 19, 3WJb comprises or consists of SEQ ID NO: 21, and 3WJc comprises or consists of SEQ ID NO: 22; or the 3WJa comprises or consists of SEQ ID NO: 23, 3WJb comprises or consists of SEQ ID NO: 21, and 3WJc comprises or consists of SEQ ID NO: 24; or the 3WJa comprises or consists of SEQ ID NO: 25, 3WJb comprises or consists of SEQ ID NO: 26, and 3WJc comprises or consists of SEQ ID NO: 24; or the 3WJa comprises or consists of SEQ ID NO: 25, 3WJb
comprises or consists of SEQ ID NO: 27, and 3WJc
comprises or consists of SEQ ID NO: 28; or
the 3WJa comprises or consists of SEQ ID NO: 29, 3WJb
comprises or consists of SEQ ID NO: 27, and 3WJc
comprises or consists of SEQ ID NO: 30; or
the 3WJa comprises or consists of SEQ ID NO: 31, 3WJb
comprises or consists of SEQ ID NO: 32, and 3WJc
comprises or consists of SEQ ID NO: 30; or
the 3WJa comprises or consists of SEQ ID NO: 31, 3WJb
comprises or consists of SEQ ID NO: 33, and 3WJc
comprises or consists of SEQ ID NO: 34; or
the 3WJa comprises or consists of SEQ ID NO: 41, 3WJb
comprises or consists of SEQ ID NO: 11, and 3WJc
comprises or consists of SEQ ID NO: 42; or
the 3WJa comprises or consists of SEQ ID NO: 43, 3WJb
comprises or consists of SEQ ID NO: 44, and 3WJc
comprises or consists of SEQ ID NO: 42; or
the 3WJa comprises or consists of SEQ ID NO: 43, 3WJb
comprises or consists of SEQ ID NO: 45, and 3WJc
comprises or consists of SEQ ID NO: 46; or
the 3WJa comprises or consists of SEQ ID NO: 47, 3WJb
comprises or consists of SEQ ID NO: 45, and 3WJc
comprises or consists of SEQ ID NO: 48; or
the 3WJa comprises or consists of SEQ ID NO: 49, 3WJb
comprises or consists of SEQ ID NO: 50, and 3WJc
comprises or consists of SEQ ID NO: 48; or
the 3WJa comprises or consists of SEQ ID NO: 49, 3WJb
comprises or consists of SEQ ID NO: 51, and 3WJc
comprises or consists of SEQ ID NO: 52; or
the 3WJa comprises or consists of SEQ ID NO: 53, 3WJb
comprises or consists of SEQ ID NO: 51, and 3WJc
comprises or consists of SEQ ID NO: 54; or
the 3WJa comprises or consists of SEQ ID NO: 55, 3WJb
comprises or consists of SEQ ID NO: 56, and 3WJc
comprises or consists of SEQ ID NO: 54; or
the 3WJa comprises or consists of SEQ ID NO: 55, 3WJb
comprises or consists of SEQ ID NO: 57, and 3WJc
comprises or consists of SEQ ID NO: 58; or
the 3WJa comprises or consists of SEQ ID NO: 59, 3WJb
comprises or consists of SEQ ID NO: 57, and 3WJc
comprises or consists of SEQ ID NO: 60; or
the 3WJa comprises or consists of SEQ ID NO: 61, 3WJb
comprises or consists of SEQ ID NO: 63, and 3WJc
comprises or consists of SEQ ID NO: 64; or
the 3WJa comprises or consists of SEQ ID NO: 65, 3WJb
comprises or consists of SEQ ID NO: 66, and 3WJc
comprises or consists of SEQ ID NO: 64; or
the 3WJa comprises or consists of SEQ ID NO: 65, 3WJb
comprises or consists of UGUCACGGG, and 3WJc
comprises or consists of SEQ ID NO: 68; or
the 3WJa comprises or consists of SEQ ID NO: 43, 3WJb
comprises or consists of SEQ ID NO: 69, and 3WJc
comprises or consists of SEQ ID NO: 46; or
the 3WJa comprises or consists of SEQ ID NO: 47, 3WJb
comprises or consists of SEQ ID NO: 70, and 3WJc
comprises or consists of SEQ ID NO: 52; or
the 3WJa comprises or consists of SEQ ID NO: 55, 3WJb
comprises or consists of SEQ ID NO: 71, and 3WJc
comprises or consists of SEQ ID NO: 72; or
the 3WJa comprises or consists of SEQ ID NO: 76, 3WJb
comprises or consists of SEQ ID NO: 8, and 3WJc
comprises or consists of SEQ ID NO: 9; or
the 3WJa comprises or consists of SEQ ID NO: 77, 3WJb
comprises or consists of SEQ ID NO: 78, and 3WJc
comprises or consists of SEQ ID NO: 79; or
the 3WJa comprises or consists of SEQ ID NO: 80, 3WJb
comprises or consists of SEQ ID NO: 81, and 3WJc
comprises or consists of SEQ ID NO: 82; or
the 3WJa comprises or consists of SEQ ID NO: 83, 3WJb
comprises or consists of SEQ ID NO: 84, and 3WJc
comprises or consists of SEQ ID NO: 85; or
the 3WJa comprises or consists of SEQ ID NO: 7, 3WJb
comprises or consists of SEQ ID NO: 89, and 3WJc
comprises or consists of SEQ ID NO: 9; or
the 3WJa comprises or consists of SEQ ID NO: 90, 3WJb
comprises or consists of SEQ ID NO: 91, and 3WJc
comprises or consists of SEQ ID NO: 79; or
the 3WJa comprises or consists of SEQ ID NO: 76, 3WJb
comprises or consists of SEQ ID NO: 89, and 3WJc
comprises or consists of SEQ ID NO: 9; or
the 3WJa comprises or consists of SEQ ID NO: 77, 3WJb
comprises or consists of SEQ ID NO: 91, and 3WJc
comprises or consists of SEQ ID NO: 79; or
the 3WJa comprises or consists of SEQ ID NO: 80, 3WJb
comprises or consists of SEQ ID NO: 93, and 3WJc
comprises or consists of SEQ ID NO: 82; or
the 3WJa comprises or consists of SEQ ID NO: 83, 3WJb
comprises or consists of SEQ ID NO: 95, and 3WJc
comprises or consists of SEQ ID NO: 85; or
the 3WJa comprises or consists of SEQ ID NO: 112,
3WJb comprises or consists of SEQ ID NO: 113, and
3WJc comprises or consists of SEQ ID NO: 114; or
the 3WJa comprises or consists of SEQ ID NO: 119,
3WJb comprises or consists of SEQ ID NO: 120, and
3WJc comprises or consists of SEQ ID NO: 121; or
the 3WJa comprises AUGUGUA, 3WJb comprises UAC-
UUUG, and 3WJc comprises AUCAUG; or
the 3WJa comprises GCGUU, 3WJb comprises UUCGC,
and 3WJc comprises GCCAUAGCG; or
the 3WJa comprises GUAUGGCAC, 3WJb comprises
GUCACGG, and 3WJc comprises CUCUUAC; or
the 3WJa comprises AUGGUA, 3WJb comprises
ACUUUGU, and 3WJc comprises AUCA; or
the 3WJa comprises UGGU, 3WJb comprises ACUUGU,
and 3WJc comprises AUCA; or
the 3WJa comprises UGGU, 3WJb comprises ACUGU,
and 3WJc comprises AUCA; or
the 3WJa comprises UGGU, 3WJb comprises ACGUU,
and 3WJc comprises AAUCA; or
the 3WJa comprises UGUGU, 3WJb comprises
ACUUGU, and 3WJc comprises AUCA; or
the 3WJa comprises UGUGU, 3WJb comprises ACUGU,
and 3WJc comprises AUCA; or
the 3WJa comprises UGUGU, 3WJb comprises ACGUU,
and 3WJc comprises AAUCA; or
the 3WJa comprises UGGU, 3WJb comprises ACUGU,
and 3WJc comprises AUCA; or
the 3WJa comprises UAUGGCAC, 3WJb comprises
GUCACGG, and 3WJc comprises CUCUUA; or
the 3WJa comprises UAUGG, 3WJb comprises
UCACGG, and 3WJc comprises CCUCUUA; or
the 3WJa comprises UAUGGCAC, 3WJb comprises
GUCACGG, and 3WJc comprises CUCUUA; or
the 3WJa comprises UAUG, 3WJb comprises CAGGGG,
and 3WJc comprises CUUG; or
the 3WJa comprises UAUGU, 3WJb comprises GCAGG,
and 3WJc comprises UCUUG; or
the 3WJa comprises UAUGU, 3WJb comprises
GCAGGG, and 3WJc comprises CUUG; or
the 3WJa comprises UAUGU, 3WJb comprises GCAGG,
and 3WJc comprises UCUUG; or the 3WJa comprises UGUGU, 3WJb comprises ACUUUGU, and 3WJc comprises AUCA; or the 3WJa comprises UGUGU, 3WJb comprises ACUUU, and 3WJc comprises AAAUCA.

In another aspect, 4WJ may include a first branch of the 4WJ domain that may be formed from a 5' portion of the 4WJa sequence and a 3' portion of the 4WJd sequence and may include a first helical region, a second branch of the 4WJ domain may be formed from a 3' portion of the 4WJa sequence and a 5' portion of the 4WJb sequence and may include a second helical region, and a third branch of the 4WJ domain may be formed from a 3' portion of the 4WJb sequence and a 5' portion of the 4WJc sequence and may include a third helical region, and a fourth branch of the 4WJ domain may be formed from a 3' portion of the 4WJc sequence and a 5' portion of the 4WJd sequence and may include a fourth helical region, in which each of said helical regions may include a plurality of RNA nucleotide pairs that form canonical Watson-Crick bonds.

In another aspect, 4WJa, 4WJb, 4WJc, and 4WJd sequences may be as follows:

the 4WJa comprises or consists of SEQ ID NO: 7, 4WJb comprises or consists of SEQ ID NO: 8, 4WJc comprises or consists of SEQ ID NO: 9, and 4WJd comprises or consists of SEQ ID NO: 102; or the 4WJa comprises or consists of SEQ ID NO: 103, 4WJb comprises or consists of SEQ ID NO: 104, 4WJc comprises or consists of SEQ ID NO: 105, and 4WJd comprises or consists of SEQ ID NO: 106; or the 4WJa comprises or consists of SEQ ID NO: 115, 4WJb comprises or consists of SEQ ID NO: 116, 4WJc comprises or consists of SEQ ID NO: 117, and 4WJd comprises or consists of SEQ ID NO: 118; or the 4WJa comprises UGCAGGUG, 4WJb comprises ACGGGC, 4WJc comprises CCAGCA, and 4WJd comprises SEQ ID NO: 67; or the 4WJa comprises SEQ ID NO: 74, 4WJb comprises AACUG, 4WJc comprises SEQ ID NO: 75, and 4WJd comprises AUCAUG; or the 4WJa comprises SEQ ID NO: 122, 4WJb comprises GAACU, 4WJc comprises SEQ ID NO: 123, and 4WJd comprises AAUCA.

In another aspect, 5WJ may include a first branch of the 5WJ domain that may be formed from a 5' portion of the 5WJa sequence and a 3' portion of the 5WJe sequence and may include a first helical region, a second branch of the 5WJ domain may be formed from a 3' portion of the 5WJa sequence and a 5' portion of the 5WJb sequence and may include a second helical region, a third branch of the 5WJ domain may be formed from a 3' portion of the 5WJb sequence and a 5' portion of the 5WJc sequence and may include a third helical region, a fourth branch of the 5WJ domain may be formed from a 3' portion of the 5WJc sequence and a 5' portion of the 5WJd sequence and may include a fourth helical region, and a fifth branch of the 5WJ domain may be formed from a 3' portion of the 5WJd sequence and a 5' portion of the 5WJe sequence and may include a fifth helical region, in which each of said helical regions may include a plurality of RNA nucleotide pairs that form canonical Watson-Crick bonds.

In another aspect, 5WJa comprises or consists of SEQ ID NO: 107, 5WJb comprises or consists of SEQ ID NO: 108, 5WJc comprises or consists of SEQ ID NO: 109, 5WJd comprises or consists of SEQ ID NO: 110, and 5WJe comprises or consists of SEQ ID NO: 111; or the 5WJa comprises GUGA, the 5WJb comprises UUGC, the 5WJc comprises GUGU, the 5WJd comprises AUGC, and the 5WJe comprises GUGC.

In another aspect, vector may further include an internal ribosome entry site (IRES) located at the 5' end of c), in which the IRES may be selected from an IRES sequence from a virus or a gene selected from the group consisting of: Taura syndrome virus, *Triatoma* virus, Theiler's encephalomyelitis virus, simian Virus 40, *Solenopsis invicta* virus 1, *Rhopalosiphum padi* virus, Reticuloendotheliosis virus, fuman poliovirus 1, *Plautia* stall intestine virus, Kashmir bee virus, Human rhinovirus 2, Homalodisca coagulata virus-1, Human Immunodeficiency Virus type 1, Homalodisca coagulata virus-1, Himetobi P virus, Hepatitis C virus, Hepatitis A virus, Hepatitis GB virus, foot and mouth disease virus, Human enterovirus 71, Equine rhinitis virus, *Ectropis obliqua* picoma-like virus, Encephalomyocarditis virus (EMCV), *Drosophila* C Virus, Crucifer tobamo virus, Cricket paralysis virus, Bovine viral diarrhea virus 1, Black Queen Cell Virus, Aphid lethal paralysis virus, Avian encephalomyelitis virus, Acute bee paralysis virus, Hibiscus chlorotic ringspot virus, Classical swine fever virus, Human fibroblast growth factor 2 (FGF2), Human surfactant protein A1 (SFTPA1), Human acute myeloid leukemia protein 1/runt-related transcription factor 1 (AML1/RUNX1), *Drosophila* antennapedia, Human aquaporin-4 (AQP4), Human type-1 angiotensin II receptor (AT1R), Human BCL2 associated athanogene 1 (BAG-1), Human B-cell lymphoma 2 (BCL2), Human binding immunoglobulin protein (BiP), Human inhibitor of apoptosis family protein 1 (c-IAP1), Human c-myc, Human eukaryotic translation initiation factor 4 G (eIF4G), Mouse N-deacetylase and N-sulfotransferase 4 (NDST4L), Human lymphoid enhancer-binding factor-1 (LEF1), Mouse hypoxia inducible factor 1 subunit alpha (HIF1 alpha), Human N-myc, Mouse glial and testis-specific homeobox protein (Gtx), Human cyclin-dependent kinase inhibitor 1B (p27kip1), Human platelet-derived growth factor B/human homolog of the simian sarcoma virus (PDGF2/c-sis), Human p53, Human Proviral integration site for Moloney murine leukemia virus-1 (Pim-1), Mouse RNA-binding protein 3 (Rbm3), *Drosophila* reaper, Canine Scamper, *Drosophila* Ultrabithorax (Ubx), Salivirus, Cosavirus, Parechovirus, Human upstream of N-ras (UNR), Mouse utrophin A (UtrA), Human vascular endothelial growth factor A (VEGF-A), Human X-linked inhibitor-of-apoptosis protein (XIAP), *Drosophila* hairless, *S. cerevisiae* transcription factor II D (TFIID), *S. cerevisiae* Yes1 Associated Transcriptional Regulator (YAP1), Human proto-oncogene tyrosine-protein kinase Src (c-src), Human fibroblast growth factor 1 (FGF-1), Simian picomavirus, Turnip crinkle virus, Coxsackievirus B3 (CVB3) and Coxsackievirus A (CVB1/2).

In another aspect, vector may further include an RNA polymerase promoter.

In another aspect, RNA polymerase promoter may be a T7 virus RNA polymerase promoter, T6 virus RNA polymerase promoter, SP6 virus RNA polymerase promoter, T3 virus RNA polymerase promoter, or T4 virus RNA polymerase promoter.

In another aspect, 3' Group I self-splicing intron fragment and the 5' Group I self-splicing intron fragment may be from a *Cyanobacterium anabaena* sp. Pre-tRNA-Leu gene.

In another aspect, 3' Group I self-splicing intron fragment and 5' Group I self-splicing intron fragment may be from a T4 phage Td gene.

In another aspect, method of the present disclosure may further include forming the circular RNA by splint-mediated ligation of the precursor RNA.

In another aspect, vector may be transfected into the cell using lipofection or electroporation prior to transcription.

In another aspect, vector may be transfected into the cell using a nanocarrier prior to transcription.

In another aspect, nanocarrier may be a lipid, polymer, or lipo-polymeric hybrid.

In another aspect, method of the present disclosure may further include forming the circular RNA and purifying the circular RNA using a size-exclusion column in tris-EDTA or ion-paired reverse phase HPLC.

In another aspect, method of the present disclosure may further include forming the circular RNA and purifying the circular RNA in a triethylammonium acetate (TEAA)-acetonitrile buffer in a high-performance liquid chromatography (HPLC) system at a flow rate of about 0.01-5 mL/minute at a pH in the range of about 4-10.

In another aspect, method of the present disclosure may further include forming the circular RNA and purifying the circular RNA using a phosphatase treatment.

In another aspect, method of the present disclosure may further include incubating the precursor RNA in the presence of (i) magnesium ions and/or (ii) guanosine nucleotides or guanosine nucleosides.

In another aspect, incubation of the precursor RNA may occur at a temperature of between about 20° C. and about 60° C.

In another aspect, transcription of vector may occur in the presence of a nucleoside or nucleotide monophosphate or diphosphate for the incorporation of said nucleoside or nucleotide as the first nucleotide of the precursor RNA transcribed from said vector.

In another aspect, precursor RNA may include a monophosphate 5' terminus capable of being ligated using a ligase enzyme.

In another aspect, transcription of the vector may occur in the presence of a) guanosine nucleosides or nucleotide mono- or di-phosphates; b) cytidine nucleosides or nucleotide mono- or di-phosphates; c) uracil nucleosides or nucleotide mono- or di-phosphates; d) adenosine nucleosides or nucleotide mono- or di-phosphates; or e) a combination thereof, for incorporation of nucleosides or nucleotide mono- or di-phosphates as the first nucleotide of RNA strands transcribed from vector or transcripts arising from vector.

In another aspect, protein encoding region may encode a non-natural protein including one or more synthetic protein elements.

In another aspect, vector may include a 5' spacer element located at the 3' end of
b).

In another aspect, vector may include a 3' spacer element located at the 5' end of d).

In another aspect, 5' spacer element or 3' spacer element may include a polyA sequence or a polyA-C sequence.

In another aspect, noncoding region may include an element encoding one or more RNA selected from the group consisting of antisense RNA, transfer RNA (tRNA), transfer-messenger RNA (tmRNA), ribosomal RNA (rRNA), signal recognition particle RNA (7SL RNA or SRP RNA), small nuclear RNAs (snRNA), small nucleolar RNA (snoRNA), SmY RNA (SmY), small cajal body-specific RNA (scaRNA), guide RNA (gRNA), Y RNA, spliced leader RNA (SL RNA), microRNAs (miRNA), small Interfering RNA (siRNA), cis-natural antisense transcript (cis-NAT), CRISPR RNA (crRNA), long noncoding RNA (lncRNA), Piwi-interacting RNA (piRNA), short hairpin RNA (shRNA), trans-acting siRNA (tasiRNA), Repeat associated siRNA (rasiRNA), 7SK RNA (7SK), telomerase RNA Component (TERC), Vault RNA (vRNA, vtRNA), and enhancer RNA (eRNA).

In one aspect, the present disclosure relates to precursor RNA containing the following elements operably connected to each other and arranged in the following sequence: a) a 5' element comprising none or at least one stem-loop structure, b) a 3' Group I self-splicing intron fragment containing a 3' splice site dinucleotide, c) a protein coding region or noncoding region, d) a 5' Group I self-splicing intron fragment containing a 5' splice site dinucleotide, e) a 3' element comprising none or at least one stem-loop structure; provided that, when the 5' element does not comprise a stem-loop structure, then the 3' element comprises at least one stem-loop structure; and, when the 3' element does not comprise a stem-loop structure, then the 5' element comprises at least one stem-loop structure, in which the 5' element and the 3' element form a thermodynamically stable multiple way junction, in which the precursor RNA is capable of forming a circular RNA that is translatable and/or biologically active inside a cell. In one aspect, vector may encode precursor RNA of the present disclosure.

In another aspect, vector may be a plasmid, a viral vector, a polymerase chain reaction (PCR) product, a cosmid, a bacterial artificial chromosome (BAC), or a yeast artificial chromosome (YAC).

In an aspect, the present disclosure relates to methods of preparing a circular ribonucleic acid (RNA), including transcribing a vector to form a precursor RNA containing the following elements operably connected to each other and arranged in tandem in a 5' to 3' orientation: a) a 5' element, b) a 3' Group I self-splicing intron fragment containing a 3' splice site dinucleotide, c) none or an element comprising an internal ribosome entry site (IRES) and a protein coding region or an element comprising a noncoding region, d) a 5' Group I self-splicing intron fragment containing a 5' splice site dinucleotide, and e) a 3' element; in which the 5' element and the 3' element form a stable structure with a Gibbs free energy ($\Delta G$) from −190 kcal/mol to −9.0 kcal/mol, provided that the stable structure is not a duplex with at least 95% base pairing between the 5' element and the 3' element, in which the 3' Group I self-splicing intron fragment and the 5' Group I self-splicing intron fragment form a self-cleaving and self-ligating RNA molecule, thereby generating the circular RNA.

In an aspect, the present disclosure relates to precursor RNAs containing the following elements operably connected to each other and arranged in tandem in a 5' to 3' orientation: a) a 5' element, b) a 3' Group I self-splicing intron fragment containing a 3' splice site dinucleotide, c) none or an element comprising an IRES and a protein coding region or an element comprising a noncoding region, d) a 5' Group I self-splicing intron fragment containing a 5' splice site dinucleotide, and e) a 3' element, in which the 5' element and the 3' element form a stable structure with a Gibbs free energy ($\Delta G$) from −190 kcal/mol to −9.0 kcal/mol, provided that the stable structure is not a duplex with at least 95% base pairing between the 5' element and the 3' element, in which the 3' Group I self-splicing intron fragment and the 5' Group I self-splicing intron fragment form a self-cleaving and self-ligating RNA molecule, thereby generating the circular RNA.

In an aspect, the present disclosure relates to methods of producing a protein in a cell, including introducing to the cell the precursor RNA containing the protein coding region or the vector containing the protein coding region of the present disclosure, and producing the protein.

In an aspect, the present disclosure relates to methods of editing a gene in a cell, including introducing to the cell the precursor RNA containing the noncoding region capable of editing the gene or the vector containing the noncoding region capable of editing the gene of the present disclosure, and editing the gene.

BRIEF DESCRIPTION OF THE DRAWINGS

FIG. 14A shows HPLC-purified circRNA prepared by methods in accordance with one embodiment of the present disclosure.

Figure 1:
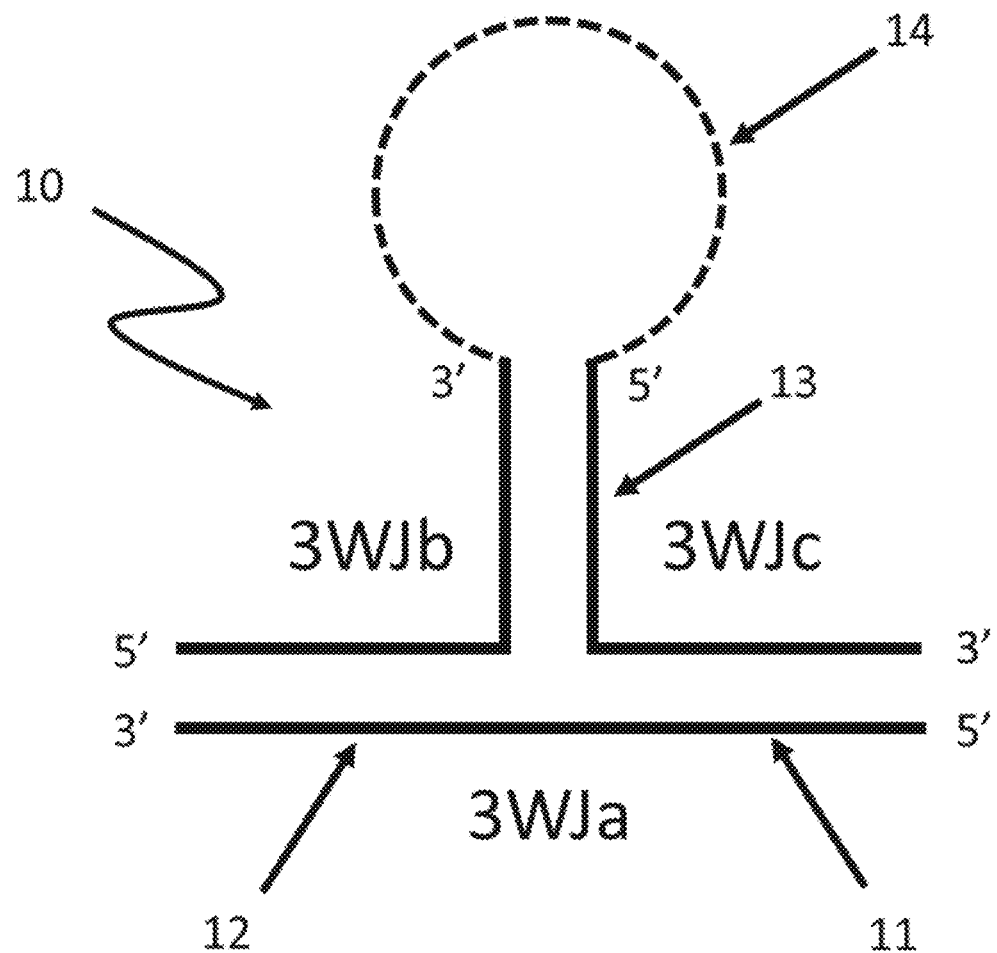
FIG. 1 shows a three-way junction" ("3WJ") domain in accordance with one embodiment of the present disclosure.

DETAILED DESCRIPTION mRNA has been proven to be a great platform for RNA based therapeutics and vaccine development. mRNA vaccines developed for use in human may need a 5' cap and 3' polyA component for efficient mRNA expression in vivo, which may require a cap dependent mechanism to recruit ribosome for translation. These requirements may present a challenge for high quality mRNA production since polyA tail may tend to get lost during plasmid preparation step. Furthermore, the stability of linear mRNA sequences may be another limitation for in vitro preservation and in vivo half-life by exonuclease degradation.

Exogenous circular RNA was developed to extend the duration of protein expression from full-length RNA sequences. There may be three general strategies for exogenous RNA circularization: chemical methods using cyanogen bromide or a similar condensing agent, enzymatic methods using RNA or DNA ligases, and ribozymatic methods using self-splicing introns. A ribozymatic method utilizing a permuted group I catalytic intron may be more applicable to long RNA circularization and may require only the addition of GTP and Mg2+ as cofactors. Functional protein may be produced from these circRNAs in eukaryotic cells and translation incorporating different internal ribosome entry sites (IRES) and internal polyadenosine tracts may be maximized. This permuted intron-exon (PIE) splicing strategy may contain fused partial exons flanked by half-intron sequences. In vitro, these constructs can undergo the double transesterification reactions characteristic of group I catalytic introns, but because the exons are already fused they are excised as covalently 5' to 3' linked circles. Using this strategy as a starting point for creating a protein coding circular RNA, Wesselhoeft ("Engineering circular RNA for potent and stable translation in eukaryotic cells." Nat Commun. 2018 Jul. 6; 9 (1): 2629) described a method of using permuted intron and Exon design facilitated with homology arms in the sequence to prepared circular RNA in vitro. This circularization reaction, however, may be not very efficient. As a result, extensive HPLC purification and RNaseR digestion purification may be needed to remove the unreacted precursor linear RNA in order to obtain a relatively pure circular RNA for drug development.

Circular RNA may be designed with a PIE (permuted intron-exon) flanked with sequences at the 5'end and 3'end forming a highly thermodynamically stable scaffold with low Gibbs free energy, $<-40$ kcal/mol. The lower free energy to drive the formation of ribozyme using the intron sequences on the 5'ends and 3'ends of circular RNA. The thermodynamic stable motif flanked at the 5'end and 3'end of precursor circular RNA may have high affinity to associate with each other to form a complex structure to facilitate the formation of a multiway junction motif and ribozyme structure. For example, 3-way junction (3WJ) may have a rapid "on" state to form the 3WJ structure with an association rate constant of $1.37 \times 10^5$ M-1 s-1 (Binzel et al., "Mechanism of three-component collision to produce ultrastable pRNA three-way junction of Phi29 DNA-packaging motor by kinetic assessment." RNA. 2016 November; 22 (11): 1710-1718, the content of which is hereby incorporated by reference in its entirety) and very low dissociation constant. They do not dissociate at pmol range (Shu et al., "Thermodynamically stable RNA three-way junction for constructing multifunctional nanoparticles for delivery of therapeutics." Nature Nanotechnology 2011; 6 (10): 658-67; the content of which is hereby incorporated by reference in its entirety). This property may enable the formation of ribozyme from two ends of long precursor RNA. Further, the thermodynamic motif formed from this design can further forms 3D structure (Zhang et al., "Crystal Structure of 3WJ Core Revealing Divalent Ion-promoted Thermostability and Assembly of the Phi29 Hexameric Motor pRNA." RNA 2013 September; 19 (9): 1226-37; the content of which is hereby incorporated by reference in its entirety) with high affinity that can further ensure the correct folding of its adjacent ribozyme structure formation by the introns.

As used herein, a "homology arm" or "homology region," or "duplex forming region" may be any contiguous sequence that may be 1) predicted to form base pairs with at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, about 100%, 100% of another sequence in the RNA, such as another homology arm, 2) at least about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 nucleotides in length and no longer than 250 nt, 3) located before and adjacent to, or included within, the 3' intron fragment and/or after and adjacent to, or included within, the 5' intron fragment and, optionally, 4) predicted to have less than 50% (e.g., less than 45%, less than 40%, less than 35%, less than 30%, less than 25%) base pairing with unintended sequences in the RNA (e.g., non-homology arm sequences). In some embodiments, the homology arms or homology regions or duplex forming regions may have a length of about 9 to about 50 nucleotides. In one embodiment, the homology arms or homology regions or duplex forming regions may have a length of about 9 to about 19 nucleotides. In some embodiments, the homology arms or homology regions or duplex forming regions may have a length of about 20 to about 40 nucleotides. In certain embodiments, the homology arms or homology regions or duplex forming regions may have a length of about 30 nucleotides.

The 5' and 3' homology arms or homology regions or duplex forming regions can be synthetic sequences and are distinct from the internal homology regions but similar in function. The homology arms or homology regions or duplex forming regions can be, e.g., about 5-50 nucleotides in length, about 9-19 nucleotides in length, for example, about 5, about 10, about 20, about 30, about 40, or about 50 nucleotides in length. In another embodiment, the homology arms or homology regions or duplex forming regions can be 9 nucleotides in length. In a further embodiment, the homology arms or homology regions or duplex forming regions can be 19 nucleotides in length. In some embodiments, the homology arms or homology regions or duplex forming regions are at least 5, 6, 7, 8, 9, 10, 11, 12, 13, 14, 15, 16, 17, 18 or 19 nucleotides in length. In some embodiments, the homology arms or homology regions or duplex forming regions are no more than 50, 45, 40, 35, 30, 25 or 20 nucleotides in length. In some embodiments, the homology arms or homology regions or duplex forming regions are 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 nucleotides in length.

Different from the conventional 5' and 3' homology arms or homology regions or duplex forming regions as described in, e.g., WO2021236855 and U.S. Pat. No. 11,447,796, the contents of which are herein incorporated by reference in their entireties, 5' and 3' regions of the present disclosure may hybridize to form multiple way junctions (WJ), e.g., 3WJ, 4WJ, and 5WJ, as described below.

As used herein, a 3' group I intron fragment is a contiguous sequence that is at least 75% (e.g., at least 80%, at least 85%, at least 90%, at least 95%, 100%) homologous to a 3' proximal fragment of a natural group I intron, including the 3' splice site dinucleotide, and, optionally, the adjacent exon sequence at least 1 nucleotide in length (e.g., at least 5 nucleotides in length, at least 10 nucleotides in length, at least 15 nucleotides in length, at least 20 nucleotides in length, at least 25 nucleotides in length, at least 50 nucleotides in length). In one embodiment, the included adjacent exon sequence is about the length of the natural exon. In some embodiments, a 5' group I intron fragment is a contiguous sequence that is at least 75% (e.g., at least 80%, at least 85%, at least 90%, at least 95%, 100%) homologous to a 5' proximal fragment of a natural group I intron, including the 5' splice site dinucleotide and, optionally, the adjacent exon sequence at least 1 nucleotide in length (e.g., at least 5 nucleotides in length, at least 10 nucleotides in length, at least 15 nucleotides in length, at least 20 nucleotides in length, at least 25 nucleotides in length, at least 50 nucleotides in length). In one embodiment, the included adjacent exon sequence is about the length of the natural exon.

Examples of Group I intron self-splicing sequences include, but are not limited to, self-splicing permuted intron-exon sequences derived from T4 bacteriophage gene td or *Cyanobacterium anabaena* sp. pre-tRNA-Leu gene.

As used herein, a "spacer" refers to any contiguous nucleotide sequence that is 1) predicted to avoid interfering with proximal structures, for example, from the IRES, coding or noncoding region, or intron, 2) at least 7 nucleotides long (and optionally no longer than 100 nucleotides), 3) located downstream of and adjacent to the 3' intron fragment and/or upstream of and adjacent to the 5' intron fragment, and/or 4) contains one or more of the following: a) an unstructured region at least 5 nt long, b) a region predicted base pairing at least 5 nt long to a distal (i.e., non-adjacent) sequence, including another spacer, and/or c) a structured region at least 1 nt long limited in scope to the sequence of the spacer.

As used herein, "interfering" with regard to sequences refers to sequence(s) predicted or empirically determined to alter the folding of other structures in the RNA, such as the IRES or group I intron-derived sequences.

As used herein, "unstructured" with regard to RNA refers to an RNA sequence that is not predicted by the RNAFold software or similar predictive tools to form a structure (e.g., a hairpin loop) with itself or other sequences in the same RNA molecule.

As used herein, "structured" with regard to RNA refers to an RNA sequence that is predicted by the RNAFold software or similar predictive tools to form a structure (e.g., a hairpin loop) with itself or other sequences in the same RNA molecule.

In some embodiments, the spacer sequence can be, for example, at least 10 nucleotides in length, at least 15 nucleotides in length, or at least 30 nucleotides in length. In some embodiments, the spacer sequence is at least 7, 8, 9, 10, 11, 12, 13, 14, 15, 16, 17, 18, 19, 20, 25 or 30 nucleotides in length. In some embodiments, the spacer sequence is no more than 100, 90, 80, 70, 60, 50, 45, 40, 35 or 30 nucleotides in length. In some embodiments the spacer sequence is between 20 and 50 nucleotides in length. In certain embodiments, the spacer sequence is 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 nucleotides in length.

The spacer sequences can be polyA sequences, polyA-C sequences, polyC sequences, or poly-U sequences, or the spacer sequences can be specifically engineered depending on the IRES. Spacer sequences as described herein can have two functions: (1) promote circularization and (2) promote functionality by allowing the introns and IRES to fold correctly. More specifically, the spacer sequences as described herein were engineered with three priorities: 1) to be inert with regards to the folding of proximal intron and IRES structures; 2) to sufficiently separate intron and IRES secondary structures; and 3) to contain a region of spacer-spacer complementarity to promote the formation of a 'splicing bubble'. In one embodiment, the vectors may be compatible with many possible IRES and coding or non-coding regions and two spacer sequences.

In one embodiment, the vector can comprise a 5' spacer sequence, but not a 3' spacer sequence. In another embodiment, the vector can comprise a 3' spacer sequence, but not a 5' spacer sequence. In another embodiment, the vector can comprise neither a 5' spacer sequence, nor a 3' spacer sequence. In another embodiment, the vector does not comprise an IRES sequence. In a further embodiment, the vector does not comprise an IRES sequence, a 5' spacer sequence or a 3' spacer sequence.

As used herein, a "vector" means a piece of DNA, that is synthesized (e.g., using PCR), or that is taken from a virus, plasmid, or cell of a higher organism into which a foreign DNA fragment can be or has been inserted for cloning and/or expression purposes. In some embodiments, a vector can be stably maintained in an organism. A vector can comprise, for example, an origin of replication, a selectable marker or reporter gene, such as antibiotic resistance or GFP, and/or a multiple cloning site (MCS). The term may include linear DNA fragments (e.g., PCR products, linearized plasmid fragments), plasmid vectors, viral vectors, cosmids, bacterial artificial chromosomes (BACs), yeast artificial chromosomes (YACs), and the like. In one embodiment, the vectors provided herein comprise a multiple cloning site (MCS). In another embodiment, the vectors provided herein do not comprise an MCS.

Cells according to the present disclosure unless otherwise specified may include any cell into which foreign nucleic acids can be introduced and expressed as described herein. It is to be understood that the basic concepts of the present disclosure described herein are not limited by cell type. Cells according to the present disclosure may include somatic cells, stem cells, eukaryotic cells, prokaryotic cells, animal cells, plant cells, fungal cells, archael cells, eubacterial cells and the like. Cells may include eukaryotic cells, such as yeast cells, plant cells, and animal cells. Particular cells may include mammalian cells, such as human cells. Further, cells may include any cells, in which it would be beneficial or desirable to express circRNA.

The protein coding region for gene of interest (GOI) can encode a protein of eukaryotic or prokaryotic origin. In some embodiments, the protein can be any protein for therapeutic use or diagnostic use. For example, the protein coding region can encode human protein or antibodies. In some embodiments, the protein can be selected from, but not limited to, chimeric antigen receptors (CAR), T cell receptor (TCR), antibody, human factor IX (hFIX), pulmonary-associated surfactant protein B (SP-B), vascular endothelial growth factor A (VEGF-A), human methylmalonyl-CoA mutase (hMUT), CF transmembrane conductance regulator (CFTR), cancer self-antigens, and additional gene editing enzymes like Clustered Regularly Interspaced Short Palindromic Repeats (CRISPR)-associated (Cas) protein, e.g., Cas9 and Cpf1, zinc finger nucleases (ZFNs) and transcription activator-like effector nucleases (TALENs). In some embodiments, the vector or circRNA lacks a protein coding sequence. In some embodiments, the precursor RNA is a necessary intermediate between plasmid and circRNA.

In some embodiments, the vector may comprise an IRES sequence located at the 5' end of gene of interest (GOI) that encodes protein. The IRES sequence can be selected from, but not limited to, an IRES sequence of a Taura syndrome virus, *Triatoma* virus, Theiler's encephalomyelitis virus, simian Virus 40, *Solenopsis invicta* virus 1, *Rhopalosiphum padi* virus, Reticuloendotheliosis virus, fuman poliovirus 1, *Plautia stali* intestine virus, Kashmir bee virus, Human rhinovirus 2, Homalodisca coagulata virus-1, Human Immunodeficiency Virus type 1, Homalodisca coagulata virus-1, Himetobi P virus, Hepatitis C virus, Hepatitis A virus, Hepatitis GB virus, foot and mouth disease virus, Human enterovirus 71, Equine rhinitis virus, Ectropis obliqua picorna-like virus, Encephalomyocarditis virus (EMCV), *Drosophila* C Virus, Crucifer tobamo virus, Cricket paralysis virus, Bovine viral diarrhea virus 1, Black Queen Cell Virus, Aphid lethal paralysis virus, Avian encephalomyelitis virus, Acute bee paralysis virus, Hibiscus chlorotic ringspot virus, Classical swine fever virus, Human FGF2, Human SFTPA1, Human AML1/RUNX1, *Drosophila* antennapedia, Human AQP4, Human AT1R, Human BAG-1, Human BCL2, Human BiP, Human c-IAP1, Human c-myc, Human eIF4G, Mouse NDST4L, Human LEF1, Mouse HIF1 alpha, Human N-myc, Mouse Gtx, Human p27kip1, Human PDGF2/c-sis, Human p53, Human Pim-1, Mouse Rbm3, *Drosophila* reaper, Canine Scamper, *Drosophila* Ubx, Human UNR, Mouse UtrA, Human VEGF-A, Human XIAP, *Drosophila* hairless, *S. cerevisiae* TFIID, *S. cerevisiae* YAP1, Human c-src, Human FGF-1, Simian picomavirus, Turnip crinkle virus, an aptamer to eIF4G, Coxsackievirus B3 (CVB3) or Coxsackievirus A (CVB1/2). Wild-type IRES sequences can also be modified and be effective in the invention. In some embodiments, the IRES sequence is about 50 nucleotides in length.

In some embodiments, gene of interest (GOI) may be replaced by nucleic acid that encode one or more RNA molecules including, but not limiting to, antisense RNA, transfer RNA (tRNA), transfer-messenger RNA (tmRNA), ribosomal RNA (rRNA), signal recognition particle RNA (7SL RNA or SRP RNA), small nuclear RNAs (snRNA), small nucleolar RNA (snoRNA), SmY RNA (SmY), small cajal body-specific RNA (scaRNA), guide RNA (gRNA), Y RNA, spliced leader RNA (SL RNA), microRNAs (miRNA), small Interfering RNA (siRNA), cis-natural antisense transcript (cis-NAT), CRISPR RNA (crRNA), long noncoding RNA (lncRNA), Piwi-interacting RNA (piRNA), short hairpin RNA (shRNA), trans-acting siRNA (tasiRNA), Repeat associated siRNA (rasiRNA), 7SK RNA (7SK), telomerase RNA Component (TERC), Vault RNA (VRNA, vtRNA), and enhancer RNA (eRNA). In some embodiments, vector containing nucleic acids that encode one or more RNA molecules may or may not include an IRES sequence.

Circular RNA can be purified by the method of running the RNA through a reverse phase column in triethylammonium acetate (TEAA) buffer in a high-performance liquid chromatography (HPLC) system. In one embodiment, RNA may be run through the RP-HPLC column in TEAA-acetonitrile buffer at pH in the range of about 4-10 at a flow rate of about 0.01-5 mL/minute.

In certain embodiments, provided herein is a method of generating precursor RNA by performing in vitro transcription using a vector provided herein as a template (e.g., a vector provided herein with an RNA polymerase promoter positioned upstream of the 5' homology arm).

In some embodiments, the use of a nucleotide, nucleoside, or a chemically modified nucleotide or nucleoside in the in vitro transcription reactions described herein may be at an excess concentration relative to the analogous nucleotide triphosphate. "Excess concentration" is defined as greater than the concentration of the analogous nucleotide triphosphate, with the purpose of changing the 5' end nucleotide, specifically to reduce the immunogenicity of circRNA preparations by preventing the inclusion of a 5' triphosphate motif or to allow for the enzymatic circularization of precursor molecules by including the necessary 5' monophosphate motif.

In some embodiments, the nucleotide used in excess may be guanosine monophosphate (GMP). In other embodiments, the nucleotide used in excess may be GDP, ADP, CDP, UDP, AMP, CMP, UMP, guanosine, adenosine, cytidine, uridine, or any chemically modified nucleotide or nucleoside. In some embodiments, the excess may be about a 10-fold excess. In some embodiments, the excess may be about a 12.5-fold excess.

In one embodiment, the nucleotide, nucleoside, or a chemically modified nucleotide or nucleoside may be used at concentrations at least about 10× in excess of the analogous nucleotide triphosphate in the in vitro transcription reaction.

In some embodiments, the circRNA that results from precursor RNA synthesized in the presence of a nucleotide, nucleoside, or a chemically modified nucleotide or nucleoside at least about 10× in excess of the analogous nucleotide triphosphate in the in vitro transcription reaction may be then purified by HPLC to achieve minimal immunogenicity.

Because residual precursor linear RNA or nicked RNA can compete with circular RNA for ribosome recruiting resulting in reduced expression efficiency, purity of circular RNA product may seem crucially important for expression. Methods for preparing circular RNA with high purity in vitro may facilitate translating circular RNA technologies into application for RNA therapeutics and vaccine development. Embodiments of the present disclosure provides a solution for designing and preparing circular RNA in vitro with high self-circularization efficiency.

Embodiments of the present disclosure may include methods of preparing precursor RNA with a thermodynamically stable multiway junction next to the splicing bubble to prepare self-circularized RNA more efficiently in vitro.

The efficiency of self-circularization reaction of precursor RNA using permuted intron exon design may be highly dependent on the efficiency of self-splicing bubble formation. Traditional approach relies on the homology arm from 5' end and 3' end of the precursor RNA to form a duplex RNA structure to bring the splicing bubble to fold into its secondary structure for splicing function. Due to the breathing dynamics nature of RNA duplex, the self-circularization reaction efficiency may be generally less than 60%.

To solve the problem of efficiently forming the self-splicing bubble secondary structure, embodiments of the present disclosure may include stable RNA motifs composing at least 2 stems and 1 loop to lock the splicing bubble into its secondary structure to facilitate its correct folding and splicing efficiency. For example, stable RNA motifs may include an asymmetric three-way junction (3WJ) structure to lock the splicing bubble to facilitate correct folding and splicing efficiency, such as a thermodynamically stable multiway junction structure of RNA described in the packaging RNA of phi29 DNA packaging motor (Shu et al., "Thermodynamically stable RNA three-way junction for constructing multifunctional nanoparticles for delivery of therapeutics." Nat Nanotechnol. 2011 Sep. 11; 6 (10): 658-67, the content of which is hereby incorporated by reference in its entirety) and three fragments of 3WJa, 3WJb, and 3WJc auto-assembled rapidly into a three way junction (3WJ) structure to lock folding (Binzel et al., "Mechanism of three-component collision to produce ultrastable pRNA three-way junction of Phi29 DNA-packaging motor by kinetic assessment. RNA. 2016 November; 22 (11): 1710-1718," the content of which is hereby incorporated by reference in its entirety).

The multiway junction structure can be formed by breaking from one stem loop position and allocate the sequences at 5' end and 3' end of the precursor RNA sequence respectively.

Three-Way Junction (3WJ) Domain

Packaging (or prohead) ribonucleic acid (pRNA) three-way junction (3WJ) motifs have applications in biotechnology, such as in targeting of human immunodeficiency virus (HIV) and cancer. For example, the phi29 bacteriophage pRNA 3WJ nanomotif has been successfully used as a building block in the rational design of nanostructures with, for example cancer targeting functionalities (U.S. Pat. No. 9,297,013, the content of which is hereby incorporated by reference in its entirety).

Where used herein, the term "three-way junction" ("3WJ") or "trifurcate" scaffold (or domain) refers to a structure assembled from three RNA sequences. FIG. 1 shows that a 3WJ domain (10) may be constructed from three (5'→3') strands of RNA (referred to as 3WJa, 3WJb, and 3WJc), which base pair with one another. A first (5'→3') RNA oligonucleotide sequence designated as 3WJa, a second (5'→3') RNA oligonucleotide sequence designated as 3WJb, and a third (5'→3') RNA oligonucleotide sequence designated as 3WJc, may be combined and base pair to form trifurcate 3WJ domain (10), in which a first branch (11) of the 3WJ domain is formed from a 5' portion of the 3WJa sequence and a 3' portion of the 3WJc sequence, a second branch (12) of the 3WJ domain is formed from a 3' portion of the 3WJa sequence and a 5' portion of the 3WJb sequence, and a third branch (13) of the 3WJ domain is formed from a 3' portion of the 3WJb sequence and a 5' portion of the 3WJc sequence, in which each of the first (11), second (12), and third (13) branches may contain a helical region having a plurality of RNA nucleotide pairs that form canonical Watson-Crick bonds. One, two and/or three of the branches of the 3WJs of the present disclosure may also include non-Watson-Crick nucleotide pairs or bulges, such as, but not limited to, G-U wobble base pairs, or buldges with few extra non-pairing bases. In some embodiments, the 3' end of 3WJb may be connected to the 5' end of 3WJc via a linker sequence (14). In some embodiments, linker sequence (14) linking 3WJb and 3WJc may be completely unpaired, e.g., forming a stem-loop structure. In some embodiments, linker sequence (14) may be partially paired with its sequence, e.g., forming loops and stems. In some embodiments, the linker sequence (14) may be completely paired with its sequence, e.g., forming a stem. In some embodiments, the linker sequence (14) may be absent, e.g., the 3' end of 3WJb may be connected directly to the 5' end of 3WJc.

As used herein, a stem-loop structure can occur in single-stranded RNA. The structure may also be known as a hairpin or hairpin loop and may contain a stem and a (terminal) loop within a continuous sequence, where the stem may be formed by two adjacent fully or partially inversely complementary sequences separated by a short sequence as a kind of spacer that forms a loop stem-loop structures. Two adjacent fully or partially inversely complementary sequences can be defined, for example, as elements of the stem-loop structure sequence 1 and sequence 2. The stem-loop structure may be formed when these two adjacent fully or partially inverse complementary sequences, for example, the stem-loop structure elements sequence 1 and sequence 2, form base pairs with each other, which leads to the formation of a double-stranded nucleic acid sequence containing at its end, an unpaired loop formed by a short sequence located between the elements of the stem-loop structure sequence 1 and sequence 2 in a continuous sequence. Thus, an unpaired loop, as a rule, may be a region of nucleic acid that is not capable of pairing with any of these elements of the stem-loop structure. The resulting multi-way junction structure domain folds into a tight structure with lower Gibbs free energy ($\Delta G$), thus increase the thermodynamic stability of this structure formulation, and facilitating the splicing bubble formation into its authentic structure. The stability of the paired elements of the stem-loop structure may be determined by the length and GC pair ratios, the number of inconsistencies or loops contained in it (a small number of inconsistencies are usually permissible, especially in a large double-stranded region) and the base composition of the paired region. In some embodiments of the present disclosure, a loop length of 3 to 15 bases may be permissible, although a more preferred loop length may be 3-20 bases, preferably 3 to 19, 3 to 18, 3 to 17, 3 to 16, 3 to 15, 3 to 14, 3 to 13, 3 to 12, 3 to 11, 3 to 10, 3 to 9, 3 to 8, 3 to 7, 3 to 6, 3 to 5, or more preferably 4 up to 5 bases, and most preferably 4 bases. The length of the stem sequence forming the double-stranded structure may be from 5 to 20 bases, preferably from 5 to 19, 5 to 18, 5 to 17, 5 to 16, 5 to 15, 5 to 14, 5 to 13, 5 to 12, 5 to 11, 5 to 10, 5 to 9, 5 to 8, 5 to 7, or 5 to 6 bases.

The Gibbs free energy ($\Delta G$) for each RNA scaffold to form is calculated using M Fold for RNA folding form, which is available on the UNAFold Web server (Mfold web server for nucleic acid folding and hybridization prediction. Nucleic Acids Res. 31 (13), 3406-15, (2003)). The $\Delta G$ is calculated based on the RNA to be folded at 37° C. in 1M NaCl ionic conditions.

$\Delta G$ of multi-way junctions of the present disclosure may be from about −200 kcal/mol to about −5 kcal/mol, from about −195 kcal/mol to about −6 kcal/mol, from about −190 kcal/mol to about −7 kcal/mol, from about −190 kcal/mol to about −8 kcal/mol, from about −190 kcal/mol to about −9 kcal/mol, from about −189 kcal/mol to about −9.5 kcal/mol, from about-188.7 kcal/mol to about −9.8 kcal/mol, from about −188.7 kcal/mol to about −9.8 kcal/mol, from about −188.7 kcal/mol to about −27.1 kcal/mol, from about −188.7 kcal/mol to about −35.8 kcal/mol, from about −188.7 kcal/mol to about −143.7 kcal/mol, from about −188.7 kcal/mol to about −62.7 kcal/mol, from about −188.7 kcal/mol to about −35.4 kcal/mol, from about −188.7 kcal/mol to about −31.9 kcal/mol, from about −188.7 kcal/mol to about −31.7 kcal/mol, from about −188.7 kcal/mol to about −31.4 kcal/mol, from about −188.7 kcal/mol to about −32.5 kcal/mol, from about −188.7 kcal/mol to about −32.3 kcal/mol, from about −188.7 kcal/mol to about −32.0 kcal/mol, from about −188.7 kcal/mol to about −29.2 kcal/mol, from about −188.7 kcal/mol to about −25.9 kcal/mol, from about −188.7 kcal/mol to about −22.6 kcal/mol, from about −188.7 kcal/mol to about −21.7 kcal/mol, from about −188.7 kcal/mol to about −17.8 kcal/mol, from about −188.7 kcal/mol to about −15.0 kcal/mol, from about −188.7 kcal/mol to about −13.5 kcal/mol, from about −188.7 kcal/mol to about −13.3 kcal/mol, from about −188.7 kcal/mol to about −10.10 kcal/mol, from about −188.7 kcal/mol to about −32.0 kcal/mol, from about −188.7 kcal/mol to about −28.10 kcal/mol, from about −188.7 kcal/mol to about −29.30 kcal/mol, from about -188.7 kcal/mol to about -26.70 kcal/mol, from about -188.7 kcal/mol to about -23.40 kcal/mol, from about -188.7 kcal/mol to about -20.10 kcal/mol, from about -188.7 kcal/mol to about -19.20 kcal/mol, from about -188.7 kcal/mol to about -18.20 kcal/mol, from about -188.7 kcal/mol to about -13.10 kcal/mol, from about -188.7 kcal/mol to about -10.15 kcal/mol, from about -188.7 kcal/mol to about -13.0 kcal/mol, from about -188.7 kcal/mol to about -16.0 kcal/mol, from about -188.7 kcal/mol to about -12.7 kcal/mol, from about -188.7 kcal/mol to about -23.65 kcal/mol, from about -188.7 kcal/mol to about -19.40 kcal/mol, from about -188.7 kcal/mol to about -15.40 kcal/mol, from about -188.7 kcal/mol to about -34.40 kcal/mol, from about -188.7 kcal/mol to about -25.30 kcal/mol, from about -188.7 kcal/mol to about -16.40 kcal/mol, from about -188.7 kcal/mol to about -12.60 kcal/mol, from about -188.7 kcal/mol to about -30.50 kcal/mol, from about -188.7 kcal/mol to about -21.40 kcal/mol, from about -188.7 kcal/mol to about -34.30 kcal/mol, from about -188.7 kcal/mol to about -25.20 kcal/mol, or from about -188.7 kcal/mol to about -16.30 kcal/mol.

In certain non-limiting embodiments, each of the 3WJa, 3WJb, and 3WJc oligonucleotide sequences of the 3WJ scaffolds or domains of the present disclosure may include, independently, from 8 to 36 nucleotides (e.g., 8, 9, 10, 11, 12, 13, 14, 15, 16, 17, 18, 19, 20, 21, 22, 23, 24, 25, 26, 27, 28, 29, 30, 31, 32, 33, 34, 35, or 36 nucleotides) not including RNA linkers or RNA portions of biologically-active moieties conjugated to the 3WJ scaffolds.

Figure 6:
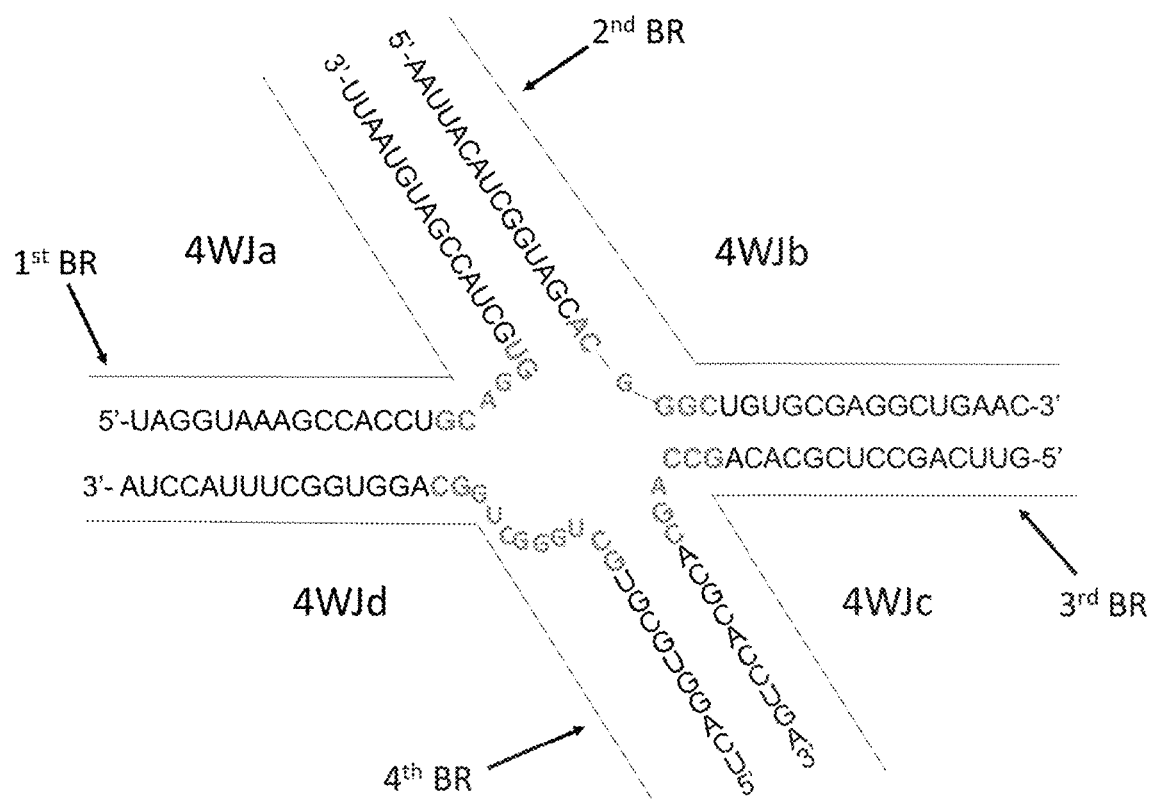
FIG. 6 shows a 4WJ domain (4WJa: UAGGUAAAGC-CACCUGCAGGUGCUACCGAUGUAAUU (SEQ ID NO: 125), 4WJb: AAUUACAUCGGUAGCACGGGCU-GUGCGAGGCUGAAC (SEQ ID NO: 126), 4WJc: GUUCAGCCUCGCACAGCCAGCACGCACCUGA (SEQ ID NO: 127), and 4WJd: UCAG-GUGCGUGCUGGGCUGGCAGGUGGCUUUACCUA (SEQ ID NO: 128)) in accordance with one embodiment of the present disclosure.

Four-way junction (4WJ) domain may be constructed from four (5'→3') strands of RNA (referred to as 4WJa, 4WJb, 4WJc, and 4WJd, which base pair with one another. A first (5'→3') RNA oligonucleotide sequence designated as 4Wja, a second (5'3') RNA oligonucleotide sequence designated as 4WJb, a third (5'→3') RNA oligonucleotide sequence designated as 4WJc, and a fourth (5'→3') RNA oligonucleotide sequence designated as 4WJd may be combined and base pair to form 4WJ domain. For example, FIG. 6 shows a first branch ($1^{st}$ BR) of the 4WJ domain is formed from a 5' portion of the 4Wja sequence and a 3' portion of the 4WJd sequence, a second branch ($2^{nd}$ BR) of the 4WJ domain is formed from a 3' portion of the 4Wja sequence and a 5' portion of the 4WJb sequence, a third branch ($3^{rd}$ BR) of the 4WJ domain is formed from a 3' portion of the 4WJb sequence and a 5' portion of the 4WJc sequence, and a fourth branch ($4^{th}$ BR) of the 4WJ domain is formed from a 3' portion of the 4WJc sequence and a 5' portion of the 4WJd sequence, in which each of the first, second, third, and fourth branches may contain a helical region having a plurality of RNA nucleotide pairs that form canonical Watson-Crick bonds. One, two, three, and/or four of the branches of each 4WJ of the present disclosure may also include non-Watson-Crick nucleotide pairs, such as, but not limited to, G-U. In some embodiments, the 3' end of 4Wja may be connected to the 5' end of 4WJb via a linker sequence and the 3' end of 4WJc may be connected to the 5' end of 4WJd via a linker sequence. In some embodiments, one or more linker sequence linking 4Wja and 4WJb and linker sequence linking 4WJc and 4WJd may be completely unpaired, e.g., forming stem-loop structures. In some embodiments, one or more linker sequence may be partially paired with its sequence, e.g., forming loops and stems. In some embodiments, one or more linker sequence may be completely paired with its sequence, e.g., forming stems. In some embodiments, one or more linker sequence may be absent, e.g., the 3' end of 4Wja may be connected directly to the 5' end of 4WJb and the 3' end of 4WJc may be connected directly to the 5' end of 4WJd.

Figure 9:
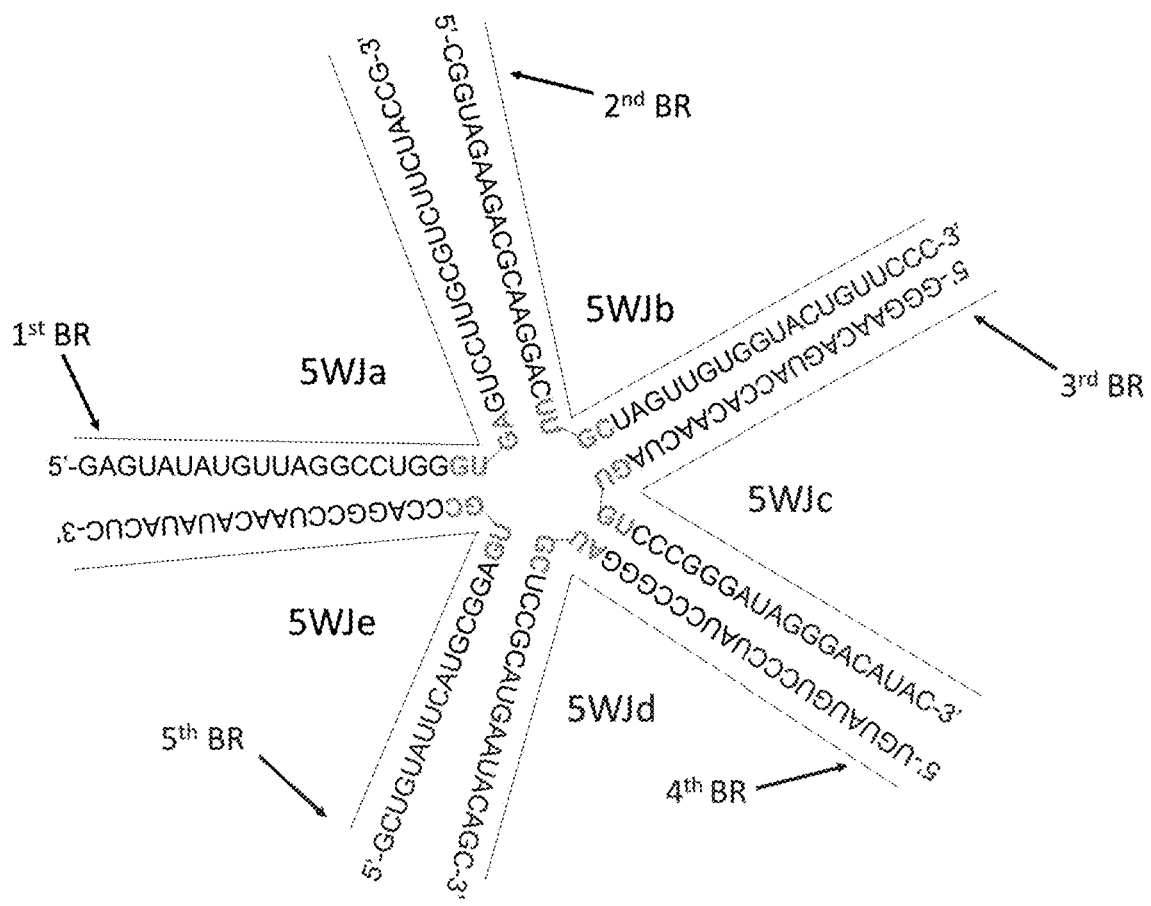
FIG. 9 shows a 5WJ domain (5WJa: GAGUAUAU-GUUAGGCCUGGGUGA GUC CUU GCG UCUUC-UACCG (SEQ ID NO: 107), 5WJb: CGGUAGAA-GACGCAAGGACUU GCU ΔGU UGU GGU ACU GUU CCC (SEQ ID NO: 108), 5WJc: GGGAACAGUAC-CACAACUAGU GUC CCG GGA UAG GGA CAU AC (SEQ ID NO: 109), 5WJd: UGUAUGUCCCUAUCCCGG-GAU GCUCCGCAUGAAUACAGC (SEQ ID NO: 110), and 5WJe: GCUGUAUUCAUGCGGAGU GCCCAGGC-CUAACAUAUACUC (SEQ ID NO: 111)) in accordance with one embodiment of the present disclosure.

Five-way junction (5WJ) domain may be constructed from five (5'→3') strands of RNA (referred to as 5WJa, 5WJb, 5WJc, 5WJd, and 5WJe, which base pair with one another. A first (5'>3') RNA oligonucleotide sequence designated as 5WJa, a second (5'→3') RNA oligonucleotide sequence designated as 5WJb, a third (5'→3') RNA oligonucleotide sequence designated as 5WJc, a fourth (5'>3') RNA oligonucleotide sequence designated as 5WJd, and a fifth (5'→3') RNA oligonucleotide sequence designated as 5WJe may be combined and base pair to form 5WJ domain. For example, FIG. 9 shows a first branch ($1^{st}$ BR) of the 5WJ domain is formed from a 5' portion of the 5WJa sequence and a 3' portion of the 5WJe sequence, a second branch ($2^{nd}$ BR) of the 5WJ domain is formed from a 3' portion of the 5WJa sequence and a 5' portion of the 5WJb sequence, a third branch ($3^{rd}$ BR) of the 5WJ domain is formed from a 3' portion of the 5WJb sequence and a 5' portion of the 5WJc sequence, a fourth branch ($4^{th}$ BR) of the 5WJ domain is formed from a 3' portion of the 5WJc sequence and a 5' portion of the 5WJd sequence, and a fifth branch ($5^{th}$ BR) of the 5WJ domain is formed from a 3' portion of the 5WJd sequence and a 5' portion of the 5WJe sequence, in which each of the first, second, third, fourth, and fifth branches may contain a helical region having a plurality of RNA nucleotide pairs that form canonical Watson-Crick bonds. One, two, three, four, and/or five of the branches of each 5WJ of the present disclosure may also include non-Watson-Crick nucleotide pairs, such as, but not limited to, G-U. In some embodiments, the 3' end of 5WJa may be connected to the 5' end of 5WJb via a linker sequence, the 3' end of 5WJc may be connected to the 5' end of 5WJd via a linker sequence, and the 3' end of 5WJd may be connected to the 5' end of 5WJe via a linker sequence. In some embodiments, one or more linker sequence linking 5WJa and 5WJb, linker sequence linking 5WJc and 5WJd, and linker sequence linking 5WJd and 5WJe may be completely unpaired, e.g., forming stem-loop structures. In some embodiments, one or more linker sequence may be partially paired with its sequence, e.g., forming loops and stems. In some embodiments, one or more linker sequence may be completely paired with its sequence, e.g., forming stems. In some embodiments, one or more linker sequence may be absent, e.g., the 3' end of 5WJa may be connected directly to the 5' end of 5WJb, the 3' end of 5WJc may be connected directly to the 5' end of 5WJd, and/or the 3' end of 5WJd may be connected directly to the 5' end of 5WJe.

In some embodiments, each multi-way junction, e.g., 3WJ, 4WJ, and 5WJ, of the present disclosure may contain a core structure. The duplexes formed by each multi-way junction may not impact the core structure formation (Khisamutdinov et al., "Enhancing immunomodulation on innate immunity by shape transition among RNA triangle, square and pentagon nanovehicles." Nucleic Acids Res. 2014 Nov. 1; 42 (15): 9996-10004; the content of which is hereby incorporated by reference in its entirety). Changing nucleotides (N) while forming base paired duplex with its corresponding arm may not impact junction formation. For example, a 3WJ may form a 60 degree angle between two arms, the flanking duplex sequence may be designed with different length to form triangle, square, or pentagon junction structure with good flexibility for the thermodynamically stable 3WJ structure.

Table A shows sequences of core structures of 3WJ, 4WJ, and 5WJ in accordance with some embodiments of the present disclosure.

TABLE A

| Construct | Core Sequence |
|---|---|
| 3WJa | 5'-AUGUGUA-3' |
| 3WJb | 5'-UACUUUG-3' |
| 3WJc | 5'-AUCAUG-3' |

| Construct | Core Sequence |
|---|---|
| 3WJa | 5'-GCGUU-3' |
| 3WJb | 5'-UUCGC-3' |
| 3WJc | 5'-GCCAUAGCG-3' |

| Construct | Core Sequence |
|---|---|
| 4WJa | 5'-UGCAGGUG-3' |
| 4WJb | 5'-ACGGGC-3' |
| 4WJc | 5'-CCAGCA-3' |
| 4WJd | 5'-GCUGGGCUGGC-3' (SEQ ID NO: 67) |

| Construct | Core Sequence |
|---|---|
| 4WJa | 5'-UGUGUANNNGGGUU-3' (SEQ ID NO: 74) |
| 4WJb | 5'-AACUG-3' |
| 4WJc | 5'-CAGCCCNNNACUUUGU-3' (SEQ ID NO: 75) |
| 4WJd | 5'-AUCAUG-3' |

| Construct | Core Sequence |
|---|---|
| 5WJa | 5'-GUGA-3' |
| 5WJb | 5'-UUGC-3' |
| 5WJc | 5'-GUGU-3' |
| 5WJd | 5'-AUGC-3' |
| 5WJe | 5'-GUGC-3' |

| Construct | Core Sequence |
|---|---|
| 3WJa | 5'-GUAUGGCAC-3' |
| 3WJb | 5'-GUCACGG-3' |
| 3WJc | 5'-CUCUUAC-3' |

| Construct | Core Sequence |
|---|---|
| 3WJa | 5'-AUGGUA-3' |
| 3WJb | 5'-ACUUUGU-3' |
| 3WJc | 5'-AUCA-3' |

| Construct | Core Sequence |
|---|---|
| 3WJa | 5'-UGGU-3' |
| 3WJb | 5'-ACUUGU-3' |
| 3WJc | 5'-AUCA-3' |

| Construct | Core Sequence |
|---|---|
| 3WJa | 5'-UGGU-3' |
| 3WJb | 5'-ACUGU-3' |
| 3WJc | 5'-AUCA-3' |

| Construct | Core Sequence |
|---|---|
| 3WJa | 5'-UGGU-3' |
| 3WJb | 5'-ACGUU-3' |
| 3WJc | 5'-AAUCA-3' |

| Construct | Core Sequence |
|---|---|
| 3WJa | 5'-UGUGU-3' |
| 3WJb | 5'-ACUUGU-3' |
| 3WJc | 5'-AUCA-3' |

| Construct | Core Sequence |
|---|---|
| 3WJa | 5'-UGUGU-3' |
| 3WJb | 5'-ACUGU-3' |
| 3WJc | 5'-AUCA-3' |

| Construct | Core Sequence |
|---|---|
| 3WJa | 5'-UGUGU-3' |
| 3WJb | 5'-ACGUU-3' |
| 3WJc | 5'-AAUCA-3' |

| Construct | Core Sequence |
|---|---|
| 3WJa | 5'-UGGU-3' |
| 3WJb | 5'-ACUGU-3' |
| 3WJc | 5'-AUCA-3' |

| Construct | Core Sequence |
|---|---|
| 3WJa | 5'-UAUGGCAC-3' |
| 3WJb | 5'-GUCACGG-3' |
| 3WJc | 5'-CUCUUA-3' |

| Construct | Core Sequence |
|---|---|
| 3WJa | 5'-UAUGG-3' |
| 3WJb | 5'-UCACGG-3' |
| 3WJc | 5'-CCUCUUA-3' |

| Construct | Core Sequence |
|---|---|
| 3WJa | 5'-UAUGGCAC-3' |
| 3WJb | 5'-GUCACGG-3' |
| 3WJc | 5'-CUCUUA-3' |

| Construct | Core Sequence |
|---|---|
| 3WJa | 5'-UAUG-3' |
| 3WJb | 5'-CAGGGG-3' |
| 3WJc | 5'-CUUG-3' |

| Construct | Core Sequence |
|---|---|
| 3WJa | 5'-UAUGU-3' |
| 3WJb | 5'-GCAGG-3' |
| 3WJc | 5'-UCUUG-3' |

TABLE A-continued

| Construct | Core Sequence |
|---|---|
| 3WJa | 5'-UAUGU-3' |
| 3WJb | 5'-GCAGGG-3' |
| 3WJc | 5'-CUUG-3' |

| Construct | Core Sequence |
|---|---|
| 3WJa | 5'-UAUGU-3' |
| 3WJb | 5'-GCAGG-3' |
| 3WJc | 5'-UCUUG-3' |

| Construct | Core Sequence |
|---|---|
| Ex3WJa | 5'-UGUGU-3' |
| Ex3WJb | 5'-ACUUUGU-3' |
| Ex3WJc | 5'-AUCA-3' |

| Construct | Core Sequence |
|---|---|
| 4WJa | 5'-AUGUGUNNNNGGGUUC-3' (SEQ ID NO: 122) |
| 4WJb | 5'-GAACU-3' |
| 4WJc | 5'-AGCCNNNNNACUUUGU-3' (SEQ ID NO: 123) |
| 4WJd | 5'-AAUCA-3' |

| Construct | Core Sequence |
|---|---|
| 3WJa | 5'-UGUGU-3' |
| 3WJb | 5'-ACUUU-3' |
| 3WJc | 5'-AAAUCA-3' |

Figure 2:
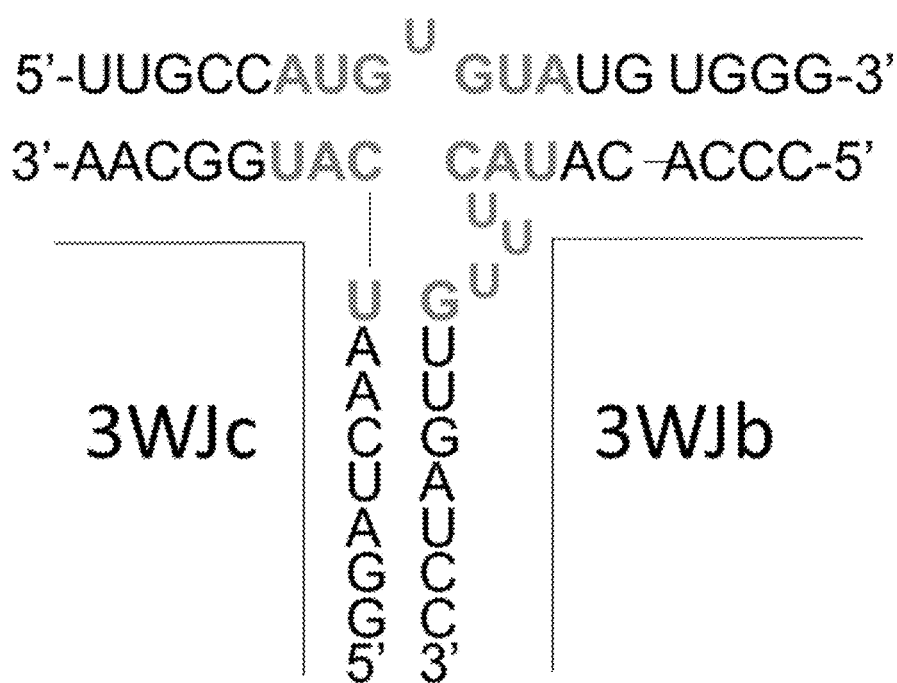
FIG. 2 shows a 3WJ domain (3WJa: UUGCCAUGU-GUAUGUGGG (SEQ ID NO: 119), 3WJb: CCCACAUA-CUUUGUUGAUCC (SEQ ID NO: 124), and 3WJc: GGAUCAAUCAUGGCAA (SEQ ID NO: 118)) in accordance with another embodiment of the present disclosure.
Figure 3:
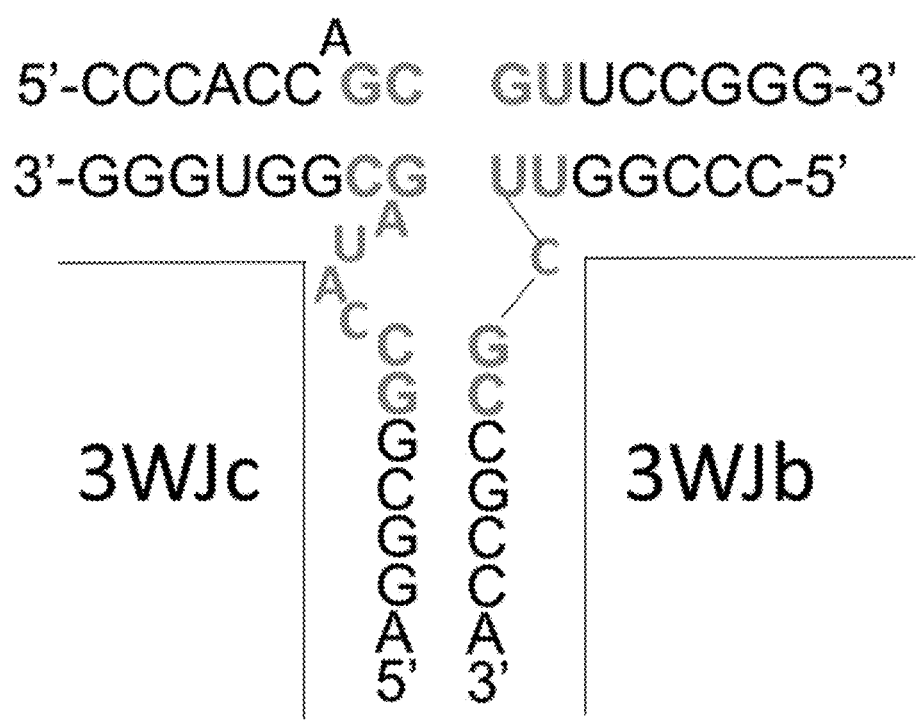
FIG. 3 shows a 3WJ domain (3WJa: CCCACCAGCGUUCCGGG (SEQ ID NO: 4), 3WJb: CCCGGUUCGCCGCCA (SEQ ID NO: 5), and 3WJc: ΔGGCGGCCAUAGCGGUGGG (SEQ ID NO: 6)) in accordance with another embodiment of the present disclosure.
Figure 7:
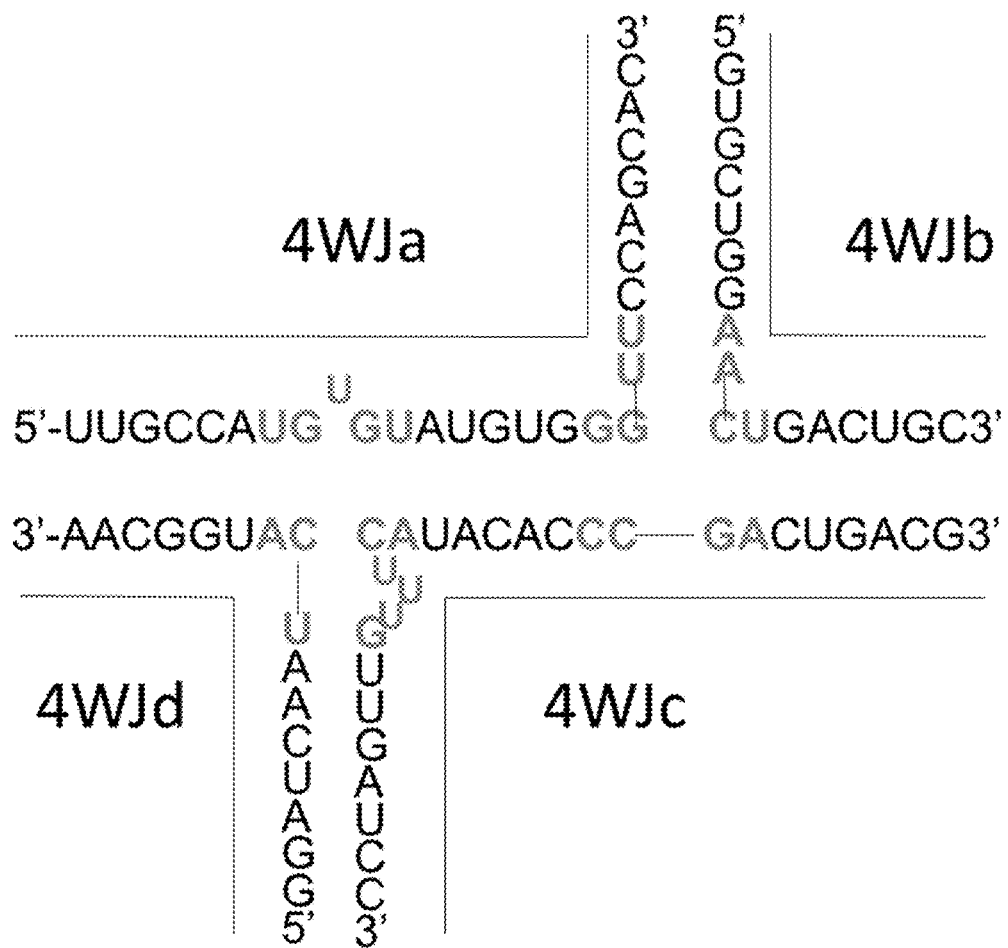
FIG. 7 shows a 4WJ domain (4WJa: UUG CCA UGU GUA UGU GGG UUC CAG CAC (SEQ ID NO: 103), 4WJb: GUG CUG GAA CUG ACU GC (SEQ ID NO: 104), 4WJc: GCA GUC ΔGC CCA CAU ACU UUG UUG AUC C (SEQ ID NO: 105), and 4WJd: GGA UCA AUC AUG GCAA (SEQ ID NO: 106)) in accordance with another embodiment of the present disclosure.

Table 1 shows examples of 3WJ, 4WJ, and 5WJ sequences in accordance with some embodiments of the present disclosure. The 3WJ, 4WJ, and 5WJ motifs can be designed using the bolded sequence forming a core structure, and extending the arms with duplexes to enhance its thermodynamic stability. The three fragments co-assembled into the 3WJ structure with extraordinary speed and affinity via a two-step reaction mechanism [ref1]. For example, FIGS. 2 and 3 show a 3WJ motif formed by SEQ ID NO: 118, 119, and 124 (Construct #1, $\Delta G = -27.3$ Kcal/mol) and a 3WJ motif formed by SEQ ID NO: 4-6 (Construct #2, $\Delta G = -35.8$ Kcal/mol), respectively. FIGS. 6 and 7 show a 4WJ motif formed by SEQ ID NO: 125-128 (Construct #3, $\Delta G = -143.7$ Kcal/mol) and a 4WJ motif formed by SEQ ID NO: 103-106 (Construct #57, $\Delta G = -62.7$ Kcal/mol). FIG. 9 shows a 5WJ motif formed by SEQ ID NO: 107-111 (Construct #58, $\Delta G = -188.7$ Kcal/mol).

TABLE 1

(The nucleotides involved in core structures are in bold.)

| | | SEQ ID NO: |
|---|---|---|
| Construct #1 | Sequence ($\Delta G = -27.1$ Kcal/mol) | |
| 3WJa | 5'-AUUGCCAUGUGUAUGUGGG-3' | 1 |
| 3WJb | 5'-CCCACAUACUUUGUUGAU-3' | 2 |
| 3WJc | 5'-GUCAAUCAUGGCAA-3' | 3 |
| Construct #2 | Sequence ($\Delta G = -35.8$ Kcal/mol) | |
| 3WJa | 5'-CCCACCAGCGUUCCGGG-3' | 4 |
| 3WJb | 5'-CCCGGUUCGCCGCCA-3' | 5 |
| 3WJc | 5'-AGGCGGCCAUAGCGGUGGG-3' | 6 |
| Construct #3 | Sequence ($\Delta G = -143.7$ Kcal/mol) | |
| 4WJa | 5'-UUA GGU AAA GCC ACC UGC AGG UGC UAC CGA UGU AAU UCAA-3' | 7 |
| 4WJb | 5'-UUG AAU UAC AUC GGU AGC ACG GGC UGU GCG AGG CUG AAC AG-3' | 8 |
| 4WJc | 5'-CUG UUC AGC CUC GCA CAG CCA GCA CGC ACC UGA AUA GG-3' | 9 |
| 4WJd | 5'-CCU AUU CAG GUG CGU GCU GGG CUG GCA GGU GGC UUU ACC UAA-3' | 102 |
| Construct #57 | Sequence ($\Delta G = -62.7$ Kcal/mol) | |
| 4WJa | 5'-UUG CCA UGU GUA UGU GGG UUC CAG CAC-3' | 103 |
| 4WJb | 5'-GUG CUG GAA CUG ACU GC-3' | 104 |
| 4WJc | 5'-GCA GUC AGC CCA CAU ACU UUG UUG AUC C-3' | 105 |
| 4WJd | 5'-GGA UCA AUC AUG GCAA-3' | 106 |

TABLE 1-continued (The nucleotides involved in core structures are in bold.)

| Construct #58 | Sequences (ΔG = -188.7 Kcal/mol) | SEQ ID No: |
|---|---|---|
| 5WJa | GAGUAUAUGUUAGGCCUGGGUGA GUC CUU GCG UCUUCUACCG | 107 |
| 5WJb | CGGUAGAAGACGCAAGGACUU GCU AGU UGU GGU ACU GUU CCC- | 108 |
| 5WJc | GGGAACAGUACCACAACUAGU GUC CCG GGA UAG GGA CAU AC | 109 |
| 5WJd | UGUAUGUCCCUAUCCCGGGAU GCUCCGCAUGAAUACAGC- | 110 |
| 5WJe | GCUGUAUUCAUGCGGAGU GCCCAGGCCUAACAUAUACUC | 111 |

| Construct #4 | Sequence (ΔG = -35.4 Kcal/mol) | SEQ ID NO: |
|---|---|---|
| 3WJa | 5'-GCAAUAGUAUGGCACAUGUGC-3' | 10 |
| 3WJb | 5'-GCACAUGUCACGGGGUAGG-3' | 11 |
| 3WJc | 5'-CCUACCCUCUUACUAUUGC-3' | 12 |

| Construct #5 | Sequence (ΔG = -31.9 Kcal/mol) | SEQ ID NO: |
|---|---|---|
| 3WJa | 5'-CUUGUCAUGGUAUGUUGCC-3' | 13 |
| 3WJb | 5'-GGCACAUACUUUGUUGAUAGG-3' | 2 |
| 3WJc | 5'-CCUGUCAAUCAUGGCAAG-3' | 3 |

| Construct #6 | Sequence (ΔG = -31.9 Kcal/mol) | SEQ ID NO: |
|---|---|---|
| 3WJa | 5'-CUUGUCAUGGUAUGUUGCC-3' | 13 |
| 3WJb | 5'-GGCACAUACUUGUUGAUAGG-3' | 14 |
| 3WJc | 5'-CCUGUCAAUCAUGGCAAG-3' | 3 |

| Construct #7 | Sequence (ΔG = -31.7 Kcal/mol) | SEQ ID NO: |
|---|---|---|
| 3WJa | 5'-CUUGUCAUGGUAUGUUGCC-3' | 13 |
| 3WJb | 5'-GGCACAUACUGUUGAUAGG-3' | 15 |
| 3WJc | 5'-CCUGUCAAUCAUGGCAAG-3' | 3 |

| Construct #8 | Sequence (ΔG = -31.4 Kcal/mol) | SEQ ID NO: |
|---|---|---|
| 3WJa | 5'-CUUGUCAUGGUAUGUUGCC-3' | 13 |
| 3WJb | 5'-GGCACAUACGUUGAUAGG-3' | 16 |
| 3WJc | 5'-CCUGUCAAUCAUGGCAAG-3' | 3 |

| Construct #9 | Sequence (ΔG = -32.5 Kcal/mol) | SEQ ID NO: |
|---|---|---|
| 3WJa | 5'-CUUGUCAUGUGUAUGUUGCC-3' | 1 |
| 3WJb | 5'-GGCACAUACUUGUUGAUAGG-3' | 14 |
| 3WJc | 5'-CCUGUCAAUCAUGGCAAG-3' | 3 |

| Construct #10 | Sequence (ΔG = -32.3 Kcal/mol) | SEQ ID NO: |
|---|---|---|
| 3WJa | 5'-CUUGUCAUGUGUAUGUUGCC-3' | 1 |
| 3WJb | 5'-GGCACAUACUGUUGAUAGG-3' | 15 |
| 3WJc | 5'-CCUGUCAAUCAUGGCAAG-3' | 3 |

| Construct #11 | Sequence (ΔG = -32.0 Kcal/mol) | SEQ ID NO: |
|---|---|---|
| 3WJa | 5'-CUUGUCAUGUGUAUGUUGCC-3' | 1 |
| 3WJb | 5'-GGCACAUACGUUGAUAGG-3' | 16 |
| 3WJc | 5'-CCUGUCAAUCAUGGCAAG-3' | 3 |

TABLE 1-continued (The nucleotides involved in core structures are in bold.)

| Construct #12 | Sequence (ΔG = −29.2 Kcal/mol) | SEQ ID NO: |
|---|---|---|
| 3WJa | 5'-UUGUCAUGGUAUGUUGCC-3' | 17 |
| 3WJb | 5'-GGCACAUACUGUUGAUAGG-3' | 15 |
| 3WJc | 5'-CCUGUCAAUCAUGGCAA-3' | 18 |
| Construct #13 | Sequence (ΔG = −25.9 Kcal/mol) | SEQ ID NO: |
| 3WJa | 5'-UUGUCAUGGUAUGUUGC-3' | 19 |
| 3WJb | 5'-GCACAUACUGUUGAUAGG-3' | 20 |
| 3WJc | 5'-CCUGUCAAUCAUGGCAA-3' | 18 |
| Construct #14 | Sequence (ΔG = −22.6 Kcal/mol) | SEQ ID NO: |
| 3WJa | 5'-UUGUCAUGGUAUGUUGC-3' | 19 |
| 3WJb | 5'-GCACAUACUGUUGAUAG-3' | 21 |
| 3WJc | 5'-CUGUCAAUCAUGGCAA-3' | 22 |
| Construct #15 | Sequence (ΔG = −21.7 Kcal/mol) | SEQ ID NO: |
| 3WJa | 5'-UGUCAUGGUAUGUUGC-3' | 23 |
| 3WJb | 5'-GCACAUACUGUUGAUAG-3' | 21 |
| 3WJc | 5'-CUGUCAAUCAUGGCA-3' | 24 |
| Construct #16 | Sequence (ΔG = −17.8 Kcal/mol) | SEQ ID NO: |
| 3WJa | 5'-UGUCAUGGUAUGUUG-3' | 25 |
| 3WJb | 5'-CACAUACUGUUGAUAG-3' | 26 |
| 3WJc | 5'-CUGUCAAUCAUGGCA-3' | 24 |
| Construct #17 | Sequence (ΔG = −15.0 Kcal/mol) | SEQ ID NO: |
| 3WJa | 5'-UGUCAUGGUAUGUUG-3' | 25 |
| 3WJb | 5'-CACAUACUGUUGAUA-3' | 27 |
| 3WJc | 5'-UGUCAAUCAUGGCA-3' | 28 |
| Construct #18 | Sequence (ΔG = −13.5 Kcal/mol) | SEQ ID NO: |
| 3WJa | 5'-GUCAUGGUAUGUUG-3' | 29 |
| 3WJb | 5'-CACAUACUGUUGAUA-3' | 27 |
| 3WJc | 5'-UGUCAAUCAUGGC-3' | 30 |
| Construct #19 | Sequence (ΔG = −13.3 Kcal/mol) | SEQ ID NO: |
| 3WJa | 5'-GUCAUGGUAUGUU-3' | 31 |
| 3WJb | 5'-ACAUACUGUUGAUA-3' | 32 |
| 3WJc | 5'-UGUCAAUCAUGGC-3' | 30 |
| Construct #20 | Sequence (ΔG = −10.10 Kcal/mol) | SEQ ID NO: |
| 3WJa | 5'-GUCAUGGUAUGUU-3' | 31 |
| 3WJb | 5'-ACAUACUGUUGAU-3' | 33 |
| 3WJc | 5'-GUCAAUCAUGGC-3' | 34 |

TABLE 1-continued (The nucleotides involved in core structures are in bold.)

| Construct #21 | Sequence | SEQ ID NO: |
|---|---|---|
| 3WJa | 5'-UCAUGGUAUGUU-3' | 35 |
| 3WJb | 5'-ACAUACUGUUGAU-3' | 33 |
| 3WJc | 5'-GUCAAUCAUGG-3' | 36 |

| Construct #22 | Sequence | SEQ ID NO: |
|---|---|---|
| 3WJa | 5'-UCAUGGUAUG-3' | 37 |
| 3WJb | 5'-CAUACUGUUGAU-3' | 38 |
| 3WJc | 5'-GUCAAUCAUGG-3' | 36 |

| Construct #23 | Sequence | SEQ ID NO: |
|---|---|---|
| 3WJa | 5'-UCAUGGUAUG-3' | 37 |
| 3WJb | 5'-CAUACUGUUGA-3' | 39 |
| 3WJc | 5'-UCAAUCAUGG-3' | 40 |

| Construct #24 | Sequence (ΔG = −32.00 Kcal/mol) | SEQ ID NO: |
|---|---|---|
| 3WJa | 5'-CAAUAGUAUGGCACAUGUGC-3' | 41 |
| 3WJb | 5'-GCACAUGUCACGGGGUAGG-3' | 11 |
| 3WJc | 5'-CCUACCCUCUUACUAUUG-3' | 42 |

| Construct #25 | Sequence (ΔG = −28.10 Kcal/mol) | SEQ ID NO: |
|---|---|---|
| 3WJa | 5'-CAAUAGUAUGGCACAUGUG-3' | 43 |
| 3WJb | 5'-CACAUGUCACGGGGUAGG-3' | 44 |
| 3WJc | 5'-CCUACCCUCUUACUAUUG-3' | 42 |

| Construct #26 | Sequence (ΔG = −29.30 Kcal/mol) | SEQ ID NO: |
|---|---|---|
| 3WJa | 5'-CAAUAGUAUGGCACAUGUG-3' | 43 |
| 3WJb | 5'-CACAUGUCACGGGGUAGG-3' | 45 |
| 3WJc | 5'-CUACCCUCUUACUAUUG-3' | 46 |

| Construct #27 | Sequence (ΔG = −26.70 Kcal/mol) | SEQ ID NO: |
|---|---|---|
| 3WJa | 5'-AAUAGUAUGGCACAUGUG-3' | 47 |
| 3WJb | 5'-CACAUGUCACGGGGUAGG-3' | 45 |
| 3WJc | 5'-CUACCCUCUUACUAUU-3' | 48 |

| Construct #28 | Sequence (ΔG = −23.40 Kcal/mol) | SEQ ID NO: |
|---|---|---|
| 3WJa | 5'-AAUAGUAUGGCACAUGU-3' | 49 |
| 3WJb | 5'-ACAUGUCACGGGGUAGG-3' | 50 |
| 3WJc | 5'-CUACCCUCUUACUAUU-3' | 48 |

| Construct #29 | Sequence (ΔG = −20.10 Kcal/mol) | SEQ ID NO: |
|---|---|---|
| 3WJa | 5'-AAUAGUAUGGCACAUGU-3' | 49 |
| 3WJb | 5'-ACAUGUCACGGGGUAG-3' | 51 |
| 3WJc | 5'-UACCCUCUUACUAUU-3' | 52 |

TABLE 1-continued (The nucleotides involved in core structures are in bold.)

| Construct #30 | Sequence (ΔG = -19.20 Kcal/mol) | SEQ ID NO: |
|---|---|---|
| 3WJa | 5'-AUAGUAUGGCACAUGU-3' | 53 |
| 3WJb | 5'-ACAUGUCACGGGGUAG-3' | 51 |
| 3WJc | 5'-UACCCUCUUACUAU-3' | 54 |

| Construct #31 | Sequence (ΔG = -18.20 Kcal/mol) | SEQ ID NO: |
|---|---|---|
| 3WJa | 5'-AUAGUAUGGCACAUG-3' | 55 |
| 3WJb | 5'-CAUGUCACGGGGUAG-3' | 56 |
| 3WJc | 5'-UACCCUCUUACUAU-3' | 54 |

| Construct #32 | Sequence (ΔG = -13.10 Kcal/mol) | SEQ ID NO: |
|---|---|---|
| 3WJa | 5'-AUAGUAUGGCACAUG-3' | 55 |
| 3WJb | 5'-CAUGUCACGGGGUA-3' | 57 |
| 3WJc | 5'-ACCCUCUUACUAU-3' | 58 |

| Construct #33 | Sequence (ΔG = -10.15 Kcal/mol) | SEQ ID NO: |
|---|---|---|
| 3WJa | 5'-UAGUAUGGCACAUG-3' | 59 |
| 3WJb | 5'-CAUGUCACGGGGUA-3' | 57 |
| 3WJc | 5'-ACCCUCUUACUA-3' | 60 |

| Construct #34 | Sequence (ΔG = -13.0 Kcal/mol) | SEQ ID NO: |
|---|---|---|
| 3WJa | 5'-UAGUAUGGCACAU-3' | 61 |
| 3WJb | 5'-AUGUCACGGGGUA-3' | 62 |
| 3WJc | 5'-CCCUCUUACUA-3' | 64 |

| Construct #35 | Sequence (ΔG = -16.0 Kcal/mol) | SEQ ID NO: |
|---|---|---|
| 3WJa | 5'-UAGUAUGGCACA-3' | 65 |
| 3WJb | 5'-UGUCACGGGG-3' | 66 |
| 3WJc | 5'-CCCUCUUACUA-3' | 64 |

| Construct #36 | Sequence (ΔG = -12.7 Kcal/mol) | SEQ ID NO: |
|---|---|---|
| 3WJa | 5'-UAGUAUGGCACA-3' | 65 |
| 3WJb | 5'-UGUCACGGG-3' | |
| 3WJc | 5'-CCUCUUACUA-3' | 68 |

| Construct #37 | Sequence (ΔG = -23.65 Kcal/mol) | SEQ ID NO: |
|---|---|---|
| 3WJa | 5'-CAAUAGUAUGGCACAUGUG-3' | 43 |
| 3WJb | 5'-CACAUGUCACGGGGUAG-3' | 69 |
| 3WJc | 5'-CUACCCUCUUACUAUUG-3' | 46 |

| Construct #38 | Sequence (ΔG = -19.40 Kcal/mol) | SEQ ID NO: |
|---|---|---|
| 3WJa | 5'-AAUAGUAUGGCACAUGUG-3' | 47 |
| 3WJb | 5'-CACAUGUCACGGGGUA-3' | 70 |
| 3WJc | 5'-UACCCUCUUACUAUU-3' | 52 |

TABLE 1-continued (The nucleotides involved in core structures are in bold.)

| Construct #39 | Sequence (ΔG = −15.40 Kcal/mol) | SEQ ID NO: |
|---|---|---|
| 3WJa | 5'-AUAGUAUGGCACAUG-3' | 55 |
| 3WJb | 5'-CAUGUCACGGGG-3' | 71 |
| 3WJc | 5'-CCCUCUUACUAU-3' | 72 |

| Construct #40 | Sequence | SEQ ID NO: |
|---|---|---|
| 3WJa | 5'-AGUAUGGCAC-3' | 73 |
| 3WJb | 5'-GUCACGGG-3' | |
| 3WJc | 5'-CCUCUUAC-3' | |

| Construct #41 | Sequence (ΔG = −34.40 Kcal/mol) | SEQ ID NO: |
|---|---|---|
| 3WJa | 5'-GCUAAUGUAUGUUGUCCG-3' | 76 |
| 3WJb | 5'-CGGACAGCAGGGGAGCGUGC-3' | 8 |
| 3WJc | 5'-GCACACUCUUGCAUUAGC-3' | 9 |

| Construct #42 | Sequence (ΔG = −25.30 Kcal/mol) | SEQ ID NO: |
|---|---|---|
| 3WJa | 5'-CUAAUGUAUGUUGUCC-3' | 77 |
| 3WJb | 5'-GGACAGCAGGGGAGCGUG-3' | 78 |
| 3WJc | 5'-CACACUCUUGCAUUAG-3' | 79 |

| Construct #43 | Sequence (ΔG = −16.40 Kcal/mol) | SEQ ID NO: |
|---|---|---|
| 3WJa | 5'-UAAUGUAUGUUGUC-3' | 80 |
| 3WJb | 5'-GACAGCAGGGGAGCGU-3' | 81 |
| 3WJc | 5'-ACACUCUUGCAUUA-3' | 82 |

| Construct #44 | Sequence (ΔG = −12.60 Kcal/mol) | SEQ ID NO: |
|---|---|---|
| 3WJa | 5'-AAUGUAUGUUGU-3' | 83 |
| 3WJb | 5'-ACAGCAGGGGAGCG-3' | 84 |
| 3WJc | 5'-CACUCUUGCAUU-3' | 85 |

| Construct #45 | Sequence | SEQ ID NO: |
|---|---|---|
| 3WJa | 5'-AUGUAUGUUG-3' | 86 |
| 3WJb | 5'-CAGCAGGGGAGC-3' | 87 |
| 3WJc | 5'-ACUCUUGCAU-3' | 88 |

| Construct #46 | Sequence (ΔG = −30.50 Kcal/mol) | SEQ ID NO: |
|---|---|---|
| 3WJa | 5'-GCUAAUGUAUGUGUCCG-3' | 7 |
| 3WJb | 5'-CGGACAGCAGGGAGCGUGC-3' | 89 |
| 3WJc | 5'-GCACACUCUUGCAUUAGC-3' | 9 |

| Construct #47 | Sequence (ΔG = −21.40 Kcal/mol) | SEQ ID NO: |
|---|---|---|
| 3WJa | 5'-CUAAUGUAUGUGUCC-3' | 90 |
| 3WJb | 5'-GGACAGCAGGGAGCGUG-3' | 91 |
| 3WJc | 5'-CACACUCUUGCAUUAG-3' | 79 |

TABLE 1-continued (The nucleotides involved in core structures are in bold.)

| Construct #48 | Sequence | SEQ ID NO: |
|---|---|---|
| 3WJa | 5'-UAAUGUAUGUGUGUC-3' | 92 |
| 3WJb | 5'-GACAGCAGGGAGCGU-3' | 93 |
| 3WJc | 5'-ACACUCUUGCAUUA-3' | 82 |
| Construct #49 | Sequence | SEQ ID NO: |
| 3WJa | 5'-AAUGUAUGUGUGU-3' | 94 |
| 3WJb | 5'-ACAGCAGGGAGCG-3' | 95 |
| 3WJc | 5'-CACUCUUGCAUU-3' | 96 |
| Construct #50 | Sequence | SEQ ID NO: |
| 3WJa | 5'-AUGUAUGUGUG-3' | 97 |
| 3WJb | 5'-CAGCAGGGAGC-3' | 98 |
| 3WJc | 5'-ACUCUUGCAU-3' | 88 |
| Construct #51 | Sequence (ΔG = -34.30 Kcal/mol) | SEQ ID NO: |
| 3WJa | 5'-GCUAAUGUAUGUUGUCCG-3' | 76 |
| 3WJb | 5'-CGGACAGCAGGGAGCGUGC-3' | 89 |
| 3WJc | 5'-GCACACUCUUGCAUUAGC-3' | 9 |
| Construct #52 | Sequence (ΔG = -25.20 Kcal/mol) | SEQ ID NO: |
| 3WJa | 5'-CUAAUGUAUGUUGUCC-3' | 77 |
| 3WJb | 5'-GGACAGCAGGGAGCGUG-3' | 91 |
| 3WJc | 5'-CACACUCUUGCAUUAG-3' | 79 |
| Construct #53 | Sequence (ΔG = -16.30 Kcal/mol) | SEQ ID NO: |
| 3WJa | 5'-UAAUGUAUGUUGUC-3' | 80 |
| 3WJb | 5'-GACAGCAGGGAGCGU-3' | 93 |
| 3WJc | 5'-ACACUCUUGCAUUA-3' | 82 |
| Construct #54 | Sequence (ΔG = -9.80 Kcal/mol) | SEQ ID NO: |
| 3WJa | 5'-AAUGUAUGUUGU-3' | 83 |
| 3WJb | 5'-ACAGCAGGGAGCG-3' | 95 |
| 3WJc | 5'-CACUCUUGCAUU-3' | 85 |
| Construct #55 | Sequence | SEQ ID NO: |
| 3WJa | 5'-AUGUAUGUUG-3' | 86 |
| 3WJb | 5'-CAGCAGGGAGC-3' | 98 |
| 3WJc | 5'-ACUCUUGCAU-3' | 88 |
| Construct #56 | Sequence | SEQ ID NO: |
| 3WJa | 5'-UAUAGGCUGUGCA-3' | 99 |
| 3WJb | 5'-UGACAGGUUGU-3' | 100 |
| 3WJc | 5'-GCAAUACUAUA-3' | 101 |

Example 1

3WJ-Circular RNA Production

Figure 4:
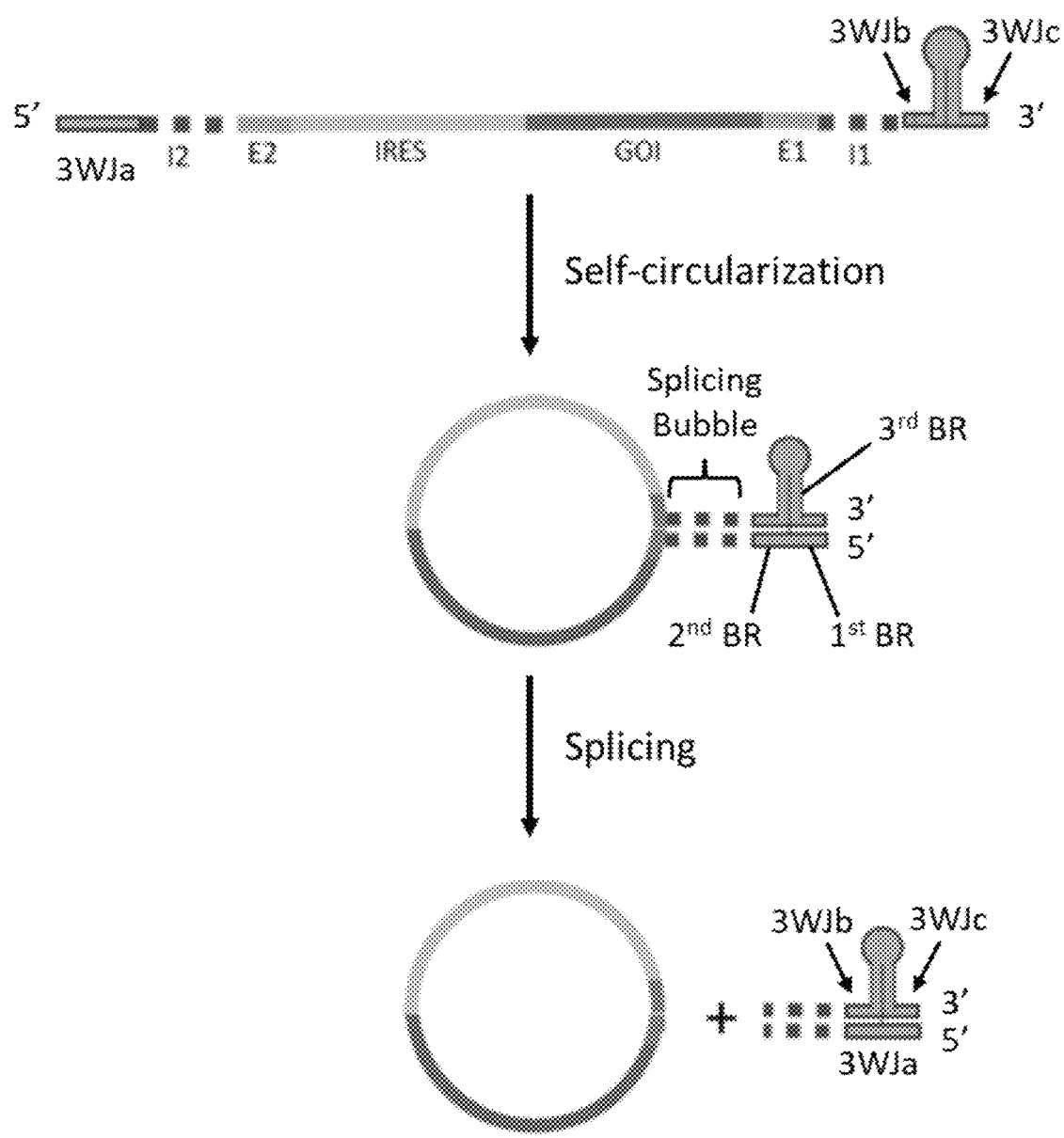
FIG. 4 shows a method of making circularized RNA (circRNA) in accordance with one embodiment of the present disclosure.
Figure 5:
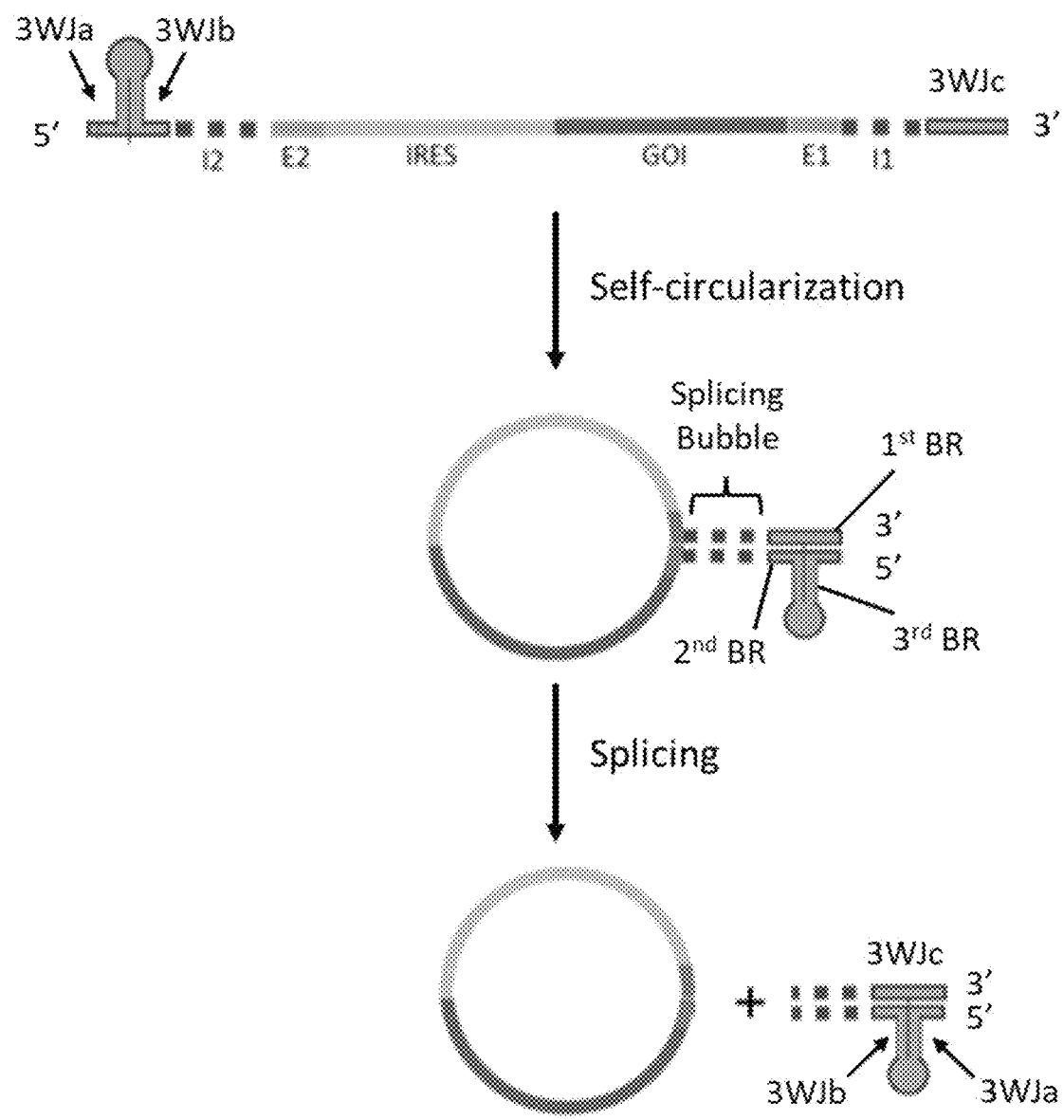
FIG. 5 shows a method of making circularized RNA (circRNA) in accordance with another embodiment of the present disclosure.

FIG. 4 shows that thermodynamically stable 3WJ (ΔG=−27.7Kcal/mol) can be formed by using 3WJa at the 5' end and 3WJb and 3WJc at the 3' end, of the precursor circular RNA sequence and then performed a self-splicing reaction to generate circular RNA with Exon scars inside the circRNA with high efficiency. An internal ribosome entry site (IRES), e.g., from encephalomyocarditis virus (EMCV), a gene of interest (GOI), such as an enhanced green fluorescent protein (eGFP), can be inserted and may be flanked by two short regions corresponding to exon fragments (E1 and E2) of the permuted intron-exon (PIE) construct between the 3' and 5' introns of the permuted group I catalytic intron (I1 and I2), e.g., from the thymidylate synthase (Td) gene of the T4 phage. Similarly, as shown in FIG. 5, thermodynamically stable 3WJ can be formed by using 3WJa and 3WJb at the 5' end and 3WJc at the 3' end.

Precursor RNA was synthesized by in vitro transcription in conditions known in the art using the plasmid DNA linearized after the 3' end of the precursor RNA design and then heated in the presence of magnesium ions and GTP to promote self-circularization before or after purification of the crude IVT reaction products. During self-circularization, a first branch ($1^{st}$ BR) of the 3WJ domain may be formed from a 5' portion of the 3WJa sequence and a 3' portion of the 3WJc sequence, a second branch ($2^{nd}$ BR) of the 3WJ domain may be formed from a 3' portion of the 3WJa sequence and a 5' portion of the 3WJb sequence, and a third branch ($3^{rd}$ BR) of the 3WJ domain may be formed from a 3' portion of the 3WJb sequence and a 5' portion of the 3WJc sequence. Thus, 3WJ domain can lock the splicing bubble to facilitate correct folding and splicing efficiency. In certain embodiments, the $3^{rd}$ BR may be formed prior to self-circularization. For example, a 3' portion of the 3WJb sequence and a 5' portion of the 3WJc sequence may base pair to form the $3^{rd}$ BR before circularization takes place. In certain embodiments, the third branch may be formed during self-circularization. Each of the branches may contain a plurality of RNA nucleotide pairs that form canonical Watson-Crick bonds. During splicing, the 3' hydroxyl group of a guanosine nucleotide engages in a transesterification reaction at the 5' splice site. The 5' intron half (I1) is excised, and the freed hydroxyl group at the end of the intermediate engages in a second transesterification at the 3' splice site, resulting in circularization of the intervening region and excision of the 3' intron (I2) together with 3WJ domain.

4WJ-Circular RNA Production

Figure 8:
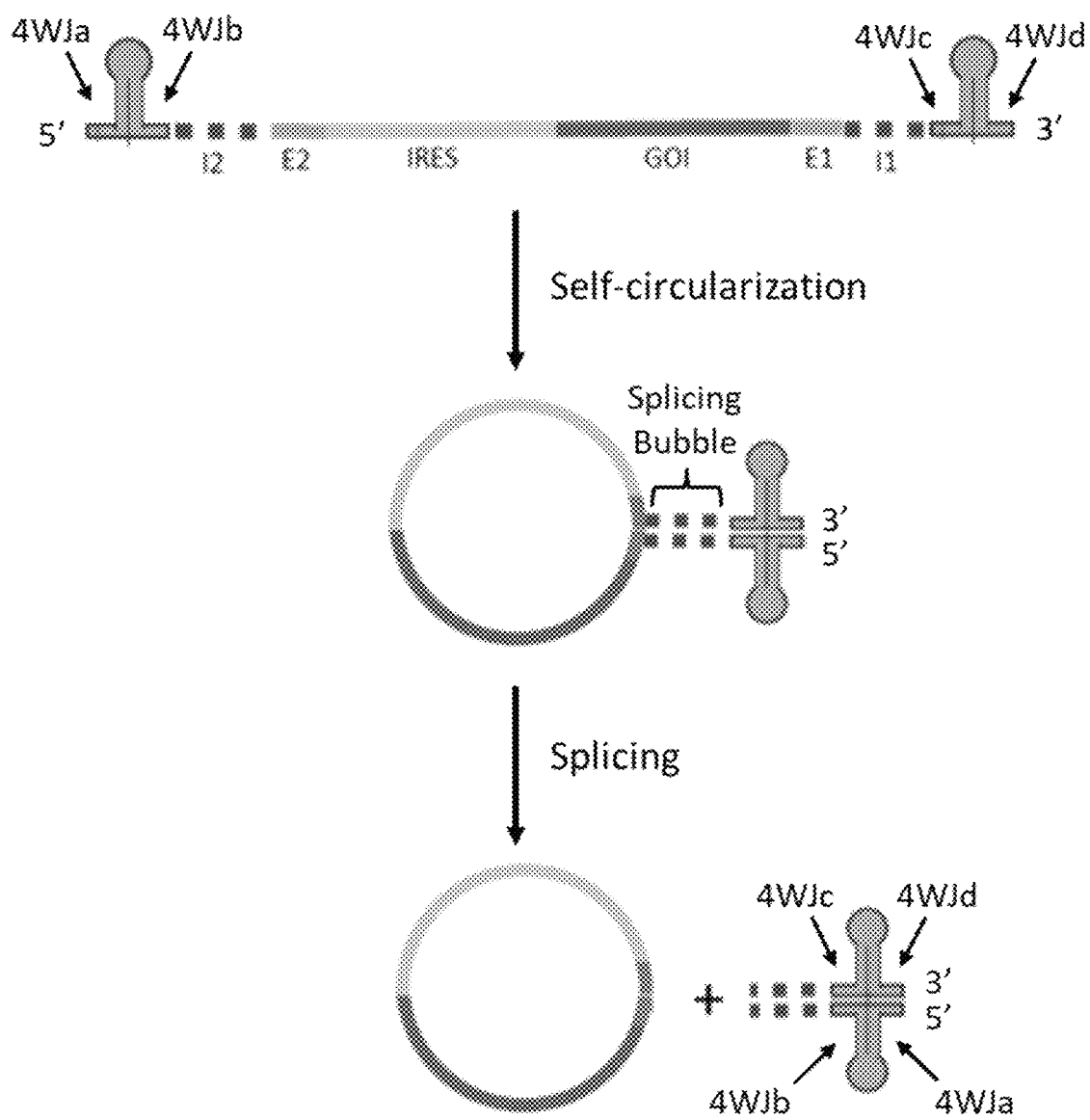
FIG. 8 shows a method of making circularized RNA (circRNA) in accordance with one embodiment of the present disclosure.

FIG. 8 shows that thermodynamically stable 4WJ (Construct #57, ΔG=−62.7Kcal/mol) can be formed by using 4WJa and 4WJb at the 5' end and 4WJc and 4WJd at the 3' end, of the precursor circular RNA sequence and then performed a self-splicing reaction to generate circular RNA with Exon scars inside the circRNA with high efficiency. An internal ribosome entry site (IRES), e.g., from encephalomyocarditis virus (EMCV), a gene of interest (GOI), such as an enhanced green fluorescent protein (eGFP), can be inserted and may be flanked by two short regions corresponding to exon fragments (E1 and E2) of the permuted intron-exon (PIE) construct between the 3' and 5' introns of the permuted group I catalytic intron (I1 and I2), e.g., from the thymidylate synthase (Td) gene of the T4 phage.

5WJ-Circular RNA Production

Figure 10:
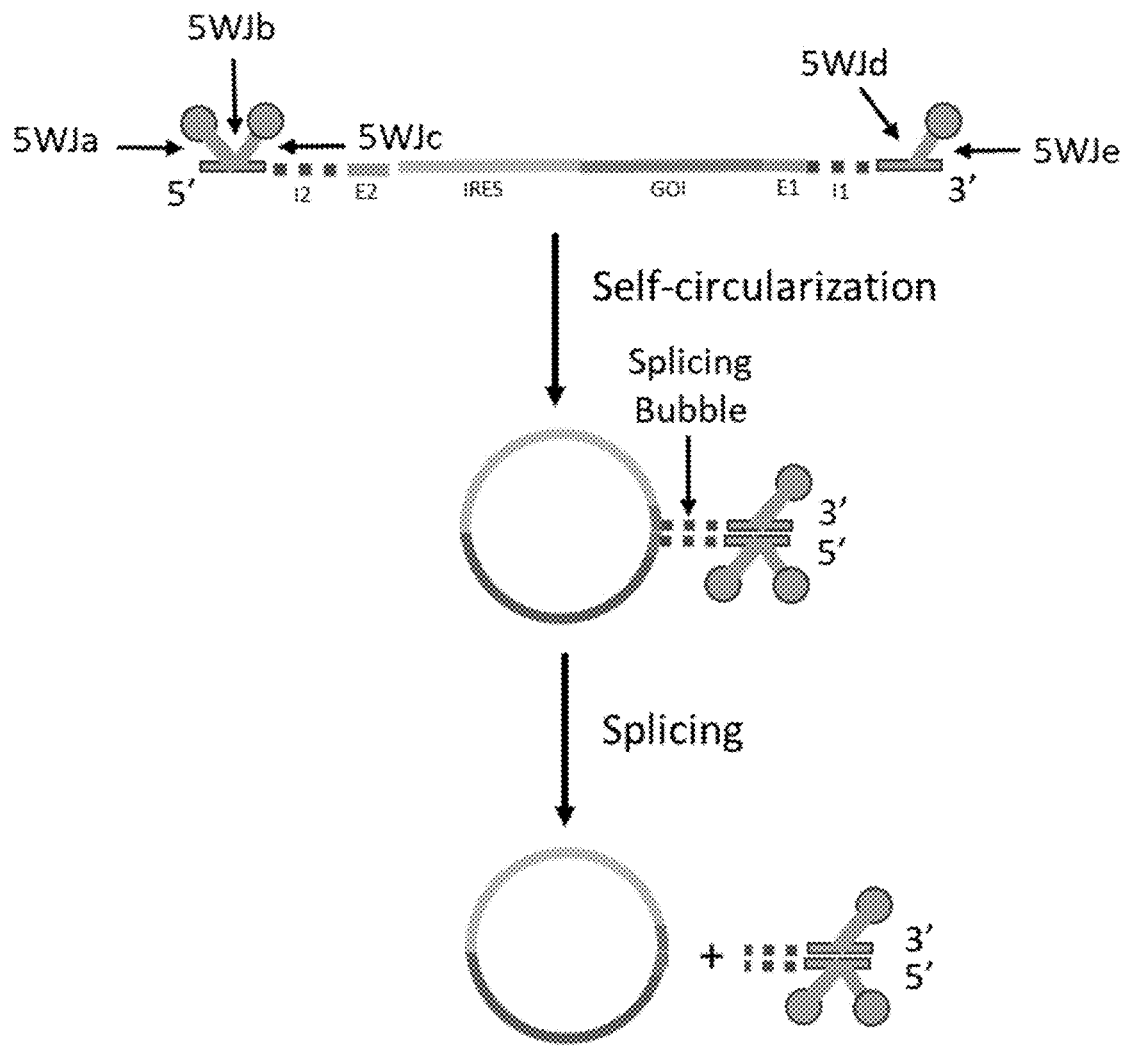
FIG. 10 shows a method of making circularized RNA (circRNA) in accordance with one embodiment of the present disclosure.
Figure 11:
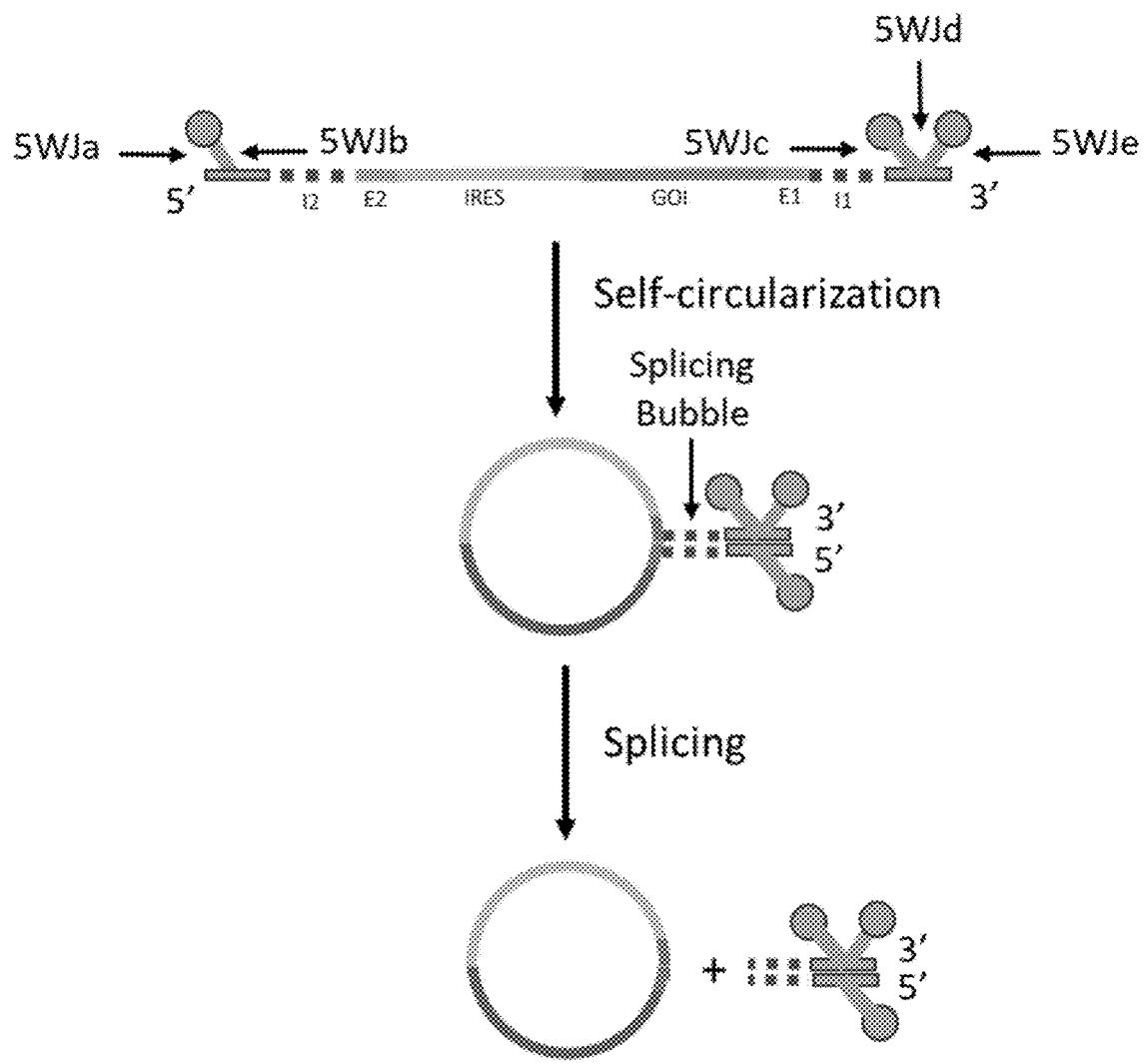
FIG. 11 shows a method of making circularized RNA (circRNA) in accordance with another embodiment of the present disclosure.

FIG. 10 shows that thermodynamically stable 5WJ (Construct #58, ΔG=−188.7 Kcal/mol) can be formed by using 5WJa, 5WJb, and 4WJc at the 5' end and 5WJd and 5WJe at the 3' end, of the precursor circular RNA sequence and then performed a self-splicing reaction to generate circular RNA with Exon scars inside the circRNA with high efficiency. An internal ribosome entry site (IRES), e.g., from encephalomyocarditis virus (EMCV), a gene of interest (GOI), such as an enhanced green fluorescent protein (eGFP), can be inserted and may be flanked by two short regions corresponding to exon fragments (E1 and E2) of the permuted intron-exon (PIE) construct between the 3' and 5' introns of the permuted group I catalytic intron (I1 and I2), e.g., from the thymidylate synthase (Td) gene of the T4 phage. Similarly, as shown in FIG. 11, thermodynamically stable 5WJ can be formed by using 5WJa and 5WJb at the 5' end and 5WJc, 5WJd, and 5WJe at the 3' end.

Example 2

3WJ-Circular RNA Design Improves RNA Circularization Efficiency

To compare the RNA circularization efficiency of 3WJ-circular RNA design and conventual homology RNA design, precursor RNAs synthesized by in vitro transcription from a vector encoding eGFP with a 3WJa element at the 5' end and 3WJb/3WJc at the 3' end (FIG. 4) and precursor RNAs synthesized by in vitro transcription from a vector encoding eGFP with a 5' homology arm at the 5' end and a 3' homology arm at the 3' end were analyzed by gel electrophoresis.

Figure 12:
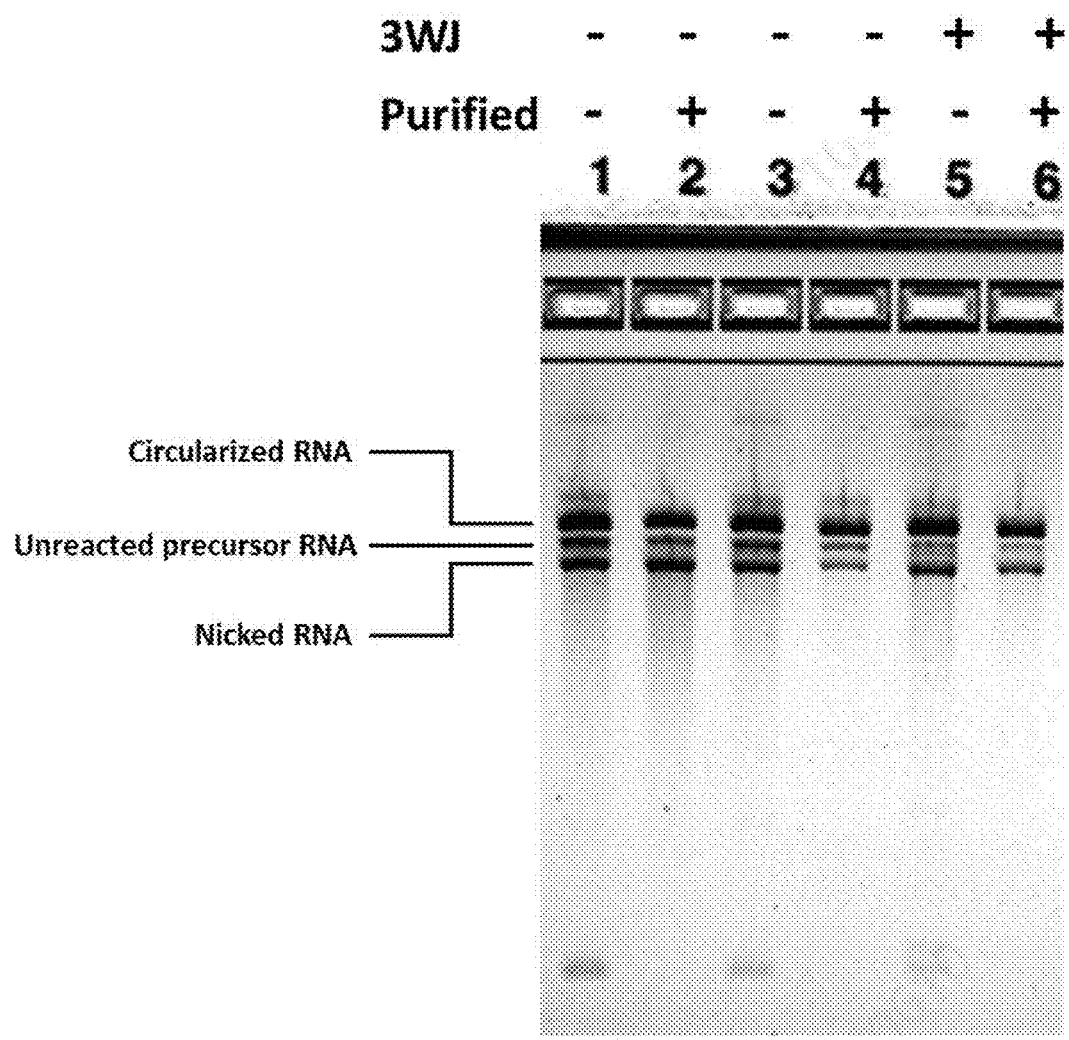
FIG. 12 shows purity of circRNA prepared by methods in accordance with some embodiments of the present disclosure.
Figure 13:
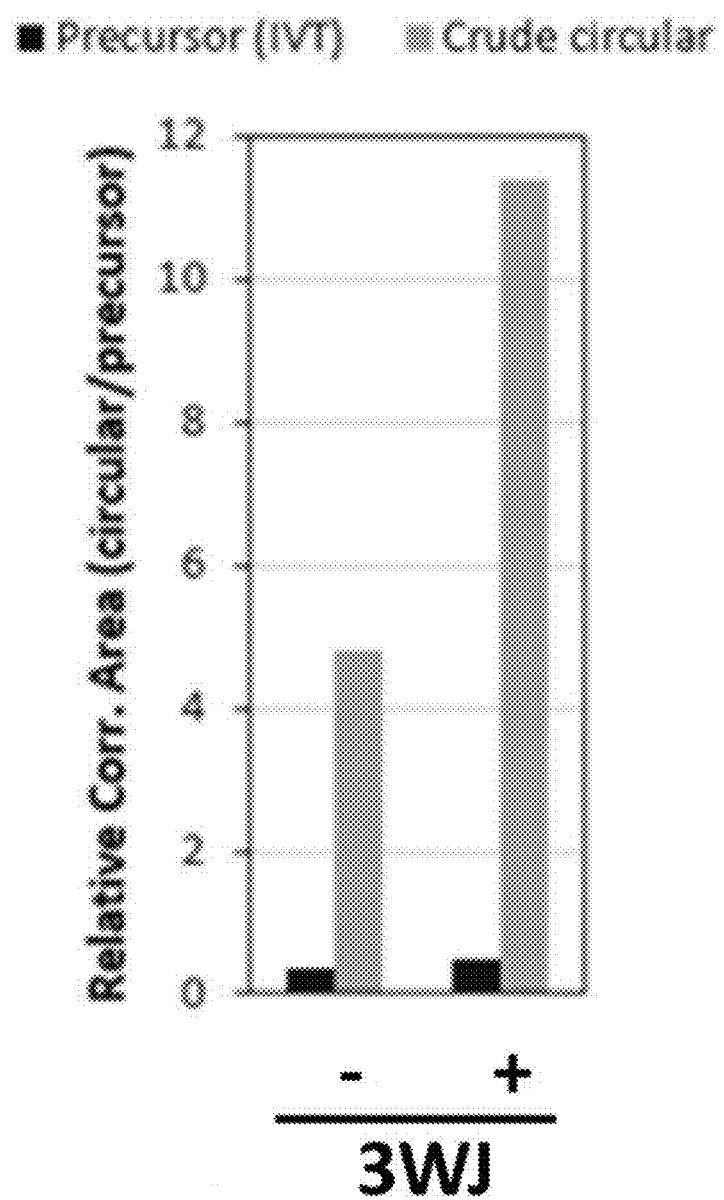
FIG. 13 shows circRNA/precursor RNA ratio of circRNA prepared by methods in accordance with some embodiments of the present disclosure.
Figure 14B:
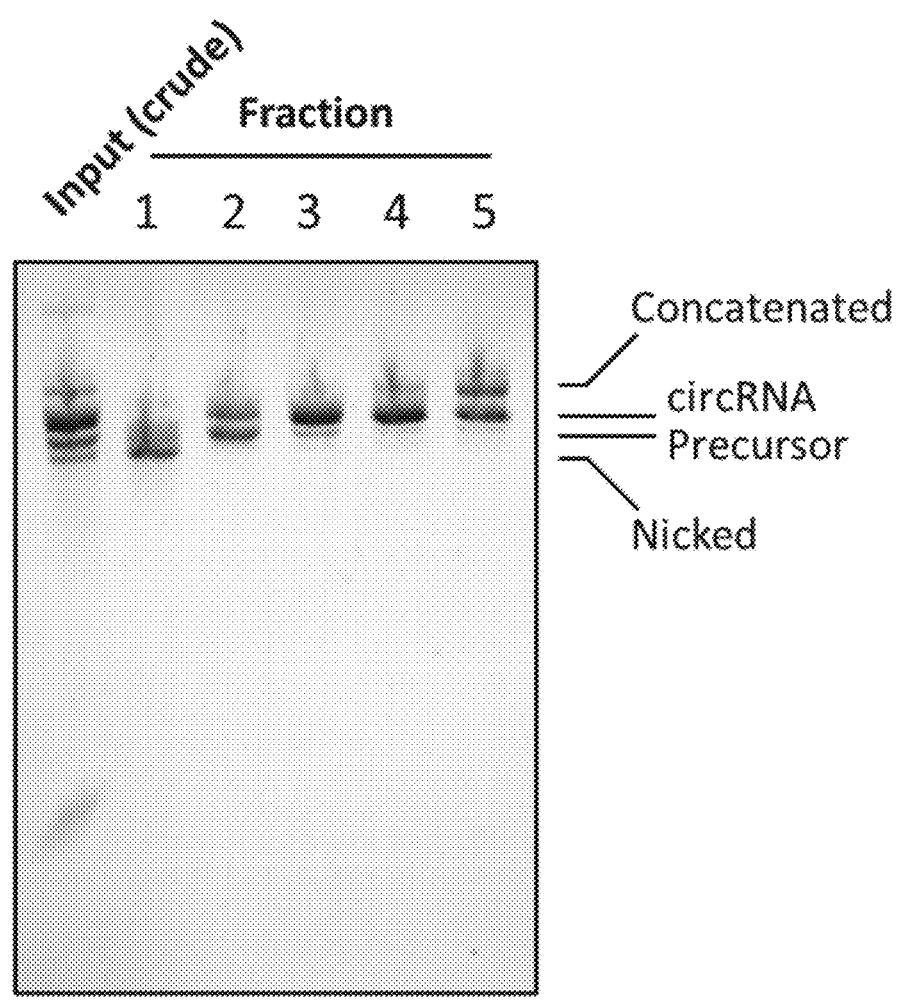
FIG. 14B shows purity of circRNA prepared by methods in accordance with one embodiment of the present disclosure.
Figure 15A:
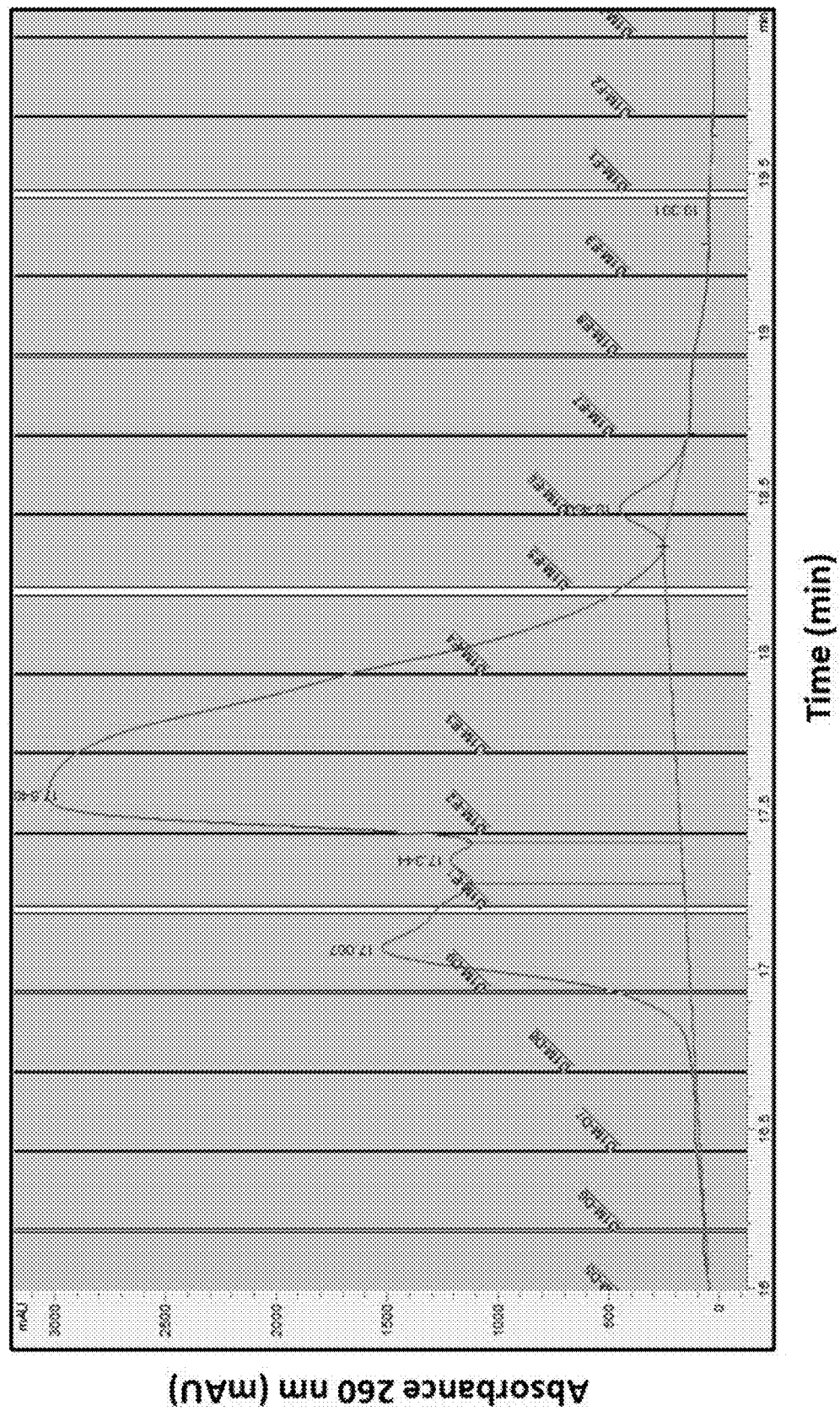
FIG. 15A shows HPLC-purified circRNA prepared by methods in accordance with another embodiment of the present disclosure.
Figure 15B:
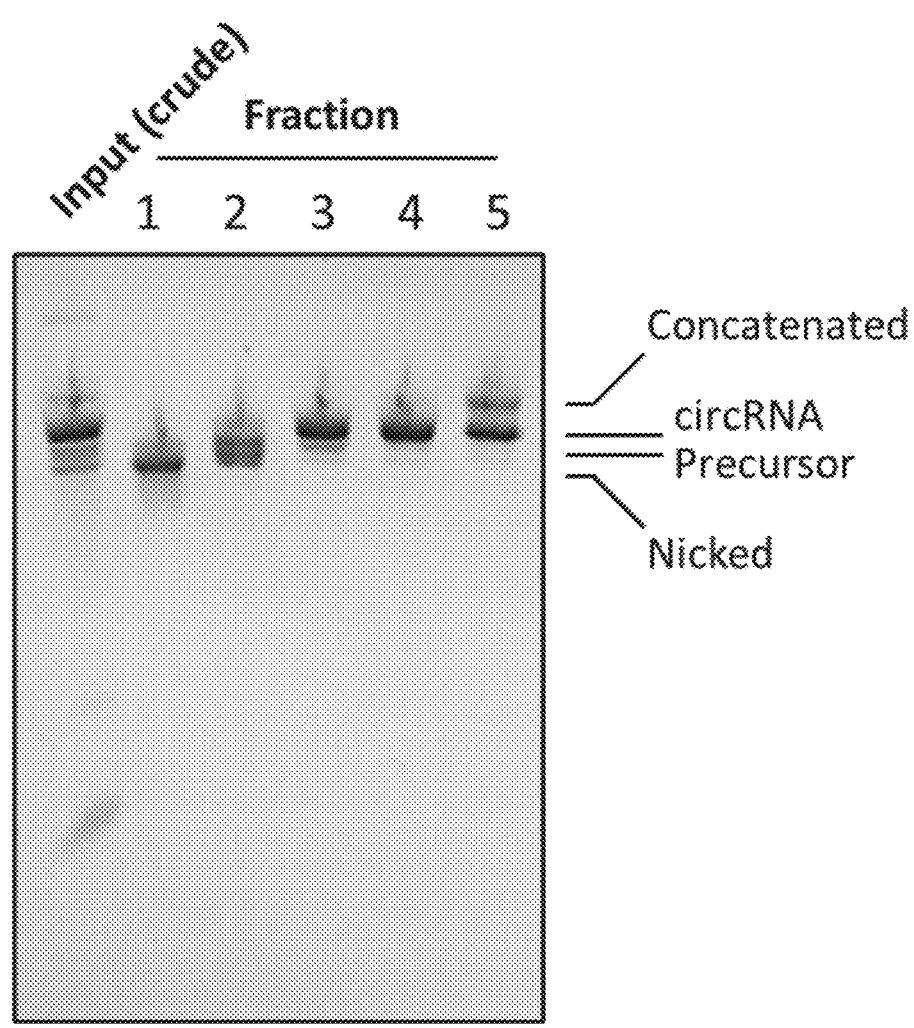
FIG. 15B shows purity of circRNA prepared by methods in accordance with another embodiment of the present disclosure.

FIG. 12 shows that crude circular RNA formed by conventual homology RNA design without column purification (Lanes 1 and 3) (3WJ−) yielded ~30% unreacted precursor RNA, as shown by the distinct middle bands, and yielded ~50% of circularized RNA, as shown by the top bands. In contrast, circular RNA formed by 3WJ-circular RNA design without column purification (Lane 5) (3WJ+) yielded ~80% circularized RNA, as shown by the top band, and yielded ~5% unreacted precursor RNA and ~15% of nicked RNA, as shown by the middle band and the lower band, respectively. In addition, 3WJ-circular RNA that yielded less unreacted precursor RNA were purified with ion pairing reverse phase HPLC (Lane 6) more efficiently than homology-circular RNA that yielded more unreacted precursor RNA (Lanes 2 and 4). FIG. 13 shows that 3WJ-circular RNA design (3WJ+) yielded higher ratio of circRNA/precursor RNA than conventional homology circular RNA design (3WJ−) as determined by bioanalyzer. CircRNA generated by 3WJ-circular RNA design can be readily purified by reverse phase HPLC. To compare the purity of circRNA produced with or without 3WJ, circular RNA encoding eGFP was generated with homology arm, e.g., without 3WJ (3WJ (−)), and the crude product was fractionated using reverse phase HPLC (FIG. 14A) then analyzed via agarose gel electrophoresis (FIG. 14B). In contrast, circular RNA encoding eGFP was generated using a 3WJ (3WJ (+)) and the crude product was fractionated using reverse phase HPLC (FIG. 15A) then analyzed via agarose gel electrophoresis (FIG. 15B). These results show the abundance of precursor RNA (third peak, at approximately 17.3 min) is decreased when produced using a 3WJ, and the purity of circular RNA fractions is improved (see fractions 3 and 4). These results suggest that 3WJ-circular RNA design improves RNA circularization and purification efficiency as compared with conventional homology arm design.

Figure 20:
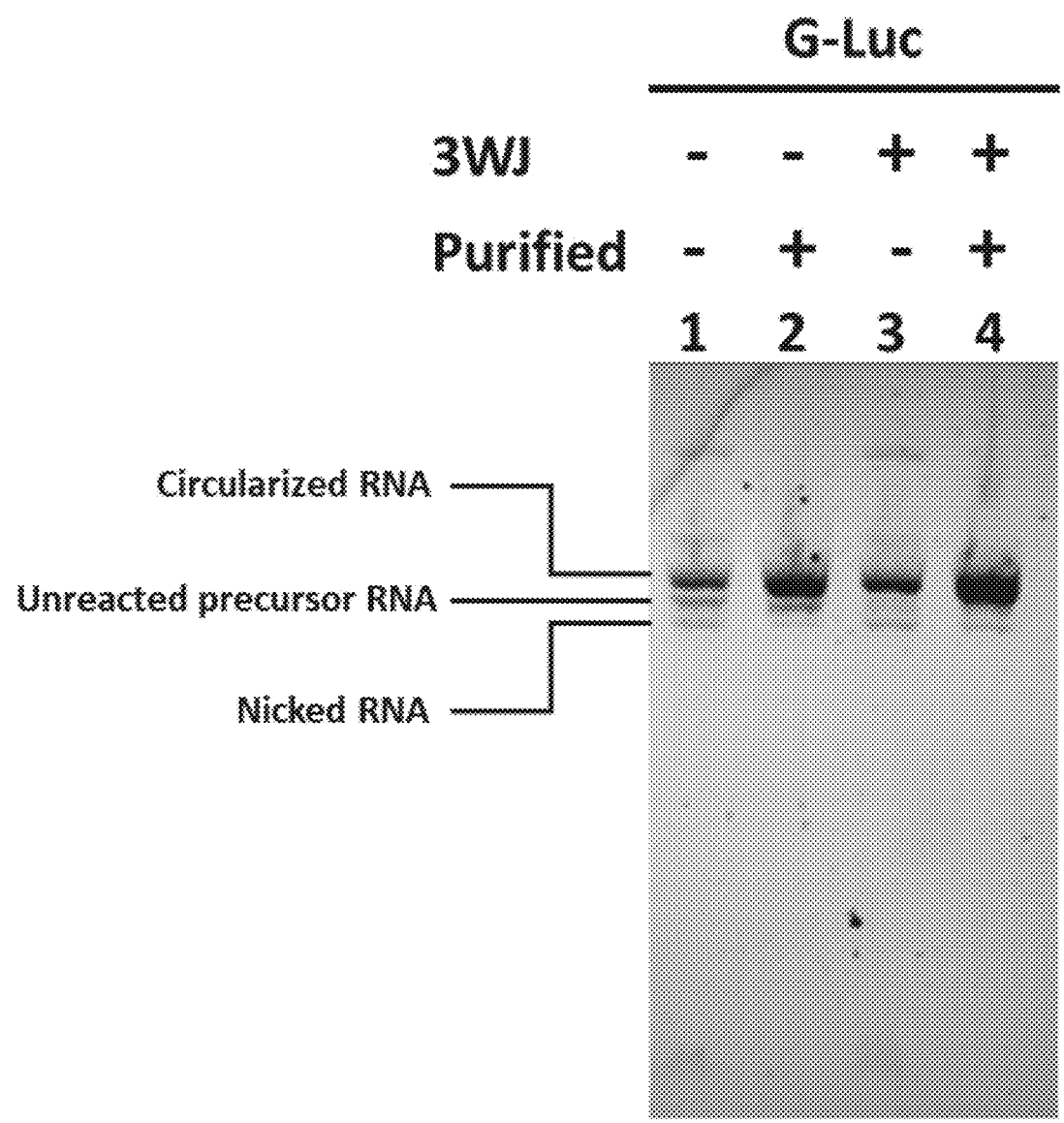
FIG. 20 shows purity of circRNA prepared by methods in accordance with some embodiments of the present disclosure.

To compare the purity of circRNA produced with or without 3WJ and with or without HPLC purification, circular RNA encoding Gaussia luciferase (G-Luc) was generated with homology arm, e.g., without 3WJ, and the crude product was fractionated using reverse phase HPLC followed by analysis via agarose gel electrophoresis; and circular RNA encoding G-Luc was generated using a 3WJ and the crude product was fractionated using reverse phase HPLC followed by analysis via agarose gel electrophoresis. FIG. 20 shows final crude circular RNA coding for G-Luc sequence using 3WJ was at a purity of 69-79% crude (3WJ+ and Purified−) (Lane 3) and 81-91% after HPLC purification (3WJ+ and Purified+) (Lane 4). In contrast, final crude circular RNA coding for G-Luc sequence without 3WJ was at a purity of 55-67% crude (3WJ− and Purified−) (Lane 1) and 72-83% after HPLC purification (3WJ− and Purified+) (Lane 2). These results suggest that using multiple junctions, e.g., 3WJ, can produce circular RNA with higher purity than that without using multiple junctions, e.g., the conventional homology arm methods. Highly pure circular RNA can enable therapeutics use of such circular RNA.

Example 3

3WJ-Circular RNA Design Improves Circular RNA Expression

Figure 16:
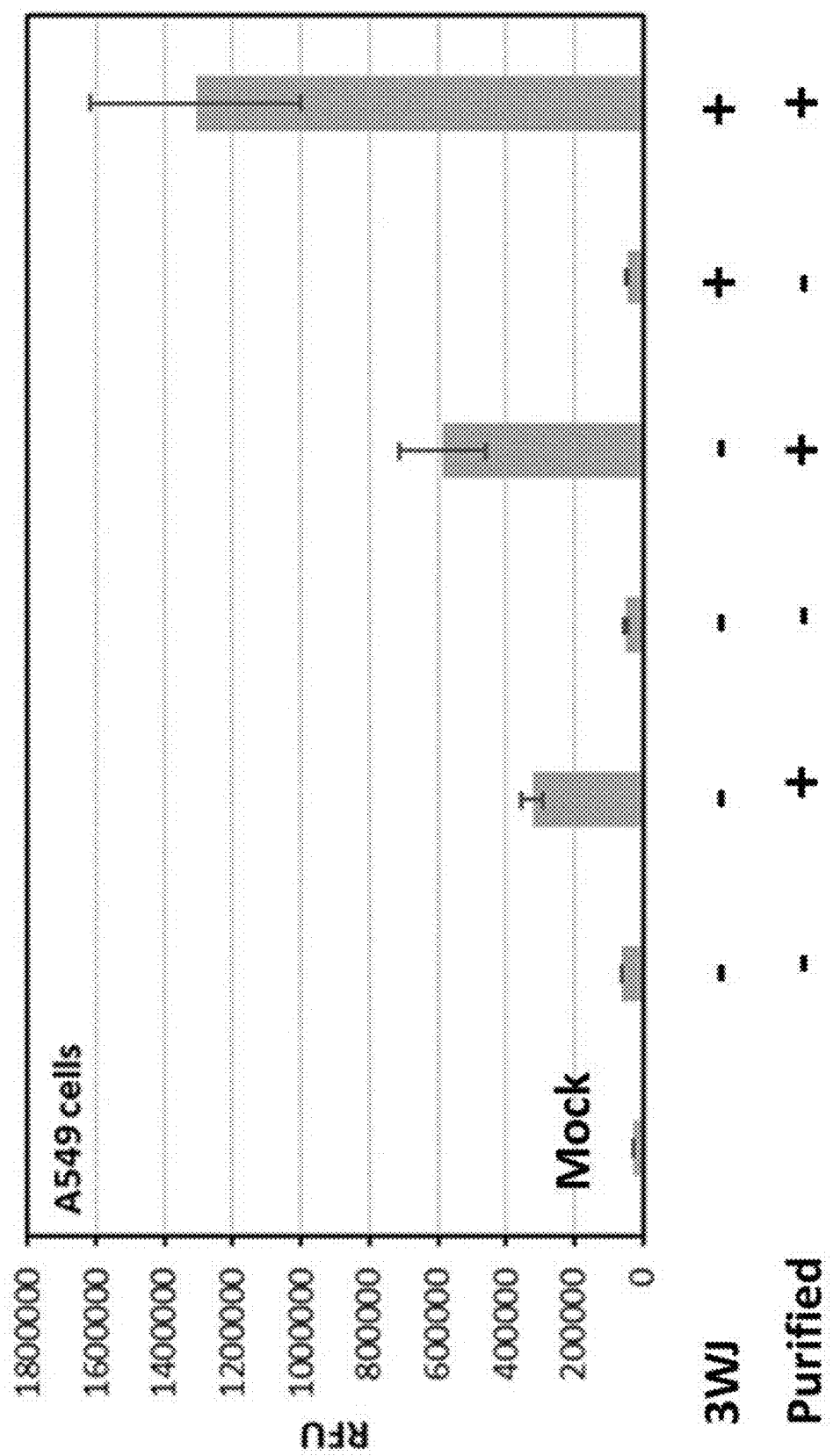
FIG. 16 shows gene expression of circRNA prepared by methods in accordance with some embodiments of the present disclosure.
Figure 17:
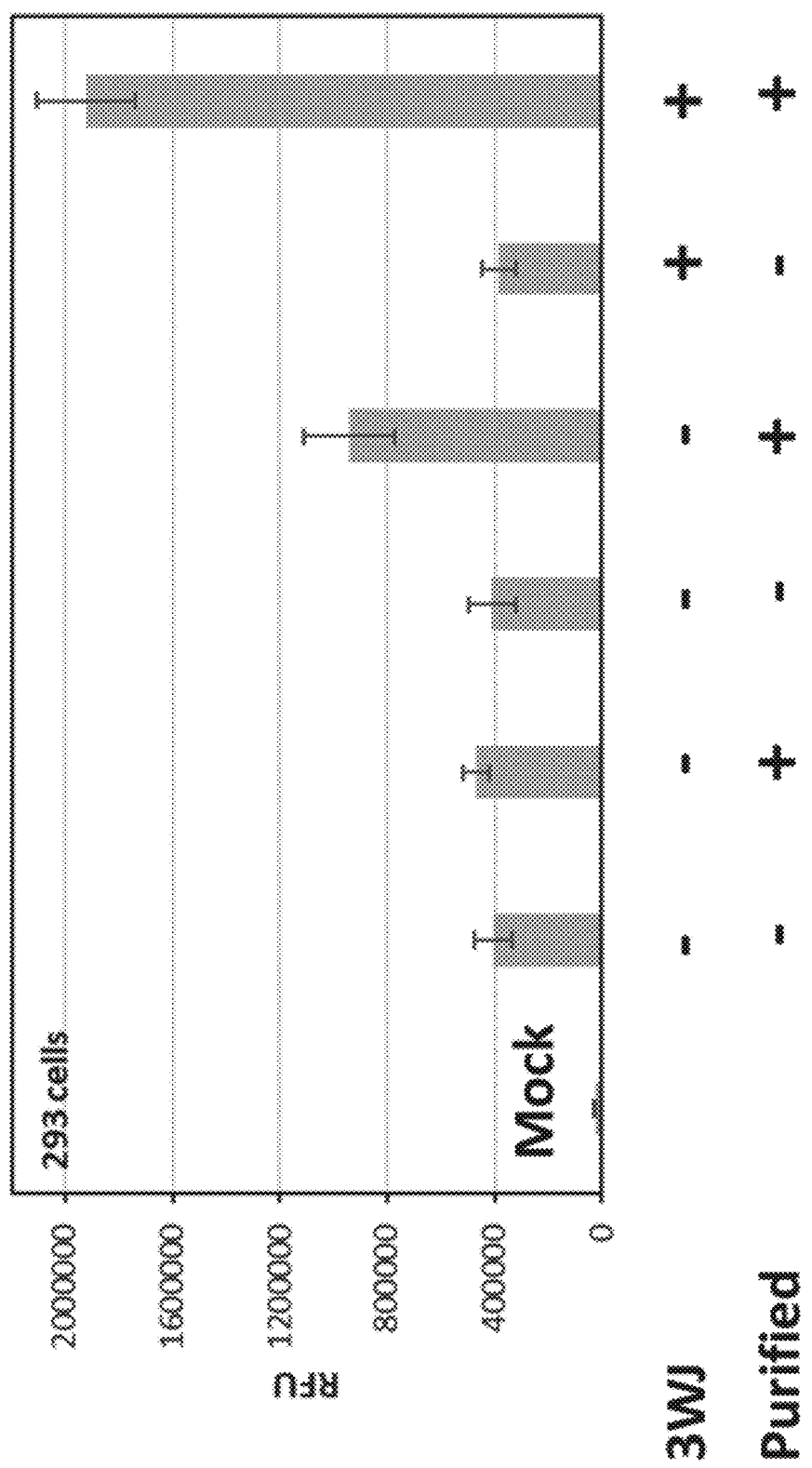
FIG. 17 shows gene expression of circRNA prepared by methods in accordance with some embodiments of the present disclosure.
Figure 18:
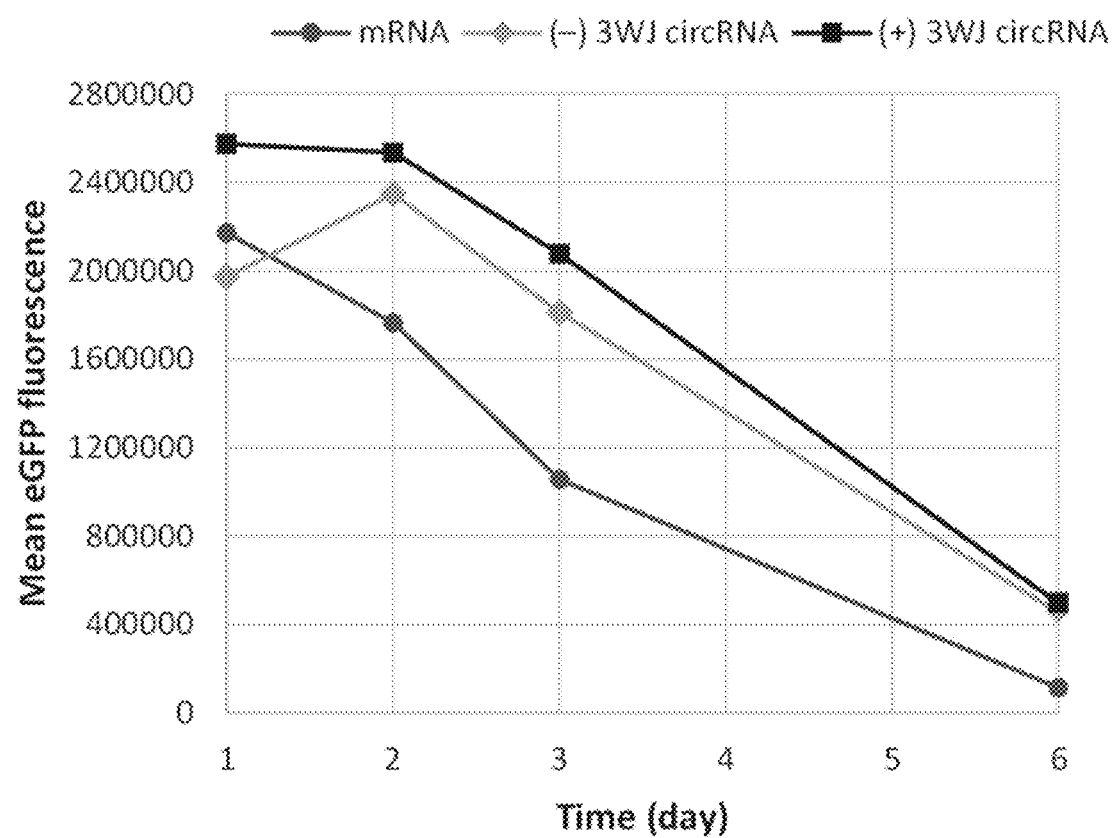
FIG. 18 shows gene expression of circRNA overtime prepared by methods in accordance with some embodiments of the present disclosure.
Figure 19:
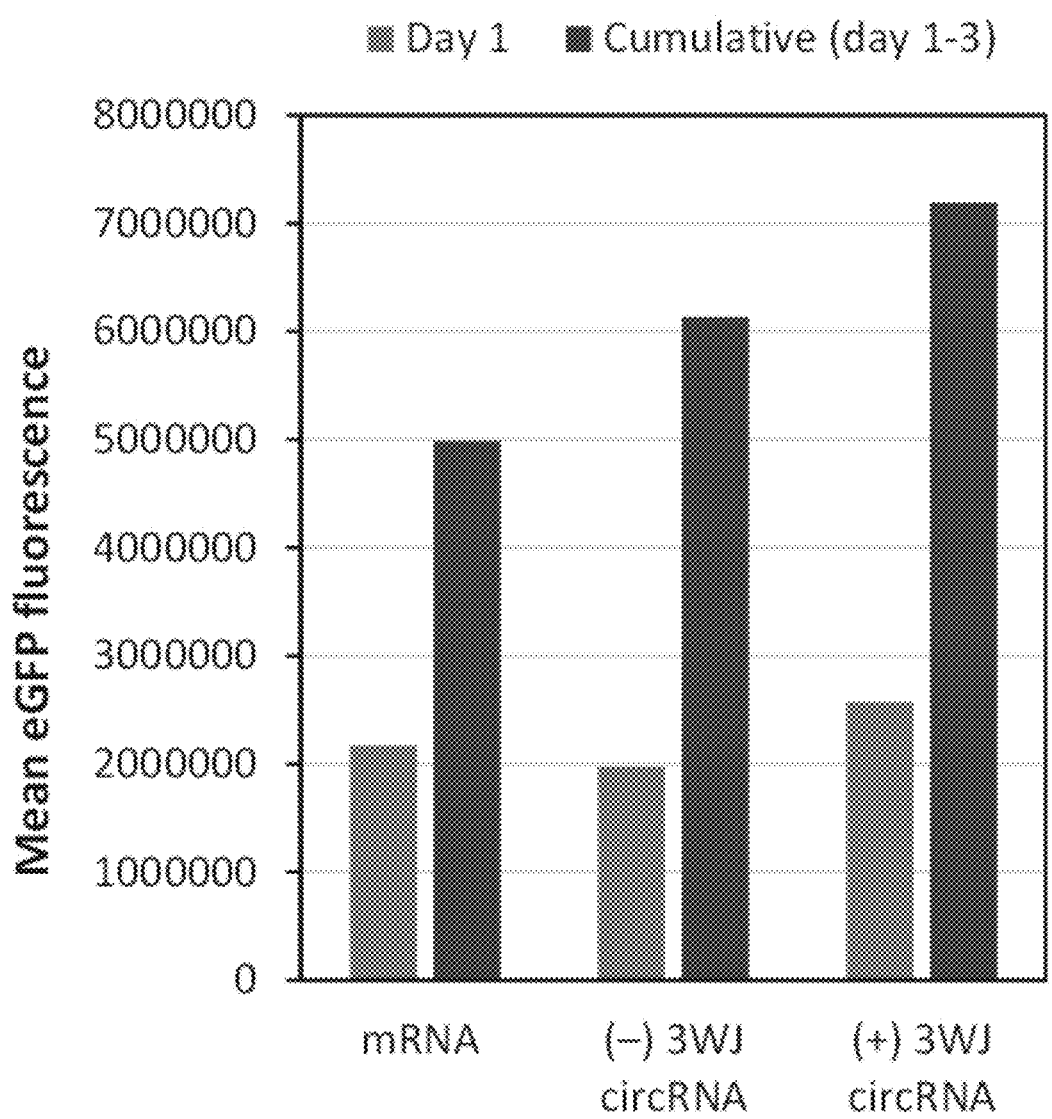
FIG. 19 shows gene expression of circRNA overtime prepared by methods in accordance with some embodiments of the present disclosure.

To test whether the improved RNA circularization efficiency by 3WJ-circular RNA design correlates with enhanced gene expression, the vectors encoding eGFP used in FIG. 12 were introduced into A549 cells, followed by eGFP expression analysis by fluorescence microplate reader. FIG. 16 shows that higher purity of circular RNA produced by 3WJ-circular RNA design in A549 cells exhibited superior circular RNA expression levels (3WJ+, purified+), as shown by higher relative fluorescence units (RFU) as compared to that of conventional homology arm designed circular RNA (3WJ−, purified+). Similarly, the vectors encoding eGFP used in FIG. 12 were introduced into 293 cells, followed by eGFP expression analysis by fluorescence microplate reader. FIG. 17 shows that higher purity of circular RNA produced by 3WJ-circular RNA design in 293 cells exhibited superior circular RNA expression levels (3WJ+, purified+), as shown by higher relative fluorescence units (RFU) as compared to that of conventional homology arm designed circular RNA (3WJ−, purified+). Mock transfection (Mock) served as controls. To compare the protein expression level overtime, A549 cells were transfected with circRNAs encoding eGFP produced−/+3WJ or with mRNA encoding eGFP. Fluorescence was analyzed via flow cytometry for up to 6 days following transfection (10,000 cells were analyzed per condition at each time point). FIGS. 18 and 19 show that, consistent with those samples purified in HPLC (FIGS. 14A, 14B, 15A, and 15B), 3WJ produced circRNA (3WJ+) has superior expression to that produced by homology arm (3WJ−) and mRNA.

Example 4

RNA Circularization Using 3WJ and 4WJ

TABLE 2

(The nucleotides involved in core structures are in bold.)

| 3WJ | Sequence (ΔG = −50.80 Kcal/mol) | SEQ ID NO: |
|---|---|---|
| Ex3WJa | UCGUUGCCAUGUGUAUGUGGGCGGC | 112 |
| Ex3WJb | CCGCCCACAUACUUUGUUGAUCCU | 113 |
| Ex3WJc | GGGAUCAAUCAUGGCAACGA | 114 |

| 4WJ | Sequence (ΔG = −63.10 Kcal/mol) | SEQ ID NO: |
|---|---|---|
| 4WJa | UUGCCAUGUGUAUGUGGGUUCCAGCAC | 115 |
| 4WJb | GUGCUGGAACUGACUGCC | 116 |
| 4WJc | GCAGUCAGCCCACAUACUUUGUUGAUCC | 117 |
| 4WJd | GGAUCAAUCAUGGCAA | 118 |

Figures 21A, 21B, 21C:
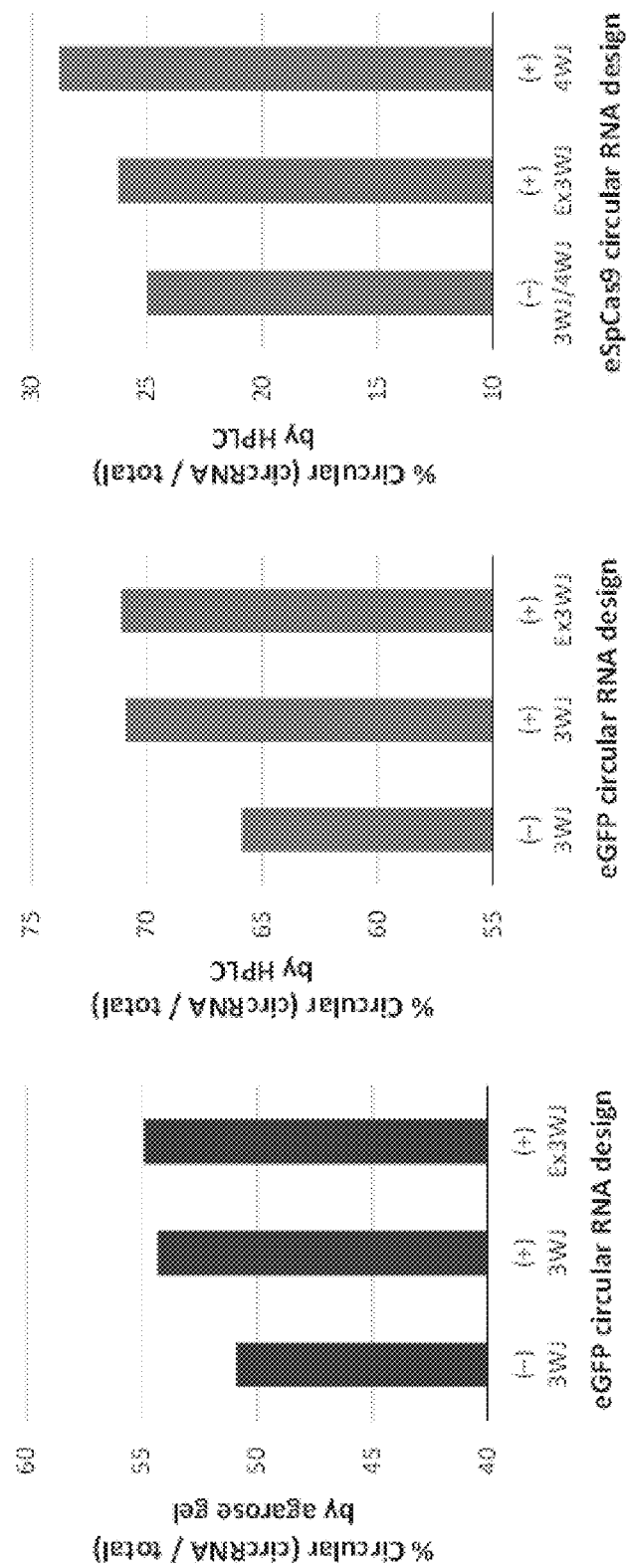
FIG. 21A shows RNA circularization efficiency determined by agarose gel electrophoresis with densitometry analysis in accordance with some embodiments of the present disclosure.
FIG. 21B shows RNA circularization efficiency determined by high-performance liquid chromatography (HPLC) in accordance with some embodiments of the present disclosure.
FIG. 21C shows RNA circularization efficiency determined by HPLC in accordance with some embodiments of the present disclosure.

Circularization of RNA containing coxsackievirus B3 (CVB3) IRES and eGFP sequences, RNA containing the sequences of CVB3 IRES and eSpCas9 nuclease, which is a mutant form of Cas9 nuclease, using (1) a 3WJ (Table 3, SEQ ID NO: 119-121), (2) an extended 3WJ (Ex3WJ, ΔG=−53.5Kcal/mol) (Table 2), or (3) a 4WJ (Construct 57, ΔG=−62.7Kcal/mol) were compared. Circularization was determined using agarose gel electrophoresis with densitometry analysis (FIG. 21A) or HPLC (FIGS. 21B and 21C). These results show that RNA with (+) 3WJ, Ex3WJ, or 4WJ yielded higher RNA circularization than that without (−) 3WJ, Ex3WJ, or 4WJ.

Time Course Expression of Circular RNA-Encoded *Gaussia* Luciferase (Gluc)

Figure 22A:
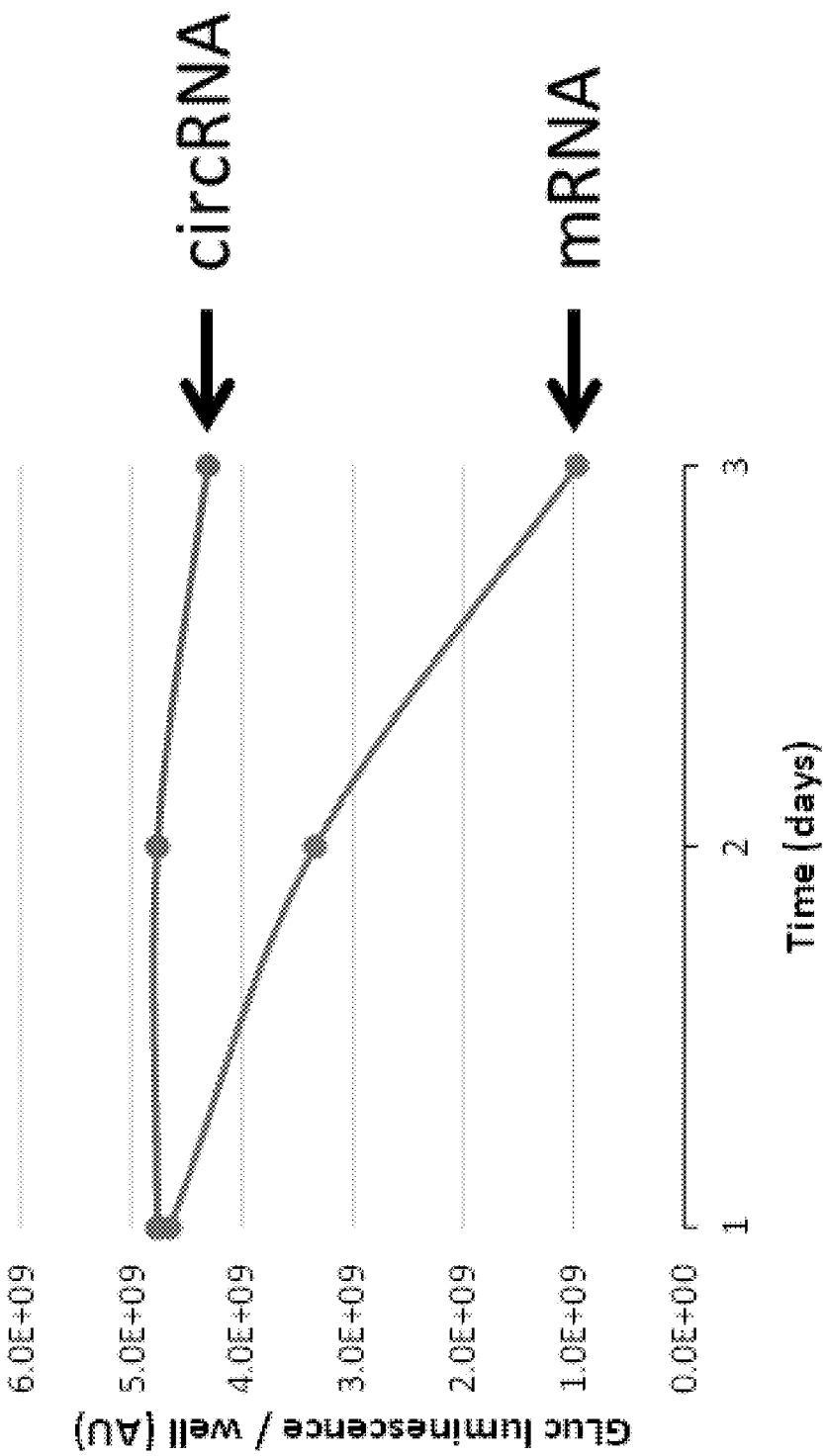
FIG. 22A shows gene expression of circRNA overtime prepared by methods in accordance with some embodiments of the present disclosure.
Figure 22B:
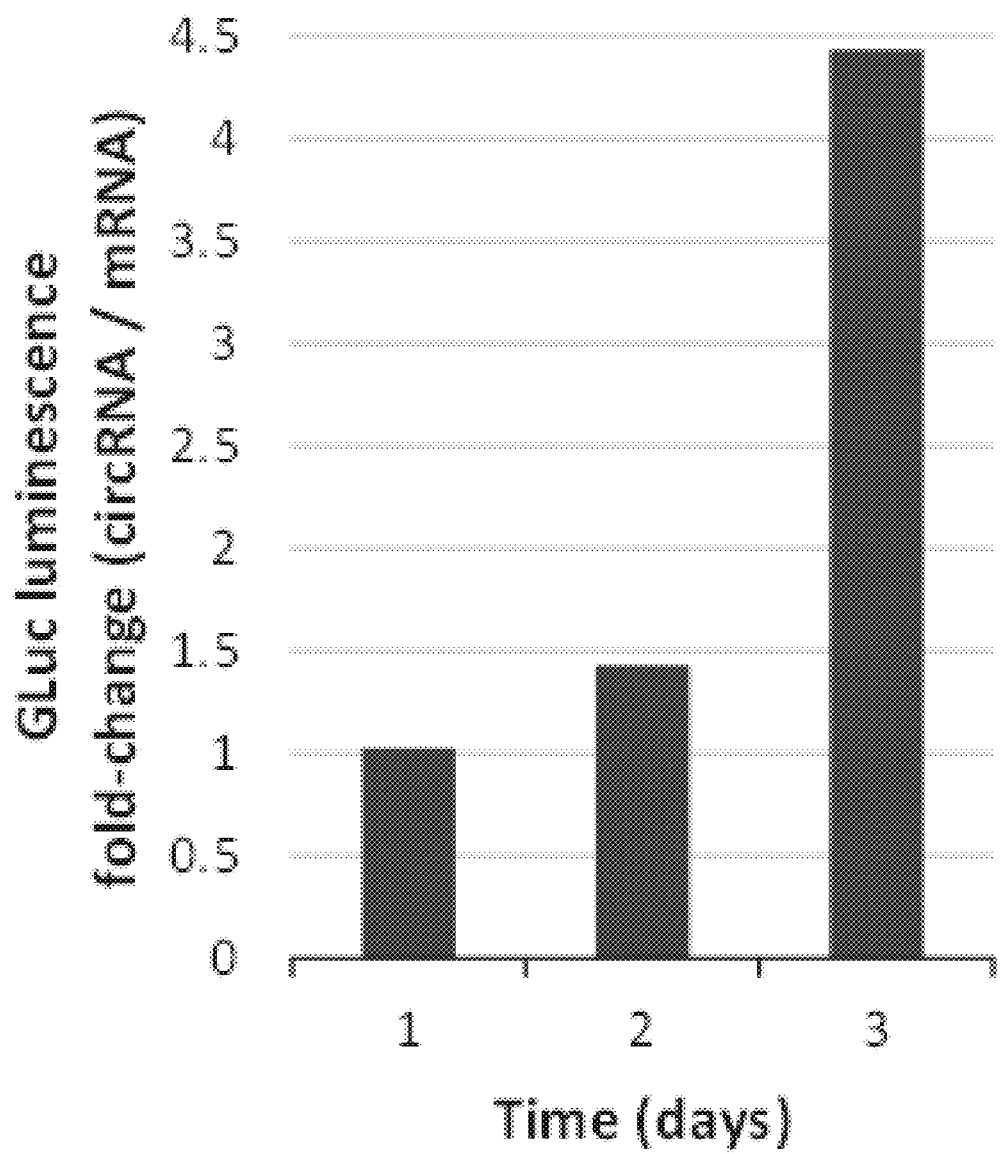
FIG. 22B shows fold-change of gene expression in FIG. 22A.

Expression from Gluc-encoding circRNA (non-modified) produced by a construct with 3WJ (Table 3, SEQ ID NO: 119-121, ΔG=−27.7Kcal/mol) and linear mRNA (generated by in vitro transcription using Cap1 (methylation of the ribose of the adjacent nucleotide of m7G), 100% N1-methyl-pseudo UTP modified) in A549 cells after transfection with Lipofectamine MessengerMAX reagent were compared. Luminescence was analyzed via plate reader (20 µL of media was analyzed per condition at each time point (FIG. 22A) and normalized to the well volume) (FIG. 22B). These results show that, at Day 3 post-transfection, cells transfected with circRNA yielded about 4.5-fold higher Gluc expression than that transfected with liner mRNA.

Time Course Expression of Circular RNA-Encoded eGFP

Figure 23A:
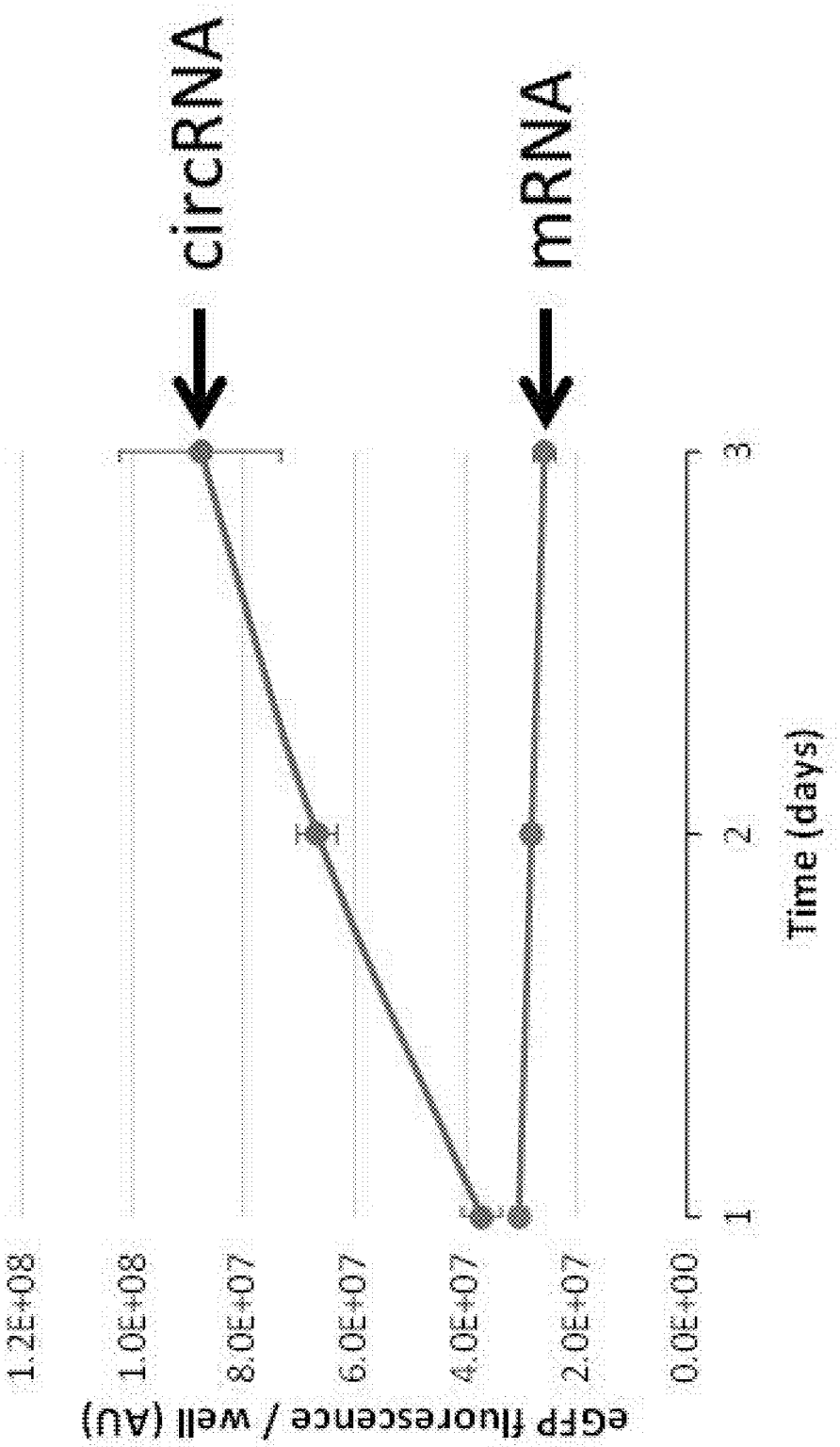
FIG. 23A shows gene expression of circRNA overtime prepared by methods in accordance with some embodiments of the present disclosure.
Figure 23B:
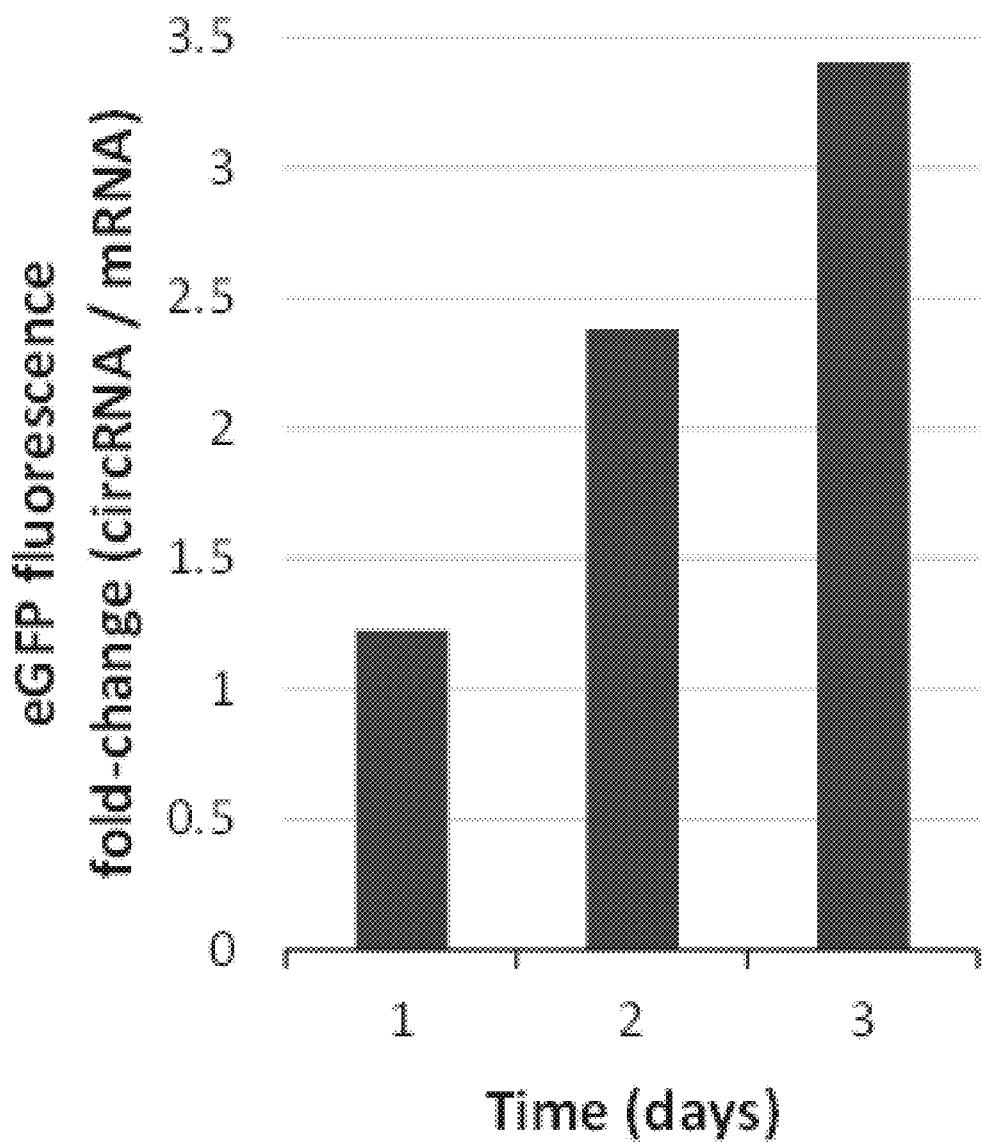
FIG. 23B shows fold-change of gene expression in FIG. 23A.

Expression from eGFP-encoding circRNA (non-modified) produced by a construct with 3WJ (Table 3, SEQ ID NO: 119-121) and linear mRNA (Cap1, 100% N1-methyl-pseudo UTP modified) in A549 cells after transfection with Lipofectamine MessengerMAX reagent were compared. Fluorescence was analyzed via flow cytometry following transfection (10,000 cells were analyzed per condition at each time point (FIG. 23A) and normalized to the well volume (FIG. 23B)). These results show that, at Day 3 post-transfection, cells transfected with circRNA yielded about 3.5-fold higher eGFP expression than that transfected with liner mRNA.

Figure 24A:
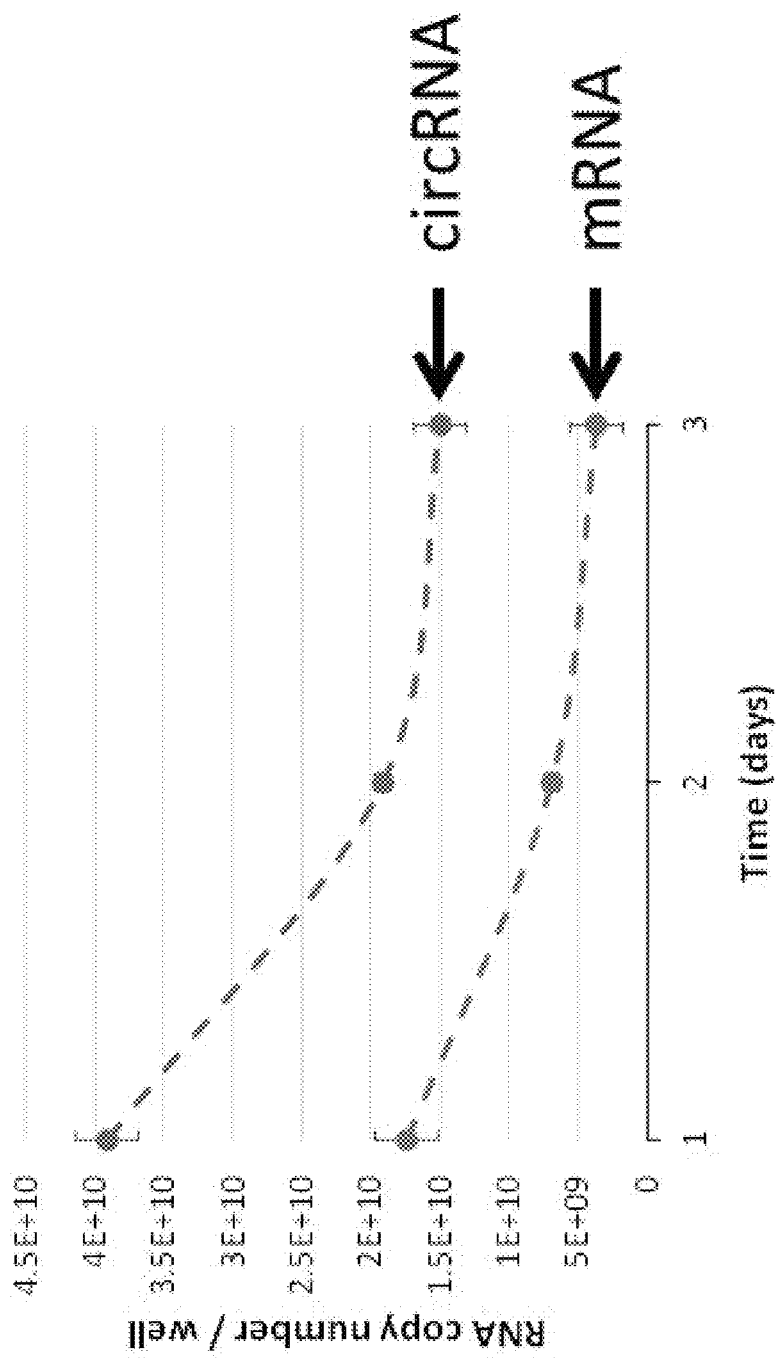
FIG. 24A shows copy number of circRNA overtime prepared by methods in accordance with some embodiments of the present disclosure.
Figure 24B:
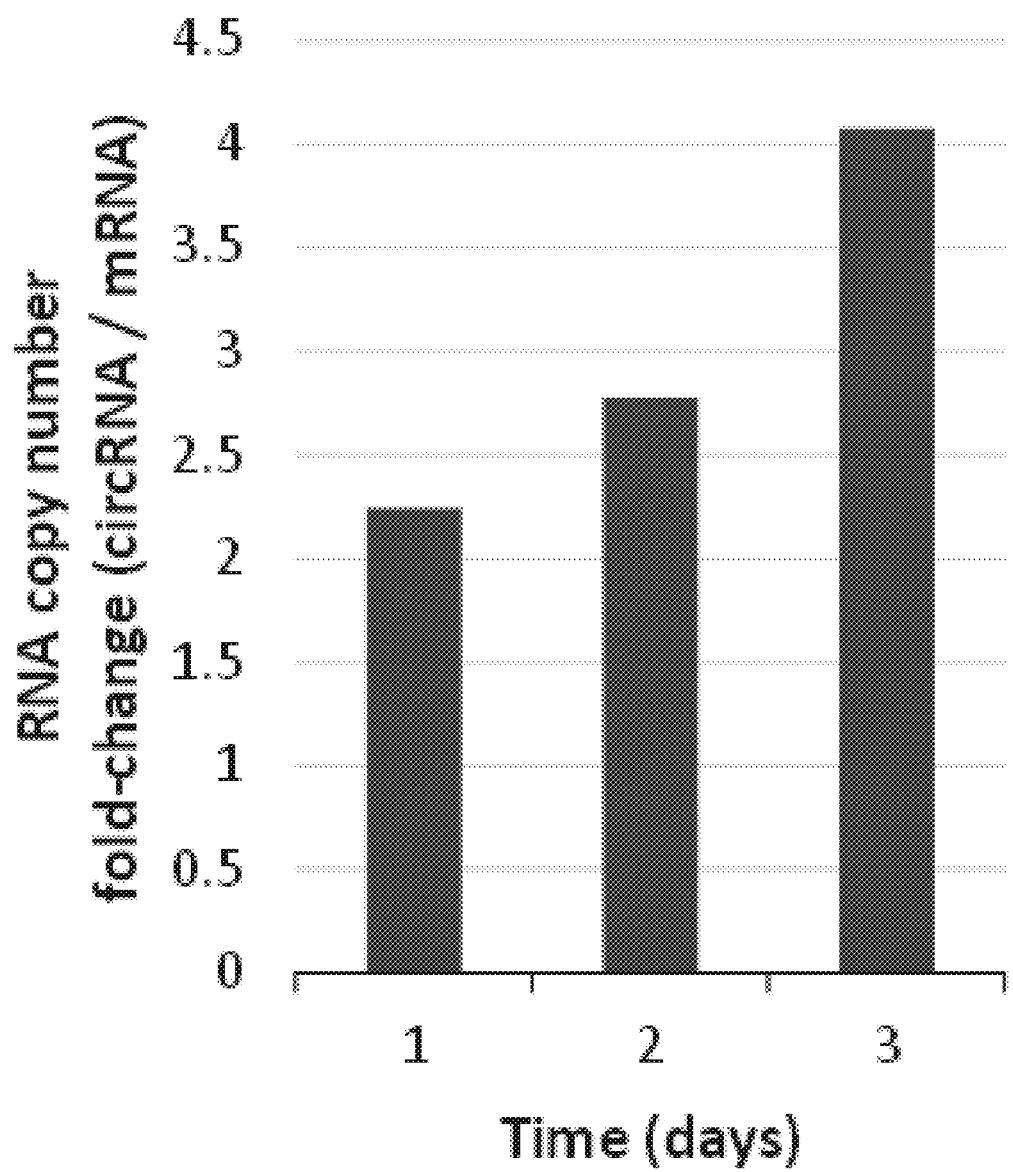
FIG. 24B shows fold-change of copy number in FIG. 24A.

Abundance of eGFP-encoding circRNA (non-modified) and linear mRNA (Cap1, 100% N1-methyl-pseudo UTP modified) in A549 cells after transfection with Lipofectamine MessengerMAX reagent were compared. RNA copy number was determined by quantitative PCR (cDNA synthesized from extracted cellular RNA was analyzed using the standard curve method (FIG. 24A) and normalized to the well volume (FIG. 24B)). These results show that, at Day 3 post-transfection, cells transfected with circRNA yielded about 4-fold higher RNA copy number than that transfected with liner mRNA.

TABLE 3

(The nucleotides involved in core structures are in bold.)

| 3WJ | Sequence (ΔG = −29.90 Kcal/mol) | SEQ ID NO: |
|---|---|---|
| 3WJa | UUGCCAUGUGUAUGUGGG | 119 |
| 3WJb | CCCACAUACUUUGUUGAUUG | 120 |
| 3WJc | CAAAUCAUGGCAA | 121 |

The present invention may be defined by the following aspects:

1. A method of preparing a circular RNA, comprising:
   transcribing a vector to form a precursor RNA, wherein the vector comprises the following elements operably connected to each other and arranged in the following sequence:
   a) a 5' element comprising none or a sequence that forms at least one stem-loop structure,
   b) a 3' Group I self-splicing intron fragment containing a 3' splice site dinucleotide,
   c) a protein coding region or noncoding region,
   d) a 5' Group I self-splicing intron fragment containing a 5' splice site dinucleotide,
   e) a 3' element comprising none or a sequence that forms at least one stem-loop structure;
   provided that, when the 5' element does not comprise a stem-loop structure, then the 3' element comprises at least one stem-loop structure; and, when the 3' element does not comprise a stem-loop structure, then the 5' element comprises at least one stem-loop structure,
   wherein the 5' element and the 3' element form a thermodynamically stable multiple way junction,
   wherein the precursor RNA is capable of forming a circular RNA that is translatable and/or biologically active inside a cell.
2. The method of aspect 1, wherein the thermodynamically stable multiple way junction is a 3-way junction (3WJ), a 4-way junction (4WJ), or a 5-way junction (5WJ).
3. The method of aspect 2, wherein the 3WJ comprises
   a first branch of the 3WJ domain is formed from a 5' portion of a 3WJa sequence and a 3' portion of a 3WJc sequence and comprises a first helical region,
   a second branch of the 3WJ domain is formed from a 3' portion of the 3WJa sequence and a 5' portion of a 3WJb sequence and comprises a second helical region, and
   a third branch of the 3WJ domain is formed from a 3' portion of the 3WJb sequence and a 5' portion of the 3WJc sequence and comprises a third helical region,
   wherein each of said helical regions comprises a plurality of RNA nucleotide pairs that form canonical Watson-Crick bonds.
4. The method of aspect 3, wherein
   the 3WJa comprises or consists of SEQ ID NO: 1, 3WJb comprises or consists of SEQ ID NO: 2, and 3WJc comprises or consists of SEQ ID NO: 3; or
   the 3WJa comprises or consists of SEQ ID NO: 4, 3WJb comprises or consists of SEQ ID NO: 5, and 3WJc comprises or consists of SEQ ID NO: 6; or
   the 3WJa comprises or consists of SEQ ID NO: 10, 3WJb comprises or consists of SEQ ID NO: 11, and 3WJc comprises or consists of SEQ ID NO: 12; or
   the 3WJa comprises or consists of SEQ ID NO: 13, 3WJb comprises or consists of SEQ ID NO: 2, and 3WJc comprises or consists of SEQ ID NO: 13; or
   the 3WJa comprises or consists of SEQ ID NO: 13, 3WJb comprises or consists of SEQ ID NO: 14, and 3WJc comprises or consists of SEQ ID NO: 3; or
   the 3WJa comprises or consists of SEQ ID NO: 13, 3WJb comprises or consists of SEQ ID NO: 15, and 3WJc comprises or consists of SEQ ID NO: 3; or
   the 3WJa comprises or consists of SEQ ID NO: 13, 3WJb comprises or consists of SEQ ID NO: 16, and 3WJc comprises or consists of SEQ ID NO: 3; or
   the 3WJa comprises or consists of SEQ ID NO: 1, 3WJb comprises or consists of SEQ ID NO: 14, and 3WJc comprises or consists of SEQ ID NO: 3; or
   the 3WJa comprises or consists of SEQ ID NO: 1, 3WJb comprises or consists of SEQ ID NO: 15, and 3WJc comprises or consists of SEQ ID NO: 3; or
   the 3WJa comprises or consists of SEQ ID NO: 1, 3WJb comprises or consists of SEQ ID NO: 16, and 3WJc comprises or consists of SEQ ID NO: 3; or
   the 3WJa comprises or consists of SEQ ID NO: 17, 3WJb comprises or consists of SEQ ID NO: 15, and 3WJc comprises or consists of SEQ ID NO: 18; or
   the 3WJa comprises or consists of SEQ ID NO: 19, 3WJb comprises or consists of SEQ ID NO: 20, and 3WJc comprises or consists of SEQ ID NO: 18; or
   the 3WJa comprises or consists of SEQ ID NO: 19, 3WJb comprises or consists of SEQ ID NO: 21, and 3WJc comprises or consists of SEQ ID NO: 22; or
   the 3WJa comprises or consists of SEQ ID NO: 23, 3WJb comprises or consists of SEQ ID NO: 21, and 3WJc comprises or consists of SEQ ID NO: 24; or
   the 3WJa comprises or consists of SEQ ID NO: 25, 3WJb comprises or consists of SEQ ID NO: 26, and 3WJc comprises or consists of SEQ ID NO: 24; or
   the 3WJa comprises or consists of SEQ ID NO: 25, 3WJb comprises or consists of SEQ ID NO: 27, and 3WJc comprises or consists of SEQ ID NO: 28; or the 3WJa comprises or consists of SEQ ID NO: 29,
3WJb comprises or consists of SEQ ID NO: 27, and
3WJc comprises or consists of SEQ ID NO: 30; or
the 3WJa comprises or consists of SEQ ID NO: 31,
3WJb comprises or consists of SEQ ID NO: 32, and
3WJc comprises or consists of SEQ ID NO: 30; or
the 3WJa comprises or consists of SEQ ID NO: 31,
3WJb comprises or consists of SEQ ID NO: 33, and
3WJc comprises or consists of SEQ ID NO: 34; or
the 3WJa comprises or consists of SEQ ID NO: 41,
3WJb comprises or consists of SEQ ID NO: 11, and
3WJc comprises or consists of SEQ ID NO: 42; or
the 3WJa comprises or consists of SEQ ID NO: 43,
3WJb comprises or consists of SEQ ID NO: 44, and
3WJc comprises or consists of SEQ ID NO: 42; or
the 3WJa comprises or consists of SEQ ID NO: 43,
3WJb comprises or consists of SEQ ID NO: 45, and
3WJc comprises or consists of SEQ ID NO: 46; or
the 3WJa comprises or consists of SEQ ID NO: 47,
3WJb comprises or consists of SEQ ID NO: 45, and
3WJc comprises or consists of SEQ ID NO: 48; or
the 3WJa comprises or consists of SEQ ID NO: 49,
3WJb comprises or consists of SEQ ID NO: 50, and
3WJc comprises or consists of SEQ ID NO: 48; or
the 3WJa comprises or consists of SEQ ID NO: 49,
3WJb comprises or consists of SEQ ID NO: 51, and
3WJc comprises or consists of SEQ ID NO: 52; or
the 3WJa comprises or consists of SEQ ID NO: 53,
3WJb comprises or consists of SEQ ID NO: 51, and
3WJc comprises or consists of SEQ ID NO: 54; or
the 3WJa comprises or consists of SEQ ID NO: 55,
3WJb comprises or consists of SEQ ID NO: 56, and
3WJc comprises or consists of SEQ ID NO: 54; or
the 3WJa comprises or consists of SEQ ID NO: 55,
3WJb comprises or consists of SEQ ID NO: 57, and
3WJc comprises or consists of SEQ ID NO: 58; or
the 3WJa comprises or consists of SEQ ID NO: 59,
3WJb comprises or consists of SEQ ID NO: 57, and
3WJc comprises or consists of SEQ ID NO: 60; or
the 3WJa comprises or consists of SEQ ID NO: 61,
3WJb comprises or consists of SEQ ID NO: 63, and
3WJc comprises or consists of SEQ ID NO: 64; or
the 3WJa comprises or consists of SEQ ID NO: 65,
3WJb comprises or consists of SEQ ID NO: 66, and
3WJc comprises or consists of SEQ ID NO: 64; or
the 3WJa comprises or consists of SEQ ID NO: 65,
3WJb comprises or consists of UGUCACGGG, and
3WJc comprises or consists of SEQ ID NO: 68; or
the 3WJa comprises or consists of SEQ ID NO: 43,
3WJb comprises or consists of SEQ ID NO: 69, and
3WJc comprises or consists of SEQ ID NO: 46; or
the 3WJa comprises or consists of SEQ ID NO: 47,
3WJb comprises or consists of SEQ ID NO: 70, and
3WJc comprises or consists of SEQ ID NO: 52; or
the 3WJa comprises or consists of SEQ ID NO: 55,
3WJb comprises or consists of SEQ ID NO: 71, and
3WJc comprises or consists of SEQ ID NO: 72; or
the 3WJa comprises or consists of SEQ ID NO: 76,
3WJb comprises or consists of SEQ ID NO: 8, and
3WJc comprises or consists of SEQ ID NO: 9; or
the 3WJa comprises or consists of SEQ ID NO: 77,
3WJb comprises or consists of SEQ ID NO: 78, and
3WJc comprises or consists of SEQ ID NO: 79; or
the 3WJa comprises or consists of SEQ ID NO: 80,
3WJb comprises or consists of SEQ ID NO: 81, and
3WJc comprises or consists of SEQ ID NO: 82; or the 3WJa comprises or consists of SEQ ID NO: 83,
3WJb comprises or consists of SEQ ID NO: 84, and
3WJc comprises or consists of SEQ ID NO: 85; or
the 3WJa comprises or consists of SEQ ID NO: 7,
3WJb comprises or consists of SEQ ID NO: 89, and
3WJc comprises or consists of SEQ ID NO: 9; or
the 3WJa comprises or consists of SEQ ID NO: 90,
3WJb comprises or consists of SEQ ID NO: 91, and
3WJc comprises or consists of SEQ ID NO: 79; or
the 3WJa comprises or consists of SEQ ID NO: 76,
3WJb comprises or consists of SEQ ID NO: 89, and
3WJc comprises or consists of SEQ ID NO: 9; or
the 3WJa comprises or consists of SEQ ID NO: 77,
3WJb comprises or consists of SEQ ID NO: 91, and
3WJc comprises or consists of SEQ ID NO: 79; or
the 3WJa comprises or consists of SEQ ID NO: 80,
3WJb comprises or consists of SEQ ID NO: 93, and
3WJc comprises or consists of SEQ ID NO: 82; or
the 3WJa comprises or consists of SEQ ID NO: 83,
3WJb comprises or consists of SEQ ID NO: 95, and
3WJc comprises or consists of SEQ ID NO: 85; or
the 3WJa comprises or consists of SEQ ID NO: 112,
3WJb comprises or consists of SEQ ID NO: 113, and
3WJc comprises or consists of SEQ ID NO: 114; or
the 3WJa comprises or consists of SEQ ID NO: 119,
3WJb comprises or consists of SEQ ID NO: 120, and
3WJc comprises or consists of SEQ ID NO: 121; or
the 3WJa comprises AUGUGUA, 3WJb comprises UACUUUG, and 3WJc comprises AUCAUG; or
the 3WJa comprises GCGUU, 3WJb comprises UUCGC, and 3WJc comprises GCCAUAGCG; or
the 3WJa comprises GUAUGGCAC, 3WJb comprises GUCACGG, and 3WJc comprises CUCUUAC; or
the 3WJa comprises AUGGUA, 3WJb comprises ACUUUGU, and 3WJc comprises AUCA; or
the 3WJa comprises UGGU, 3WJb comprises ACUUGU, and 3WJc comprises AUCA; or
the 3WJa comprises UGGU, 3WJb comprises ACUGU, and 3WJc comprises AUCA; or
the 3WJa comprises UGGU, 3WJb comprises ACGUU, and 3WJc comprises AAUCA; or
the 3WJa comprises UGUGU, 3WJb comprises ACUUGU, and 3WJc comprises AUCA; or
the 3WJa comprises UGUGU, 3WJb comprises ACUGU, and 3WJc comprises AUCA; or
the 3WJa comprises UGUGU, 3WJb comprises ACGUU, and 3WJc comprises AAUCA; or
the 3WJa comprises UGGU, 3WJb comprises ACUGU, and 3WJc comprises AUCA; or
the 3WJa comprises UAUGGCAC, 3WJb comprises GUCACGG, and 3WJc comprises CUCUUA; or
the 3WJa comprises UAUGG, 3WJb comprises UCACGG, and 3WJc comprises CCUCUUA; or
the 3WJa comprises UAUGGCAC, 3WJb comprises GUCACGG, and 3WJc comprises CUCUUA; or
the 3WJa comprises UAUG, 3WJb comprises CAGGGG, and 3WJc comprises CUUG; or
the 3WJa comprises UAUGU, 3WJb comprises GCAGG, and 3WJc comprises UCUUG; or
the 3WJa comprises UAUGU, 3WJb comprises GCAGGG, and 3WJc comprises CUUG; or
the 3WJa comprises UAUGU, 3WJb comprises GCAGG, and 3WJc comprises UCUUG; or
the 3WJa comprises UGUGU, 3WJb comprises ACUUUGU, and 3WJc comprises AUCA; or
the 3WJa comprises UGUGU, 3WJb comprises ACUUU, and 3WJc comprises AAAUCA.

5. The method of aspect 2, wherein the 4WJ comprises
   a first branch of the 4WJ domain is formed from a 5' portion of a 4WJa sequence and a 3' portion of a 4WJd sequence and comprises a first helical region,
   a second branch of the 4WJ domain is formed from a 3' portion of the 4WJa sequence and a 5' portion of a 4WJb sequence and comprises a second helical region, and
   a third branch of the 4WJ domain is formed from a 3' portion of the 4WJb sequence and a 5' portion of a 4WJc sequence and comprises a third helical region, and
   a fourth branch of the 4WJ domain is formed from a 3' portion of the 4WJc sequence and a 5' portion of the 4WJd sequence and comprises a fourth helical region,
   wherein each of said helical regions comprises a plurality of RNA nucleotide pairs that form canonical Watson-Crick bonds.
6. The method of aspect 5, wherein
   the 4WJa comprises or consists of SEQ ID NO: 7, 4WJb comprises or consists of SEQ ID NO: 8, 4WJc comprises or consists of SEQ ID NO: 9, and 4WJd comprises or consists of SEQ ID NO: 102; or
   the 4WJa comprises or consists of SEQ ID NO: 103, 4WJb comprises or consists of SEQ ID NO: 104, 4WJc comprises or consists of SEQ ID NO: 105, and 4WJd comprises or consists of SEQ ID NO: 106; or
   the 4WJa comprises or consists of SEQ ID NO: 115, 4WJb comprises or consists of SEQ ID NO: 116, 4WJc comprises or consists of SEQ ID NO: 117, and 4WJd comprises or consists of SEQ ID NO: 118; or
   the 4WJa comprises UGCAGGUG, 4WJb comprises ACGGGC, 4WJc comprises CCAGCA, and 4WJd comprises SEQ ID NO: 67; or
   the 4WJa comprises SEQ ID NO: 74, 4WJb comprises AACUG, 4WJc comprises SEQ ID NO: 75, and 4WJd comprises AUCAUG; or
   the 4WJa comprises SEQ ID NO: 122, 4WJb comprises GAACU, 4WJc comprises SEQ ID NO: 123, and 4WJd comprises AAUCA.
7. The method of aspect 2, wherein the 5WJ comprises
   a first branch of the 5WJ domain is formed from a 5' portion of a 5WJa sequence and a 3' portion of a 5WJe sequence and comprises a first helical region,
   a second branch of the 5WJ domain is formed from a 3' portion of the 5WJa sequence and a 5' portion of a 5WJb sequence and comprises a second helical region,
   a third branch of the 5WJ domain is formed from a 3' portion of the 5WJb sequence and a 5' portion of a 5WJc sequence and comprises a third helical region,
   a fourth branch of the 5WJ domain is formed from a 3' portion of the 5WJc sequence and a 5' portion of a 5WJd sequence and comprises a fourth helical region, and
   a fifth branch of the 5WJ domain is formed from a 3' portion of the 5WJd sequence and a 5' portion of the 5WJe sequence and comprises a fifth helical region,
   wherein each of said helical regions comprises a plurality of RNA nucleotide pairs that form canonical Watson-Crick bonds.
8. The method of aspect 5, wherein
   the 5WJa comprises or consists of SEQ ID NO: 107, the 5WJb comprises or consists of SEQ ID NO: 108, the 5WJc comprises or consists of SEQ ID NO: 109, the 5WJd comprises or consists of SEQ ID NO: 110, and the 5WJe comprises or consists of SEQ ID NO: 111; or
   the 5WJa comprises GUGA, the 5WJb comprises UUGC, the 5WJc comprises GUGU, the 5WJd comprises AUGC, and the 5WJe comprises GUGC.
9. The method of any one of aspects 1-8, the vector further comprises an internal ribosome entry site (IRES) located at the 5' end of c), wherein the IRES is selected from an IRES sequence from a virus or a gene selected from the group consisting of: Taura syndrome virus, *Triatoma* virus, Theiler's encephalomyelitis virus, simian Virus 40, *Solenopsis invicta* virus 1, *Rhopalosiphum padi* virus, Reticuloendotheliosis virus, fuman poliovirus 1, *Plautia* stall intestine virus, Kashmir bee virus, Human rhinovirus 2, Homalodisca coagulata virus-1, Human Immunodeficiency Virus type 1, Homalodisca coagulata virus-1, Himetobi P virus, Hepatitis C virus, Hepatitis A virus, Hepatitis GB virus, foot and mouth disease virus, Human enterovirus 71, Equine rhinitis virus, *Ectropis obliqua* picorna-like virus, Encephalomyocarditis virus (EMCV), *Drosophila* C Virus, Crucifer tobamo virus, Cricket paralysis virus, Bovine viral diarrhea virus 1, Black Queen Cell Virus, Aphid lethal paralysis virus, Avian encephalomyelitis virus, Acute bee paralysis virus, Hibiscus chlorotic ringspot virus, Classical swine fever virus, Human fibroblast growth factor 2 (FGF2), Human surfactant protein A1 (SFTPA1), Human acute myeloid leukemia protein 1/runt-related transcription factor 1 (AML1/RUNX1), *Drosophila* antennapedia, Human aquaporin-4 (AQP4), Human type-1 angiotensin II receptor (AT1R), Human BCL2 associated athanogene 1 (BAG-1), Human B-cell lymphoma 2 (BCL2), Human binding immunoglobulin protein (BiP), Human inhibitor of apoptosis family protein 1 (c-IAP1), Human c-myc, Human eukaryotic translation initiation factor 4 G (eIF4G), Mouse N-deacetylase and N-sulfotransferase 4 (NDST4L), Human lymphoid enhancer-binding factor-1 (LEF1), Mouse hypoxia inducible factor 1 subunit alpha (HIF1 alpha), Human N-myc, Mouse glial and testis-specific homeobox protein (Gtx), Human cyclin-dependent kinase inhibitor 1B (p27kip1), Human platelet-derived growth factor B/human homolog of the simian sarcoma virus (PDGF2/c-sis), Human p53, Human Proviral integration site for Moloney murine leukemia virus-1 (Pim-1), Mouse RNA-binding protein 3 (Rbm3), *Drosophila* reaper, Canine Scamper, *Drosophila* Ultrabithorax (Ubx), Salivirus, Cosavirus, Parechovirus, Human upstream of N-ras (UNR), Mouse utrophin A (UtrA), Human vascular endothelial growth factor A (VEGF-A), Human X-linked inhibitor-of-apoptosis protein (XIAP), *Drosophila* hairless, *S. cerevisiae* transcription factor II D (TFIID), *S. cerevisiae* Yes1 Associated Transcriptional Regulator (YAP1), Human proto-oncogene tyrosine-protein kinase Src (c-src), Human fibroblast growth factor 1 (FGF-1), Simian picomavirus, Turnip crinkle virus, Coxsackievirus B3 (CVB3) and Coxsackievirus A (CVB1/2).
10. The method of any one of aspects 1-9, wherein the vector further comprises an RNA polymerase promoter.
11. The method of aspect 10, wherein the RNA polymerase promoter is a T7 virus RNA polymerase promoter, T6 virus RNA polymerase promoter, SP6 virus RNA polymerase promoter, T3 virus RNA polymerase promoter, or T4 virus RNA polymerase promoter.

12. The method of any one of aspects 1-11, wherein the 3' Group I self-splicing intron fragment and the 5' Group I self-splicing intron fragment are from a *Cyanobacterium anabaena* sp. Pre-tRNA-Leu gene.
13. The method of any one of aspects 1-12, wherein the 3' Group I self-splicing intron fragment and 5' Group I self-splicing intron fragment are from a T4 phage Td gene.
14. The method of any one of aspects 1-13, further comprising forming the circular RNA by splint-mediated ligation of the precursor RNA.
15. The method of any one of aspects 1-14, wherein the vector is transfected into the cell using lipofection or electroporation prior to transcription.
16. The method of any one of aspects 1-15, wherein the vector is transfected into the cell using a nanocarrier prior to transcription.
17. The method of aspect 16, wherein the nanocarrier is a lipid, polymer, or lipo-polymeric hybrid.
18. The method of any one of aspects 1-17, further comprising forming the circular RNA and purifying the circular RNA using a size-exclusion column in tris-EDTA or ion-paired reverse phase HPLC.
19. The method of any one of aspects 1-17, further comprising forming the circular RNA and purifying the circular RNA in a triethylammonium acetate (TEAA)-acetonitrile buffer in a high-performance liquid chromatography (HPLC) system at a flow rate of about 0.01-5 mL/minute at a pH in the range of about 4-10.
20. The method of any one of aspects 1-17, further comprising forming the circular RNA and purifying the circular RNA using a phosphatase treatment.
21. The method of aspect 20, further comprising incubating the precursor RNA in the presence of (i) magnesium ions and/or (ii) guanosine nucleotides or guanosine nucleosides.
22. The method of aspect 21, wherein the incubation of the precursor RNA occurs at a temperature of between about 20° C. and about 60° C.
23. The method of any one of aspects 1-22, wherein said transcription of the vector occurs in the presence of a nucleoside or nucleotide monophosphate or diphosphate for the incorporation of said nucleoside or nucleotide as the first nucleotide of the precursor RNA transcribed from said vector.
24. The method of aspect 23, wherein the precursor RNA comprises a monophosphate 5' terminus capable of being ligated using a ligase enzyme.
25. The method of aspect 24, wherein said transcription of the vector occurs in the presence of
    a) guanosine nucleosides or nucleotide mono- or diphosphates;
    b) cytidine nucleosides or nucleotide mono- or diphosphates;
    c) uracil nucleosides or nucleotide mono- or di-phosphates;
    d) adenosine nucleosides or nucleotide mono- or diphosphates; or
    e) a combination thereof,
    for the incorporation of nucleosides or nucleotide mono- or di-phosphates as the first nucleotide of RNA strands transcribed from said vector or transcripts arising from said vector.
26. The method of any one of aspects 1-25, wherein the protein encoding region encodes a non-natural protein comprising one or more synthetic protein elements.
27. The method of any one of aspects 1-26, wherein the precursor RNA comprises a nucleoside modification.
28. The method of aspect 27, wherein the nucleoside modification is selected from the group consisting of: $N^6$-methyladenosine (m6A), pseudouridine ($\Psi$), N1-methylpseudouridine (m1$\Psi$), and 5-methoxyuridine (5moU).
29. The method of any one of aspects 1-28, wherein the vector comprises a 5' spacer element located at the 3' end of b).
30. The method of any one of aspects 1-29, wherein the vector comprises a 3' spacer element located at the 5' end of d).
31. The method of aspect 29 or 30, wherein the 5' spacer element or the 3' spacer element comprises a polyA sequence or a polyA-C sequence.
32. The method of any one of aspects 1-31, wherein the noncoding region comprises an element encoding one or more RNA selected from the group consisting of antisense RNA, transfer RNA (tRNA), transfer-messenger RNA (tmRNA), ribosomal RNA (rRNA), signal recognition particle RNA (7SL RNA or SRP RNA), small nuclear RNAs (snRNA), small nucleolar RNA (snoRNA), SmY RNA (SmY), small cajal body-specific RNA (scaRNA), guide RNA (gRNA), Y RNA, spliced leader RNA (SL RNA), microRNAs (miRNA), small Interfering RNA (siRNA), cis-natural antisense transcript (cis-NAT), CRISPR RNA (crRNA), long noncoding RNA (lncRNA), Piwi-interacting RNA (piRNA), short hairpin RNA (shRNA), trans-acting siRNA (tasiRNA), Repeat associated siRNA (rasiRNA), 7SK RNA (7SK), telomerase RNA Component (TERC), Vault RNA (vRNA, vtRNA), and enhancer RNA (eRNA).
33. A precursor RNA comprising the following elements operably connected to each other and arranged in the following sequence:
    a) a 5' element comprising none or at least one stem-loop structure,
    b) a 3' Group I self-splicing intron fragment containing a 3' splice site dinucleotide,
    c) a protein coding region or noncoding region,
    d) a 5' Group I self-splicing intron fragment containing a 5' splice site dinucleotide,
    e) a 3' element comprising none or at least one stem-loop structure;
    provided that, when the 5' element does not comprise a stem-loop structure, then the 3' element comprises at least one stem-loop structure; and, when the 3' element does not comprise a stem-loop structure, then the 5' element comprises at least one stem-loop structure,
    wherein the 5' element and the 3' element form a thermodynamically stable multiple way junction,
    wherein the precursor RNA is capable of forming a circular RNA that is translatable and/or biologically active inside a cell.
34. The precursor RNA of aspect 33, wherein the thermodynamically stable multiple way junction is a 3-way junction (3WJ), a 4-way junction (4WJ), or a 5-way junction (5WJ).
35. The precursor RNA of aspect 34, wherein the 3WJ comprises
    a first branch of the 3WJ domain is formed from a 5' portion of a 3WJa sequence and a 3' portion of a 3WJc sequence and comprises a first helical region, a second branch of the 3WJ domain is formed from a 3' portion of the 3WJa sequence and a 5' portion of a 3WJb sequence and comprises a second helical region, and a third branch of the 3WJ domain is formed from a 3' portion of the 3WJb sequence and a 5' portion of the 3WJc sequence and comprises a third helical region, wherein each of said helical regions comprises a plurality of RNA nucleotide pairs that form canonical Watson-Crick bonds.

36. The precursor RNA of aspect 35, wherein
the 3WJa comprises or consists of SEQ ID NO: 1, 3WJb comprises or consists of SEQ ID NO: 2, and 3WJc comprises or consists of SEQ ID NO: 3; or
the 3WJa comprises or consists of SEQ ID NO: 4, 3WJb comprises or consists of SEQ ID NO: 5, and 3WJc comprises or consists of SEQ ID NO: 6; or
the 3WJa comprises or consists of SEQ ID NO: 10, 3WJb comprises or consists of SEQ ID NO: 11, and 3WJc comprises or consists of SEQ ID NO: 12; or
the 3WJa comprises or consists of SEQ ID NO: 13, 3WJb comprises or consists of SEQ ID NO: 2, and 3WJc comprises or consists of SEQ ID NO: 13; or
the 3WJa comprises or consists of SEQ ID NO: 13, 3WJb comprises or consists of SEQ ID NO: 14, and 3WJc comprises or consists of SEQ ID NO: 3; or
the 3WJa comprises or consists of SEQ ID NO: 13, 3WJb comprises or consists of SEQ ID NO: 15, and 3WJc comprises or consists of SEQ ID NO: 3; or
the 3WJa comprises or consists of SEQ ID NO: 13, 3WJb comprises or consists of SEQ ID NO: 16, and 3WJc comprises or consists of SEQ ID NO: 3; or
the 3WJa comprises or consists of SEQ ID NO: 1, 3WJb comprises or consists of SEQ ID NO: 14, and 3WJc comprises or consists of SEQ ID NO: 3; or
the 3WJa comprises or consists of SEQ ID NO: 1, 3WJb comprises or consists of SEQ ID NO: 15, and 3WJc comprises or consists of SEQ ID NO: 3; or
the 3WJa comprises or consists of SEQ ID NO: 1, 3WJb comprises or consists of SEQ ID NO: 16, and 3WJc comprises or consists of SEQ ID NO: 3; or
the 3WJa comprises or consists of SEQ ID NO: 17, 3WJb comprises or consists of SEQ ID NO: 15, and 3WJc comprises or consists of SEQ ID NO: 18; or
the 3WJa comprises or consists of SEQ ID NO: 19, 3WJb comprises or consists of SEQ ID NO: 20, and 3WJc comprises or consists of SEQ ID NO: 18; or
the 3WJa comprises or consists of SEQ ID NO: 19, 3WJb comprises or consists of SEQ ID NO: 21, and 3WJc comprises or consists of SEQ ID NO: 22; or
the 3WJa comprises or consists of SEQ ID NO: 23, 3WJb comprises or consists of SEQ ID NO: 21, and 3WJc comprises or consists of SEQ ID NO: 24; or
the 3WJa comprises or consists of SEQ ID NO: 25, 3WJb comprises or consists of SEQ ID NO: 26, and 3WJc comprises or consists of SEQ ID NO: 24; or
the 3WJa comprises or consists of SEQ ID NO: 25, 3WJb comprises or consists of SEQ ID NO: 27, and 3WJc comprises or consists of SEQ ID NO: 28; or
the 3WJa comprises or consists of SEQ ID NO: 29, 3WJb comprises or consists of SEQ ID NO: 27, and 3WJc comprises or consists of SEQ ID NO: 30; or
the 3WJa comprises or consists of SEQ ID NO: 31, 3WJb comprises or consists of SEQ ID NO: 32, and 3WJc comprises or consists of SEQ ID NO: 30; or
the 3WJa comprises or consists of SEQ ID NO: 31, 3WJb comprises or consists of SEQ ID NO: 33, and 3WJc comprises or consists of SEQ ID NO: 34; or
the 3WJa comprises or consists of SEQ ID NO: 41, 3WJb comprises or consists of SEQ ID NO: 11, and 3WJc comprises or consists of SEQ ID NO: 42; or
the 3WJa comprises or consists of SEQ ID NO: 43, 3WJb comprises or consists of SEQ ID NO: 44, and 3WJc comprises or consists of SEQ ID NO: 42; or
the 3WJa comprises or consists of SEQ ID NO: 43, 3WJb comprises or consists of SEQ ID NO: 45, and 3WJc comprises or consists of SEQ ID NO: 46; or
the 3WJa comprises or consists of SEQ ID NO: 47, 3WJb comprises or consists of SEQ ID NO: 45, and 3WJc comprises or consists of SEQ ID NO: 48; or
the 3WJa comprises or consists of SEQ ID NO: 49, 3WJb comprises or consists of SEQ ID NO: 50, and 3WJc comprises or consists of SEQ ID NO: 48; or
the 3WJa comprises or consists of SEQ ID NO: 49, 3WJb comprises or consists of SEQ ID NO: 51, and 3WJc comprises or consists of SEQ ID NO: 52; or
the 3WJa comprises or consists of SEQ ID NO: 53, 3WJb comprises or consists of SEQ ID NO: 51, and 3WJc comprises or consists of SEQ ID NO: 54; or
the 3WJa comprises or consists of SEQ ID NO: 55, 3WJb comprises or consists of SEQ ID NO: 56, and 3WJc comprises or consists of SEQ ID NO: 54; or
the 3WJa comprises or consists of SEQ ID NO: 55, 3WJb comprises or consists of SEQ ID NO: 57, and 3WJc comprises or consists of SEQ ID NO: 58; or
the 3WJa comprises or consists of SEQ ID NO: 59, 3WJb comprises or consists of SEQ ID NO: 57, and 3WJc comprises or consists of SEQ ID NO: 60; or
the 3WJa comprises or consists of SEQ ID NO: 61, 3WJb comprises or consists of SEQ ID NO: 63, and 3WJc comprises or consists of SEQ ID NO: 64; or
the 3WJa comprises or consists of SEQ ID NO: 65, 3WJb comprises or consists of SEQ ID NO: 66, and 3WJc comprises or consists of SEQ ID NO: 64; or
the 3WJa comprises or consists of SEQ ID NO: 65, 3WJb comprises or consists of UGUCACGGG, and 3WJc comprises or consists of SEQ ID NO: 68; or
the 3WJa comprises or consists of SEQ ID NO: 43, 3WJb comprises or consists of SEQ ID NO: 69, and 3WJc comprises or consists of SEQ ID NO: 46; or
the 3WJa comprises or consists of SEQ ID NO: 47, 3WJb comprises or consists of SEQ ID NO: 70, and 3WJc comprises or consists of SEQ ID NO: 52; or
the 3WJa comprises or consists of SEQ ID NO: 55, 3WJb comprises or consists of SEQ ID NO: 71, and 3WJc comprises or consists of SEQ ID NO: 72; or
the 3WJa comprises or consists of SEQ ID NO: 76, 3WJb comprises or consists of SEQ ID NO: 8, and 3WJc comprises or consists of SEQ ID NO: 9; or
the 3WJa comprises or consists of SEQ ID NO: 77, 3WJb comprises or consists of SEQ ID NO: 78, and 3WJc comprises or consists of SEQ ID NO: 79; or
the 3WJa comprises or consists of SEQ ID NO: 80, 3WJb comprises or consists of SEQ ID NO: 81, and 3WJc comprises or consists of SEQ ID NO: 82; or
the 3WJa comprises or consists of SEQ ID NO: 83, 3WJb comprises or consists of SEQ ID NO: 84, and 3WJc comprises or consists of SEQ ID NO: 85; or
the 3WJa comprises or consists of SEQ ID NO: 7, 3WJb comprises or consists of SEQ ID NO: 89, and 3WJc comprises or consists of SEQ ID NO: 9; or the 3WJa comprises or consists of SEQ ID NO: 90, 3WJb comprises or consists of SEQ ID NO: 91, and 3WJc comprises or consists of SEQ ID NO: 79; or
the 3WJa comprises or consists of SEQ ID NO: 76, 3WJb comprises or consists of SEQ ID NO: 89, and 3WJc comprises or consists of SEQ ID NO: 9; or
the 3WJa comprises or consists of SEQ ID NO: 77, 3WJb comprises or consists of SEQ ID NO: 91, and 3WJc comprises or consists of SEQ ID NO: 79; or
the 3WJa comprises or consists of SEQ ID NO: 80, 3WJb comprises or consists of SEQ ID NO: 93, and 3WJc comprises or consists of SEQ ID NO: 82; or
the 3WJa comprises or consists of SEQ ID NO: 83, 3WJb comprises or consists of SEQ ID NO: 95, and 3WJc comprises or consists of SEQ ID NO: 85; or
the 3WJa comprises or consists of SEQ ID NO: 112, 3WJb comprises or consists of SEQ ID NO: 113, and 3WJc comprises or consists of SEQ ID NO: 114; or
the 3WJa comprises or consists of SEQ ID NO: 119, 3WJb comprises or consists of SEQ ID NO: 120, and 3WJc comprises or consists of SEQ ID NO: 121; or
the 3WJa comprises AUGUGUA, 3WJb comprises UACUUUG, and 3WJc comprises AUCAUG; or
the 3WJa comprises GCGUU, 3WJb comprises UUCGC, and 3WJc comprises GCCAUAGCG; or
the 3WJa comprises GUAUGGCAC, 3WJb comprises GUCACGG, and 3WJc comprises CUCUUAC; or
the 3WJa comprises AUGGUA, 3WJb comprises ACUUUGU, and 3WJc comprises AUCA; or
the 3WJa comprises UGGU, 3WJb comprises ACUUGU, and 3WJc comprises AUCA; or
the 3WJa comprises UGGU, 3WJb comprises ACUGU, and 3WJc comprises AUCA; or
the 3WJa comprises UGGU, 3WJb comprises ACGUU, and 3WJc comprises AAUCA; or
the 3WJa comprises UGUGU, 3WJb comprises ACUUGU, and 3WJc comprises AUCA; or
the 3WJa comprises UGUGU, 3WJb comprises ACUGU, and 3WJc comprises AUCA; or
the 3WJa comprises UGUGU, 3WJb comprises ACGUU, and 3WJc comprises AAUCA; or
the 3WJa comprises UGGU, 3WJb comprises ACUGU, and 3WJc comprises AUCA; or
the 3WJa comprises UAUGGCAC, 3WJb comprises GUCACGG, and 3WJc comprises CUCUUA; or
the 3WJa comprises UAUGG, 3WJb comprises UCACGG, and 3WJc comprises CCUCUUA; or
the 3WJa comprises UAUGGCAC, 3WJb comprises GUCACGG, and 3WJc comprises CUCUUA; or
the 3WJa comprises UAUG, 3WJb comprises CAGGGG, and 3WJc comprises CUUG; or
the 3WJa comprises UAUGU, 3WJb comprises GCAGG, and 3WJc comprises UCUUG; or
the 3WJa comprises UAUGU, 3WJb comprises GCAGGG, and 3WJc comprises CUUG; or
the 3WJa comprises UAUGU, 3WJb comprises GCAGG, and 3WJc comprises UCUUG; or
the 3WJa comprises UGUGU, 3WJb comprises ACUUUGU, and 3WJc comprises AUCA; or
the 3WJa comprises UGUGU, 3WJb comprises ACUUU, and 3WJc comprises AAAUCA.
37. The precursor RNA of aspect 34, wherein the 4WJ comprises
a first branch of the 4WJ domain is formed from a 5' portion of a 4WJa sequence and a 3' portion of a 4WJd sequence and comprises a first helical region,
a second branch of the 4WJ domain is formed from a 3' portion of the 4WJa sequence and a 5' portion of a 4WJb sequence and comprises a second helical region, and
a third branch of the 4WJ domain is formed from a 3' portion of the 4WJb sequence and a 5' portion of a 4WJc sequence and comprises a third helical region, and
a fourth branch of the 4WJ domain is formed from a 3' portion of the 4WJc sequence and a 5' portion of the 4WJd sequence and comprises a fourth helical region,
wherein each of said helical regions comprises a plurality of RNA nucleotide pairs that form canonical Watson-Crick bonds.
38. The precursor RNA of aspect 37, wherein
the 4WJa comprises or consists of SEQ ID NO: 7, 4WJb comprises or consists of SEQ ID NO: 8, 4WJc comprises or consists of SEQ ID NO: 9, and 4WJd comprises or consists of SEQ ID NO: 102; or
the 4WJa comprises or consists of SEQ ID NO: 103, 4WJb comprises or consists of SEQ ID NO: 104, 4WJc comprises or consists of SEQ ID NO: 105, and 4WJd comprises or consists of SEQ ID NO: 106; or
the 4WJa comprises or consists of SEQ ID NO: 115, 4WJb comprises or consists of SEQ ID NO: 116, 4WJc comprises or consists of SEQ ID NO: 117, and 4WJd comprises or consists of SEQ ID NO: 118; or
the 4WJa comprises UGCAGGUG, 4WJb comprises ACGGGC, 4WJc comprises CCAGCA, and 4WJd comprises SEQ ID NO: 67; or
the 4WJa comprises SEQ ID NO: 74, 4WJb comprises AACUG, 4WJc comprises SEQ ID NO: 75, and 4WJd comprises AUCAUG; or
the 4WJa comprises SEQ ID NO: 122, 4WJb comprises GAACU, 4WJc comprises SEQ ID NO: 123, and 4WJd comprises AAUCA.
39. The precursor RNA of aspect 34, wherein the 5WJ comprises
a first branch of the 5WJ domain is formed from a 5' portion of a 5WJa sequence and a 3' portion of a 5WJe sequence and comprises a first helical region,
a second branch of the 5WJ domain is formed from a 3' portion of the 5WJa sequence and a 5' portion of a 5WJb sequence and comprises a second helical region,
a third branch of the 5WJ domain is formed from a 3' portion of the 5WJb sequence and a 5' portion of a 5WJc sequence and comprises a third helical region,
a fourth branch of the 5WJ domain is formed from a 3' portion of the 5WJc sequence and a 5' portion of a 5WJd sequence and comprises a fourth helical region, and
a fifth branch of the 5WJ domain is formed from a 3' portion of the 5WJd sequence and a 5' portion of the 5WJe sequence and comprises a fifth helical region,
wherein each of said helical regions comprises a plurality of RNA nucleotide pairs that form canonical Watson-Crick bonds.
40. The precursor RNA of aspect 39, wherein
the 5WJa comprises or consists of SEQ ID NO: 107, the 5WJb comprises or consists of SEQ ID NO: 108, the 5WJc comprises or consists of SEQ ID NO: 109, the 5WJd comprises or consists of SEQ ID NO: 110, and the 5WJe comprises or consists of SEQ ID NO: 111; or the 5WJa comprises GUGA, the 5WJb comprises UUGC, the 5WJc comprises GUGU, the 5WJd comprises AUGC, and the 5WJe comprises GUGC.

41. The precursor RNA of any one of aspects 33-40, wherein the noncoding region comprises one or more RNA selected from the group consisting of antisense RNA, transfer RNA (tRNA), transfer-messenger RNA (tmRNA), ribosomal RNA (rRNA), signal recognition particle RNA (7SL RNA or SRP RNA), small nuclear RNAs (snRNA), small nucleolar RNA (snoRNA), SmY RNA (SmY), small cajal body-specific RNA (scaRNA), guide RNA (gRNA), Y RNA, spliced leader RNA (SL RNA), microRNAs (miRNA), small Interfering RNA (siRNA), cis-natural antisense transcript (cis-NAT), CRISPR RNA (crRNA), long noncoding RNA (lncRNA), Piwi-interacting RNA (piRNA), short hairpin RNA (shRNA), trans-acting siRNA (tasiRNA), Repeat associated siRNA (rasiRNA), 7SK RNA (7SK), telomerase RNA Component (TERC), Vault RNA (VRNA, vtRNA), and enhancer RNA (eRNA).

42. A vector encoding the precursor RNA of any one of aspects 33-41.

43. The vector of aspect 42 is a plasmid, a viral vector, a polymerase chain reaction (PCR) product, a cosmid, a bacterial artificial chromosome (BAC), or a yeast artificial chromosome (YAC).

Advantages of the present disclosure may include Integrating RNA nanotechnology design, such as thermodynamically stable 3WJ, 4WJ, and 5WJ structures, into artificial circular RNA self-splicing process to facilitate correct folding and to improve self-splicing efficiency, and thus to pave a way for batch production of high quality of circular RNA for therapeutics development.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

What is claimed is:

1. A method of preparing a circular ribonucleic acid (RNA), comprising:
   transcribing a vector to form a precursor RNA comprising the following elements operably connected to each other and arranged in tandem in a 5' to 3' orientation:
   a) a 5' element,
   b) a 3' Group I self-splicing intron fragment,
   c) none or an element comprising an internal ribosome entry site (IRES) and a protein coding region or an element comprising a noncoding region,
   d) a 5' Group I self-splicing intron fragment, and
   e) a 3' element;
   wherein the 5' element and the 3' element form a thermodynamically stable multiple way junction RNA structure with a Gibbs free energy (ΔG) from −190 kcal/mol to −9.0 kcal/mol, provided that the stable structure is not a duplex with at least 95% base pairing between the 5' element and the 3' element,
   wherein the 3' Group I self-splicing intron fragment and the 5' Group I self-splicing intron fragment form a self-cleaving and self-ligating RNA molecule, thereby generating the circular RNA,
   wherein the thermodynamically stable multiple way junction RNA structure comprises a 4-way junction (4WJ) comprising
   a first branch of the 4WJ domain is formed from a 5' portion of a 4WJa sequence and a 3' portion of a 4WJd sequence and comprises a first helical region,
   a second branch of the 4WJ domain is formed from a 3' portion of the 4WJa sequence and a 5' portion of a 4WJb sequence and comprises a second helical region, and
   a third branch of the 4WJ domain is formed from a 3' portion of the 4WJb sequence and a 5' portion of a 4WJc sequence and comprises a third helical region, and
   a fourth branch of the 4WJ domain is formed from a 3' portion of the 4WJc sequence and a 5' portion of the 4WJd sequence and comprises a fourth helical region,
   wherein each of said helical regions comprises a plurality of RNA nucleotide pairs that form canonical Watson-Crick bonds.

2. The method of claim 1, wherein the 5' element comprises none or a sequence that forms at least one stem-loop structure and the 3' element comprises none or a sequence that forms at least one stem-loop structure, provided that, when the 5' element does not comprise a stem-loop structure, then the 3' element comprises at least one stem-loop structure; and, when the 3' element does not comprise a stem-loop structure, then the 5' element comprises at least one stem-loop structure.

3. The method of claim 1, wherein
   the 4WJa comprises or consists of SEQ ID NO: 7, 4WJb comprises or consists of SEQ ID NO: 8, 4WJc comprises or consists of SEQ ID NO: 9, and 4WJd comprises or consists of SEQ ID NO: 102; or
   the 4WJa comprises or consists of SEQ ID NO: 103, 4WJb comprises or consists of SEQ ID NO: 104, 4WJc comprises or consists of SEQ ID NO: 105, and 4WJd comprises or consists of SEQ ID NO: 106; or the 4WJa comprises or consists of SEQ ID NO: 115, 4WJb comprises or consists of SEQ ID NO: 116, 4WJc comprises or consists of SEQ ID NO: 117, and 4WJd comprises or consists of SEQ ID NO: 118; or the 4WJa comprises or consists of UGCAGGUG, 4WJb comprises or consists of ACGGGC, 4WJc comprises or consists of CCAGCA, and 4WJd comprises or consists of SEQ ID NO: 67; or the 4WJa comprises or consists of SEQ ID NO: 74, 4WJb comprises or consists of AACUG, 4WJc comprises or consists of SEQ ID NO: 75, and 4WJd comprises or consists of AUCAUG; or the 4WJa comprises or consists of SEQ ID NO: 122, 4WJb comprises or consists of GAACU, 4WJc comprises or consists of SEQ ID NO: 123, and 4WJd comprises or consists of AAUCA; or the 4WJa comprises or consists of SEQ ID NO: 125, 4WJb comprises or consists of SEQ ID NO: 126, 4WJc comprises or consists of SEQ ID NO: 127, and 4WJd comprises or consists of SEQ ID NO: 128.

4. The method of claim 1, wherein the IRES is selected from an IRES sequence from a virus or a gene selected from the group consisting of: Taura syndrome virus, *Triatoma* virus, Theiler's encephalomyelitis virus, simian Virus 40, *Solenopsis invicta* virus 1, *Rhopalosiphum padi* virus, Reticuloendotheliosis virus, fuman poliovirus 1, *Plautia* stall intestine virus, Kashmir bee virus, Human rhinovirus 2, Homalodisca coagulata virus-1, Human Immunodeficiency Virus type 1, Homalodisca coagulata virus-1, Himetobi P virus, Hepatitis C virus, Hepatitis A virus, Hepatitis GB virus, foot and mouth disease virus, Human enterovirus 71, Equine rhinitis virus, *Ectropis obliqua* picoma-like virus, Encephalomyocarditis virus (EMCV), *Drosophila* C Virus, Crucifer tobamo virus, Cricket paralysis virus, Bovine viral diarrhea virus 1, Black Queen Cell Virus, Aphid lethal paralysis virus, Avian encephalomyelitis virus, Acute bee paralysis virus, Hibiscus chlorotic ringspot virus, Classical swine fever virus, Human fibroblast growth factor 2 (FGF2), Human surfactant protein A1 (SFTPA1), Human acute myeloid leukemia protein 1/runt-related transcription factor 1 (AML1/RUNX1), *Drosophila* antennapedia, Human aquaporin-4 (AQP4), Human type-1 angiotensin II receptor (AT1R), Human BCL2 associated athanogene 1 (BAG-1), Human B-cell lymphoma 2 (BCL2), Human binding immunoglobulin protein (BiP), Human inhibitor of apoptosis family protein 1 (c-IAP1), Human c-myc, Human eukaryotic translation initiation factor 4 G (eIF4G), Mouse N-deacetylase and N-sulfotransferase 4 (NDST4L), Human lymphoid enhancer-binding factor-1 (LEF1), Mouse hypoxia inducible factor 1 subunit alpha (HIF1 alpha), Human N-myc, Mouse glial and testis-specific homeobox protein (Gtx), Human cyclin-dependent kinase inhibitor 1B (p27kip1), Human platelet-derived growth factor B/human homolog of the simian sarcoma virus (PDGF2/c-sis), Human p53, Human Proviral integration site for Moloney murine leukemia virus-1 (Pim-1), Mouse RNA-binding protein 3 (Rbm3), *Drosophila* reaper, Canine Scamper, *Drosophila* Ultrabithorax (Ubx), Salivirus, Cosavirus, Parechovirus, Human upstream of N-ras (UNR), Mouse utrophin A (UtrA), Human vascular endothelial growth factor A (VEGF-A), Human X-linked inhibitor-of-apoptosis protein (XIAP), *Drosophila* hairless, *S. cerevisiae* transcription factor II D (TFIID), *S. cerevisiae* Yes1 Associated Transcriptional Regulator (YAP1), Human proto-oncogene tyrosine-protein kinase Src (c-src), Human fibroblast growth factor 1 (FGF-1), Simian picomavirus, Turnip crinkle virus, Coxsackievirus B3 (CVB3) and Coxsackievirus A (CVB1/2).

5. The method of claim 1, wherein the 3' Group I self-splicing intron fragment and the 5' Group I self-splicing intron fragment are from a *Cyanobacterium anabaena* sp. Pre-tRNA-Leu gene and/or from a T4 phage Td gene.

6. The method of claim 1, further comprising forming the circular RNA by splint-mediated ligation of the precursor RNA.

7. A precursor RNA comprising the following elements operably connected to each other and arranged in tandem in a 5' to 3' orientation:
    a) a 5' element,
    b) a 3' Group I self-splicing intron fragment,
    c) none or an element comprising an IRES and a protein coding region or an element comprising a noncoding region,
    d) a 5' Group I self-splicing intron fragment, and
    e) a 3' element
    wherein the 5' element and the 3' element form a thermodynamically stable multiple way junction RNA structure with a Gibbs free energy ($\Delta G$) from $-190$ kcal/mol to $-9.0$ kcal/mol, provided that the stable structure is not a duplex with at least 95% base pairing between the 5' element and the 3' element,
    wherein the 3' Group I self-splicing intron fragment and the 5' Group I self-splicing intron fragment form a self-cleaving and self-ligating RNA molecule, thereby generating the circular RNA
    wherein the thermodynamically stable multiple way junction RNA structure comprises a 4-way junction (4WJ) comprising
        a first branch of the 4WJ domain is formed from a 5' portion of a 4WJa sequence and a 3' portion of a 4WJd sequence and comprises a first helical region,
        a second branch of the 4WJ domain is formed from a 3' portion of the 4WJa sequence and a 5' portion of a 4WJb sequence and comprises a second helical region, and
        a third branch of the 4WJ domain is formed from a 3' portion of the 4WJb sequence and a 5' portion of a 4WJc sequence and comprises a third helical region, and
        a fourth branch of the 4WJ domain is formed from a 3' portion of the 4WJc sequence and a 5' portion of the 4WJd sequence and comprises a fourth helical region,
            wherein each of said helical regions comprises a plurality of RNA nucleotide pairs that form canonical Watson-Crick bonds.

8. The precursor RNA of claim 7, wherein the 5' element comprises none or a sequence that forms at least one stem-loop structure and the 3' element comprises none or a sequence that forms at least one stem-loop structure, provided that, when the 5' element does not comprise a stem-loop structure, then the 3' element comprises at least one stem-loop structure; and, when the 3' element does not comprise a stem-loop structure, then the 5' element comprises at least one stem-loop structure.

9. The precursor RNA of claim 7, wherein
    the 4WJa comprises or consists of SEQ ID NO: 7, 4WJb comprises or consists of SEQ ID NO: 8, 4WJc comprises or consists of SEQ ID NO: 9, and 4WJd comprises or consists of SEQ ID NO: 102; or
    the 4WJa comprises or consists of SEQ ID NO: 103, 4WJb comprises or consists of SEQ ID NO: 104, 4WJc comprises or consists of SEQ ID NO: 105, and 4WJd comprises or consists of SEQ ID NO: 106; or the 4WJa comprises or consists of SEQ ID NO: 115, 4WJb comprises or consists of SEQ ID NO: 116, 4WJc comprises or consists of SEQ ID NO: 117, and 4WJd comprises or consists of SEQ ID NO: 118; or the 4WJa comprises or consists of UGCAGGUG, 4WJb comprises or consists of ACGGGC, 4WJc comprises or consists of CCAGCA, and 4WJd comprises or consists of SEQ ID NO: 67; or the 4WJa comprises or consists of SEQ ID NO: 74, 4WJb comprises or consists of AACUG, 4WJc comprises or consists of SEQ ID NO: 75, and 4WJd comprises or consists of AUCAUG; or the 4WJa comprises or consists of SEQ ID NO: 122, 4WJb comprises or consists of GAACU, 4WJc comprises or consists of SEQ ID NO: 123, and 4WJd comprises or consists of AAUCA; or the 4WJa comprises or consists of SEQ ID NO: 125, 4WJb comprises or consists of SEQ ID NO: 126, 4WJc comprises or consists of SEQ ID NO: 127, and 4WJd comprises or consists of SEQ ID NO: 128.

10. A method of producing a protein in a cell, comprising introducing to the cell the precursor RNA of claim 7 comprising the protein coding region, and producing the protein.

11. A method of editing a gene in a cell, comprising introducing to the cell the precursor RNA of claim 7 comprising the noncoding region capable of editing the gene, and editing the gene.

12. The precursor RNA of claim 9, wherein the 4WJa comprises or consists of SEQ ID NO: 7, 4WJb comprises or consists of SEQ ID NO: 8, 4WJc comprises or consists of SEQ ID NO: 9, and 4WJd comprises or consists of SEQ ID NO: 102.

13. The precursor RNA of claim 9, wherein the 4WJa comprises or consists of SEQ ID NO: 103, 4WJb comprises or consists of SEQ ID NO: 104, 4WJc comprises or consists of SEQ ID NO: 105, and 4WJd comprises or consists of SEQ ID NO: 106.

14. The precursor RNA of claim 9, wherein the 4WJa comprises or consists of SEQ ID NO: 115, 4WJb comprises or consists of SEQ ID NO: 116, 4WJc comprises or consists of SEQ ID NO: 117, and 4WJd comprises or consists of SEQ ID NO: 118.

15. The precursor RNA of claim 9, wherein the 4WJa comprises or consists of UGCAGGUG, 4WJb comprises or consists of ACGGGC, 4WJc comprises or consists of CCAGCA, and 4WJd comprises or consists of SEQ ID NO: 67.

16. The precursor RNA of claim 9, wherein the 4WJa comprises or consists of SEQ ID NO: 74, 4WJb comprises or consists of AACUG, 4WJc comprises or consists of SEQ ID NO: 75, and 4WJd comprises or consists of AUCAUG.

17. The precursor RNA of claim 9, wherein the 4WJa comprises or consists of SEQ ID NO: 122, 4WJb comprises or consists of GAACU, 4WJc comprises or consists of SEQ ID NO: 123, and 4WJd comprises or consists of AAUCA.

18. The precursor RNA of claim 9, wherein the 4WJa comprises or consists of SEQ ID NO: 125, 4WJb comprises or consists of SEQ ID NO: 126, 4WJc comprises or consists of SEQ ID NO: 127, and 4WJd comprises or consists of SEQ ID NO: 128.

19. The method of claim 9, wherein the 4WJa comprises or consists of SEQ ID NO: 7, 4WJb comprises or consists of SEQ ID NO: 8, 4WJc comprises or consists of SEQ ID NO: 9, and 4WJd comprises or consists of SEQ ID NO: 102.

20. The method of claim 9, wherein the 4WJa comprises or consists of SEQ ID NO: 103, 4WJb comprises or consists of SEQ ID NO: 104, 4WJc comprises or consists of SEQ ID NO: 105, and 4WJd comprises or consists of SEQ ID NO: 106.

21. The method of claim 9, wherein the 4WJa comprises or consists of SEQ ID NO: 115, 4WJb comprises or consists of SEQ ID NO: 116, 4WJc comprises or consists of SEQ ID NO: 117, and 4WJd comprises or consists of SEQ ID NO: 118.

22. The method of claim 9, wherein the 4WJa comprises or consists of UGCAGGUG, 4WJb comprises or consists of ACGGGC, 4WJc comprises or consists of CCAGCA, and 4WJd comprises or consists of SEQ ID NO: 67.

23. The method of claim 9, wherein the 4WJa comprises or consists of SEQ ID NO: 74, 4WJb comprises or consists of AACUG, 4WJc comprises or consists of SEQ ID NO: 75, and 4WJd comprises or consists of AUCAUG.

24. The method of claim 9, wherein the 4WJa comprises or consists of SEQ ID NO: 122, 4WJb comprises or consists of GAACU, 4WJc comprises or consists of SEQ ID NO: 123, and 4WJd comprises or consists of AAUCA.

25. The method of claim 9, wherein the 4WJa comprises or consists of SEQ ID NO: 125, 4WJb comprises or consists of SEQ ID NO: 126, 4WJc comprises or consists of SEQ ID NO: 127, and 4WJd comprises or consists of SEQ ID NO: 128.

* * * * *

```
                            SEQUENCE LISTING

Sequence total quantity: 128
SEQ ID NO: 1           moltype = RNA  length = 19
FEATURE                Location/Qualifiers
source                 1..19
                       mol_type = other RNA
                       organism = synthetic construct
SEQUENCE: 1
attgccatgt gtatgtggg                                                    19

SEQ ID NO: 2           moltype = RNA  length = 18
FEATURE                Location/Qualifiers
source                 1..18
                       mol_type = other RNA
                       organism = synthetic construct
SEQUENCE: 2
cccacatact ttgttgat                                                     18

SEQ ID NO: 3           moltype = RNA  length = 14
FEATURE                Location/Qualifiers
source                 1..14
                       mol_type = other RNA
                       organism = synthetic construct
SEQUENCE: 3
gtcaatcatg gcaa                                                         14

SEQ ID NO: 4           moltype = RNA  length = 17
FEATURE                Location/Qualifiers
source                 1..17
                       mol_type = other RNA
                       organism = synthetic construct
SEQUENCE: 4
cccaccagcg ttccggg                                                      17

SEQ ID NO: 5           moltype = RNA  length = 15
FEATURE                Location/Qualifiers
source                 1..15
                       mol_type = other RNA
                       organism = synthetic construct
SEQUENCE: 5
cccggttcgc cgcca                                                        15

SEQ ID NO: 6           moltype = RNA  length = 19
FEATURE                Location/Qualifiers
source                 1..19
```

```
                            mol_type = other RNA
                            organism = synthetic construct
SEQUENCE: 6
aggcggccat agcggtggg                                                        19

SEQ ID NO: 7               moltype = RNA  length = 40
FEATURE                    Location/Qualifiers
source                     1..40
                           mol_type = other RNA
                           organism = synthetic construct
SEQUENCE: 7
ttaggtaaag ccacctgcag gtgctaccga tgtaattcaa                                 40

SEQ ID NO: 8               moltype = RNA  length = 41
FEATURE                    Location/Qualifiers
source                     1..41
                           mol_type = other RNA
                           organism = synthetic construct
SEQUENCE: 8
ttgaattaca tcggtagcac gggctgtgcg aggctgaaca g                               41

SEQ ID NO: 9               moltype = RNA  length = 38
FEATURE                    Location/Qualifiers
source                     1..38
                           mol_type = other RNA
                           organism = synthetic construct
SEQUENCE: 9
ctgttcagcc tcgcacagcc agcacgcacc tgaatagg                                   38

SEQ ID NO: 10              moltype = RNA  length = 21
FEATURE                    Location/Qualifiers
source                     1..21
                           mol_type = other RNA
                           organism = synthetic construct
SEQUENCE: 10
gcaatagtat ggcacatgtg c                                                     21

SEQ ID NO: 11              moltype = RNA  length = 19
FEATURE                    Location/Qualifiers
source                     1..19
                           mol_type = other RNA
                           organism = synthetic construct
SEQUENCE: 11
gcacatgtca cggggtagg                                                        19

SEQ ID NO: 12              moltype = RNA  length = 19
FEATURE                    Location/Qualifiers
source                     1..19
                           mol_type = other RNA
                           organism = synthetic construct
SEQUENCE: 12
cctaccctct tactattgc                                                        19

SEQ ID NO: 13              moltype = RNA  length = 19
FEATURE                    Location/Qualifiers
source                     1..19
                           mol_type = other RNA
                           organism = synthetic construct
SEQUENCE: 13
cttgtcatgg tatgttgcc                                                        19

SEQ ID NO: 14              moltype = RNA  length = 20
FEATURE                    Location/Qualifiers
source                     1..20
                           mol_type = other RNA
                           organism = synthetic construct
SEQUENCE: 14
ggcacatact tgttgatagg                                                       20

SEQ ID NO: 15              moltype = RNA  length = 19
FEATURE                    Location/Qualifiers
source                     1..19
                           mol_type = other RNA
                           organism = synthetic construct
SEQUENCE: 15
ggcacatact gttgatagg                                                        19

SEQ ID NO: 16              moltype = RNA  length = 18
FEATURE                    Location/Qualifiers
```

```
source                  1..18
                        mol_type = other RNA
                        organism = synthetic construct
SEQUENCE: 16
ggcacatacg ttgatagg                                                         18

SEQ ID NO: 17           moltype = RNA   length = 18
FEATURE                 Location/Qualifiers
source                  1..18
                        mol_type = other RNA
                        organism = synthetic construct
SEQUENCE: 17
ttgtcatggt atgttgcc                                                         18

SEQ ID NO: 18           moltype = RNA   length = 17
FEATURE                 Location/Qualifiers
source                  1..17
                        mol_type = other RNA
                        organism = synthetic construct
SEQUENCE: 18
cctgtcaatc atggcaa                                                          17

SEQ ID NO: 19           moltype = RNA   length = 17
FEATURE                 Location/Qualifiers
source                  1..17
                        mol_type = other RNA
                        organism = synthetic construct
SEQUENCE: 19
ttgtcatggt atgttgc                                                          17

SEQ ID NO: 20           moltype = RNA   length = 18
FEATURE                 Location/Qualifiers
source                  1..18
                        mol_type = other RNA
                        organism = synthetic construct
SEQUENCE: 20
gcacatactg ttgatagg                                                         18

SEQ ID NO: 21           moltype = RNA   length = 17
FEATURE                 Location/Qualifiers
source                  1..17
                        mol_type = other RNA
                        organism = synthetic construct
SEQUENCE: 21
gcacatactg ttgatag                                                          17

SEQ ID NO: 22           moltype = RNA   length = 16
FEATURE                 Location/Qualifiers
source                  1..16
                        mol_type = other RNA
                        organism = synthetic construct
SEQUENCE: 22
ctgtcaatca tggcaa                                                           16

SEQ ID NO: 23           moltype = RNA   length = 16
FEATURE                 Location/Qualifiers
source                  1..16
                        mol_type = other RNA
                        organism = synthetic construct
SEQUENCE: 23
tgtcatggta tgttgc                                                           16

SEQ ID NO: 24           moltype = RNA   length = 15
FEATURE                 Location/Qualifiers
source                  1..15
                        mol_type = other RNA
                        organism = synthetic construct
SEQUENCE: 24
ctgtcaatca tggca                                                            15

SEQ ID NO: 25           moltype = RNA   length = 15
FEATURE                 Location/Qualifiers
source                  1..15
                        mol_type = other RNA
                        organism = synthetic construct
SEQUENCE: 25
tgtcatggta tgttg                                                            15

SEQ ID NO: 26           moltype = RNA   length = 16
```

```
FEATURE                 Location/Qualifiers
source                  1..16
                        mol_type = other RNA
                        organism = synthetic construct
SEQUENCE: 26
cacatactgt tgatag                                                           16

SEQ ID NO: 27           moltype = RNA   length = 15
FEATURE                 Location/Qualifiers
source                  1..15
                        mol_type = other RNA
                        organism = synthetic construct
SEQUENCE: 27
cacatactgt tgata                                                            15

SEQ ID NO: 28           moltype = RNA   length = 14
FEATURE                 Location/Qualifiers
source                  1..14
                        mol_type = other RNA
                        organism = synthetic construct
SEQUENCE: 28
tgtcaatcat ggca                                                             14

SEQ ID NO: 29           moltype = RNA   length = 14
FEATURE                 Location/Qualifiers
source                  1..14
                        mol_type = other RNA
                        organism = synthetic construct
SEQUENCE: 29
gtcatggtat gttg                                                             14

SEQ ID NO: 30           moltype = RNA   length = 13
FEATURE                 Location/Qualifiers
source                  1..13
                        mol_type = other RNA
                        organism = synthetic construct
SEQUENCE: 30
tgtcaatcat ggc                                                              13

SEQ ID NO: 31           moltype = RNA   length = 13
FEATURE                 Location/Qualifiers
source                  1..13
                        mol_type = other RNA
                        organism = synthetic construct
SEQUENCE: 31
gtcatggtat gtt                                                              13

SEQ ID NO: 32           moltype = RNA   length = 14
FEATURE                 Location/Qualifiers
source                  1..14
                        mol_type = other RNA
                        organism = synthetic construct
SEQUENCE: 32
acatactgtt gata                                                             14

SEQ ID NO: 33           moltype = RNA   length = 13
FEATURE                 Location/Qualifiers
source                  1..13
                        mol_type = other RNA
                        organism = synthetic construct
SEQUENCE: 33
acatactgtt gat                                                              13

SEQ ID NO: 34           moltype = RNA   length = 12
FEATURE                 Location/Qualifiers
source                  1..12
                        mol_type = other RNA
                        organism = synthetic construct
SEQUENCE: 34
gtcaatcatg gc                                                               12

SEQ ID NO: 35           moltype = RNA   length = 12
FEATURE                 Location/Qualifiers
source                  1..12
                        mol_type = other RNA
                        organism = synthetic construct
SEQUENCE: 35
tcatggtatg tt                                                               12
```

-continued

| | | |
|---|---|---|
| SEQ ID NO: 36<br>FEATURE<br>source | moltype = RNA   length = 11<br>Location/Qualifiers<br>1..11<br>mol_type = other RNA<br>organism = synthetic construct | |
| SEQUENCE: 36<br>gtcaatcatg g | | 11 |
| SEQ ID NO: 37<br>FEATURE<br>source | moltype = RNA   length = 11<br>Location/Qualifiers<br>1..11<br>mol_type = other RNA<br>organism = synthetic construct | |
| SEQUENCE: 37<br>gtcaatcatg g | | 11 |
| SEQ ID NO: 38<br>FEATURE<br>source | moltype = RNA   length = 12<br>Location/Qualifiers<br>1..12<br>mol_type = other RNA<br>organism = synthetic construct | |
| SEQUENCE: 38<br>catactgttg at | | 12 |
| SEQ ID NO: 39<br>FEATURE<br>source | moltype = RNA   length = 11<br>Location/Qualifiers<br>1..11<br>mol_type = other RNA<br>organism = synthetic construct | |
| SEQUENCE: 39<br>catactgttg a | | 11 |
| SEQ ID NO: 40<br>FEATURE<br>source | moltype = RNA   length = 10<br>Location/Qualifiers<br>1..10<br>mol_type = other RNA<br>organism = synthetic construct | |
| SEQUENCE: 40<br>tcaatcatgg | | 10 |
| SEQ ID NO: 41<br>FEATURE<br>source | moltype = RNA   length = 20<br>Location/Qualifiers<br>1..20<br>mol_type = other RNA<br>organism = synthetic construct | |
| SEQUENCE: 41<br>caatagtatg gcacatgtgc | | 20 |
| SEQ ID NO: 42<br>FEATURE<br>source | moltype = RNA   length = 18<br>Location/Qualifiers<br>1..18<br>mol_type = other RNA<br>organism = synthetic construct | |
| SEQUENCE: 42<br>cctaccctct tactattg | | 18 |
| SEQ ID NO: 43<br>FEATURE<br>source | moltype = RNA   length = 19<br>Location/Qualifiers<br>1..19<br>mol_type = other RNA<br>organism = synthetic construct | |
| SEQUENCE: 43<br>caatagtatg gcacatgtg | | 19 |
| SEQ ID NO: 44<br>FEATURE<br>source | moltype = RNA   length = 18<br>Location/Qualifiers<br>1..18<br>mol_type = other RNA<br>organism = synthetic construct | |
| SEQUENCE: 44<br>cacatgtcac ggggtagg | | 18 |
| SEQ ID NO: 45<br>FEATURE<br>source | moltype = RNA   length = 18<br>Location/Qualifiers<br>1..18<br>mol_type = other RNA<br>organism = synthetic construct | |
| SEQUENCE: 45<br>cacatgtcac ggggtagg | | 18 |

| | | |
|---|---|---|
| SEQ ID NO: 46<br>FEATURE<br>source | moltype = RNA   length = 17<br>Location/Qualifiers<br>1..17<br>mol_type = other RNA<br>organism = synthetic construct | |
| SEQUENCE: 46<br>ctaccctctt actattg | | 17 |
| SEQ ID NO: 47<br>FEATURE<br>source | moltype = RNA   length = 18<br>Location/Qualifiers<br>1..18<br>mol_type = other RNA<br>organism = synthetic construct | |
| SEQUENCE: 47<br>aatagtatgg cacatgtg | | 18 |
| SEQ ID NO: 48<br>FEATURE<br>source | moltype = RNA   length = 16<br>Location/Qualifiers<br>1..16<br>mol_type = other RNA<br>organism = synthetic construct | |
| SEQUENCE: 48<br>ctaccctctt actatt | | 16 |
| SEQ ID NO: 49<br>FEATURE<br>source | moltype = RNA   length = 17<br>Location/Qualifiers<br>1..17<br>mol_type = other RNA<br>organism = synthetic construct | |
| SEQUENCE: 49<br>aatagtatgg cacatgt | | 17 |
| SEQ ID NO: 50<br>FEATURE<br>source | moltype = RNA   length = 17<br>Location/Qualifiers<br>1..17<br>mol_type = other RNA<br>organism = synthetic construct | |
| SEQUENCE: 50<br>acatgtcacg gggtagg | | 17 |
| SEQ ID NO: 51<br>FEATURE<br>source | moltype = RNA   length = 16<br>Location/Qualifiers<br>1..16<br>mol_type = other RNA<br>organism = synthetic construct | |
| SEQUENCE: 51<br>acatgtcacg gggtag | | 16 |
| SEQ ID NO: 52<br>FEATURE<br>source | moltype = RNA   length = 15<br>Location/Qualifiers<br>1..15<br>mol_type = other RNA<br>organism = synthetic construct | |
| SEQUENCE: 52<br>taccctctta ctatt | | 15 |
| SEQ ID NO: 53<br>FEATURE<br>source | moltype = RNA   length = 16<br>Location/Qualifiers<br>1..16<br>mol_type = other RNA<br>organism = synthetic construct | |
| SEQUENCE: 53<br>atagtatggc acatgt | | 16 |
| SEQ ID NO: 54<br>FEATURE<br>source | moltype = RNA   length = 14<br>Location/Qualifiers<br>1..14<br>mol_type = other RNA<br>organism = synthetic construct | |
| SEQUENCE: 54<br>taccctctta ctat | | 14 |
| SEQ ID NO: 55<br>FEATURE<br>source | moltype = RNA   length = 15<br>Location/Qualifiers<br>1..15<br>mol_type = other RNA<br>organism = synthetic construct | |
| SEQUENCE: 55 | | |

```
atagtatggc acatg                                                          15

SEQ ID NO: 57           moltype = RNA   length = 15
FEATURE                 Location/Qualifiers
source                  1..15
                        mol_type = other RNA
                        organism = synthetic construct SEQUENCE: 56
catgtcacgg ggtag                                                          15

SEQ ID NO: 57           moltype = RNA   length = 14
FEATURE                 Location/Qualifiers
source                  1..14
                        mol_type = other RNA
                        organism = synthetic construct SEQUENCE: 57
catgtcacgg ggta                                                           14

SEQ ID NO: 58           moltype = RNA   length = 13
FEATURE                 Location/Qualifiers
source                  1..13
                        mol_type = other RNA
                        organism = synthetic construct SEQUENCE: 58
accctcttac tat                                                            13

SEQ ID NO: 59           moltype = RNA   length = 14
FEATURE                 Location/Qualifiers
source                  1..14
                        mol_type = other RNA
                        organism = synthetic construct SEQUENCE: 59
tagtatggca catg                                                           14

SEQ ID NO: 60           moltype = RNA   length = 12
FEATURE                 Location/Qualifiers
source                  1..12
                        mol_type = other RNA
                        organism = synthetic construct SEQUENCE: 60
accctcttac ta                                                             12

SEQ ID NO: 61           moltype = RNA   length = 13
FEATURE                 Location/Qualifiers
source                  1..13
                        mol_type = other RNA
                        organism = synthetic construct SEQUENCE: 61
tagtatggca cat                                                            13

SEQ ID NO: 62           moltype = RNA   length = 13
FEATURE                 Location/Qualifiers
source                  1..13
                        mol_type = other RNA
                        organism = synthetic construct SEQUENCE: 62
atgtcacggg gta                                                            13

SEQ ID NO: 63           moltype = RNA   length = 11
FEATURE                 Location/Qualifiers
source                  1..11
                        mol_type = other RNA
                        organism = synthetic construct SEQUENCE: 63
atgtcacggg g                                                              11

SEQ ID NO: 64           moltype = RNA   length = 11
FEATURE                 Location/Qualifiers
source                  1..11
                        mol_type = other RNA
                        organism = synthetic construct SEQUENCE: 64
ccctcttact a                                                              11

SEQ ID NO: 65           moltype = RNA   length = 12
FEATURE                 Location/Qualifiers
source                  1..12
                        mol_type = other RNA
                        organism = synthetic construct
```

| | | |
|---|---|---|
| SEQUENCE: 65 | | |
| tagtatggca ca | | 12 |
| SEQ ID NO: 66<br>FEATURE<br>source | moltype = RNA length = 10<br>Location/Qualifiers<br>1..10<br>mol_type = other RNA<br>organism = synthetic construct | |
| SEQUENCE: 66 | | |
| tgtcacgggg | | 10 |
| SEQ ID NO: 67<br>FEATURE<br>source | moltype = RNA length = 11<br>Location/Qualifiers<br>1..11<br>mol_type = other RNA<br>organism = synthetic construct | |
| SEQUENCE: 67 | | |
| gctgggctgg c | | 11 |
| SEQ ID NO: 68<br>FEATURE<br>source | moltype = RNA length = 10<br>Location/Qualifiers<br>1..10<br>mol_type = other RNA<br>organism = synthetic construct | |
| SEQUENCE: 68 | | |
| cctcttacta | | 10 |
| SEQ ID NO: 69<br>FEATURE<br>source | moltype = RNA length = 17<br>Location/Qualifiers<br>1..17<br>mol_type = other RNA<br>organism = synthetic construct | |
| SEQUENCE: 69 | | |
| cacatgtcac ggggtag | | 17 |
| SEQ ID NO: 70<br>FEATURE<br>source | moltype = RNA length = 16<br>Location/Qualifiers<br>1..16<br>mol_type = other RNA<br>organism = synthetic construct | |
| SEQUENCE: 70 | | |
| cacatgtcac ggggta | | 16 |
| SEQ ID NO: 71<br>FEATURE<br>source | moltype = RNA length = 12<br>Location/Qualifiers<br>1..12<br>mol_type = other RNA<br>organism = synthetic construct | |
| SEQUENCE: 71 | | |
| catgtcacgg gg | | 12 |
| SEQ ID NO: 72<br>FEATURE<br>source | moltype = RNA length = 12<br>Location/Qualifiers<br>1..12<br>mol_type = other RNA<br>organism = synthetic construct | |
| SEQUENCE: 72 | | |
| ccctcttact at | | 12 |
| SEQ ID NO: 73<br>FEATURE<br>source | moltype = RNA length = 10<br>Location/Qualifiers<br>1..10<br>mol_type = other RNA<br>organism = synthetic construct | |
| SEQUENCE: 73 | | |
| agtatggcac | | 10 |
| SEQ ID NO: 74<br>FEATURE<br>variation<br><br>source | moltype = RNA length = 14<br>Location/Qualifiers<br>7..9<br>note = n is a, c, g, or u<br>1..14<br>mol_type = other RNA<br>organism = synthetic construct | |
| SEQUENCE: 74 | | |
| tgtgtannng ggtt | | 14 |
| SEQ ID NO: 75<br>FEATURE | moltype = RNA length = 16<br>Location/Qualifiers | |

-continued

| | | |
|---|---|---|
| variation | 7..9 | |
| | note = n is a, c, g, or u | |
| source | 1..16 | |
| | mol_type = other RNA | |
| | organism = synthetic construct | |
| SEQUENCE: 75 | | |
| cagcccnnna ctttgt | | 16 |
| | | |
| SEQ ID NO: 76 | moltype = RNA   length = 18 | |
| FEATURE | Location/Qualifiers | |
| source | 1..18 | |
| | mol_type = other RNA | |
| | organism = synthetic construct | |
| SEQUENCE: 76 | | |
| gctaatgtat gttgtccg | | 18 |
| | | |
| SEQ ID NO: 77 | moltype = RNA   length = 16 | |
| FEATURE | Location/Qualifiers | |
| source | 1..16 | |
| | mol_type = other RNA | |
| | organism = synthetic construct | |
| SEQUENCE: 77 | | |
| ctaatgtatg ttgtcc | | 16 |
| | | |
| SEQ ID NO: 78 | moltype = RNA   length = 18 | |
| FEATURE | Location/Qualifiers | |
| source | 1..18 | |
| | mol_type = other RNA | |
| | organism = synthetic construct | |
| SEQUENCE: 78 | | |
| ggacagcagg ggagcgtg | | 18 |
| | | |
| SEQ ID NO: 79 | moltype = RNA   length = 16 | |
| FEATURE | Location/Qualifiers | |
| source | 1..16 | |
| | mol_type = other RNA | |
| | organism = synthetic construct | |
| SEQUENCE: 79 | | |
| cacactcttg cattag | | 16 |
| | | |
| SEQ ID NO: 80 | moltype = RNA   length = 14 | |
| FEATURE | Location/Qualifiers | |
| source | 1..14 | |
| | mol_type = other RNA | |
| | organism = synthetic construct | |
| SEQUENCE: 80 | | |
| taatgtatgt tgtc | | 14 |
| | | |
| SEQ ID NO: 81 | moltype = RNA   length = 16 | |
| FEATURE | Location/Qualifiers | |
| source | 1..16 | |
| | mol_type = other RNA | |
| | organism = synthetic construct | |
| SEQUENCE: 81 | | |
| gacagcaggg gagcgt | | 16 |
| | | |
| SEQ ID NO: 82 | moltype = RNA   length = 14 | |
| FEATURE | Location/Qualifiers | |
| source | 1..14 | |
| | mol_type = other RNA | |
| | organism = synthetic construct | |
| SEQUENCE: 82 | | |
| acactcttgc atta | | 14 |
| | | |
| SEQ ID NO: 83 | moltype = RNA   length = 12 | |
| FEATURE | Location/Qualifiers | |
| source | 1..12 | |
| | mol_type = other RNA | |
| | organism = synthetic construct | |
| SEQUENCE: 83 | | |
| aatgtatgtt gt | | 12 |
| | | |
| SEQ ID NO: 84 | moltype = RNA   length = 14 | |
| FEATURE | Location/Qualifiers | |
| source | 1..14 | |
| | mol_type = other RNA | |
| | organism = synthetic construct | |
| SEQUENCE: 84 | | |
| acagcagggg agcg | | 14 |

-continued

```
SEQ ID NO: 85              moltype = RNA  length = 12
FEATURE                    Location/Qualifiers
source                     1..12
                           mol_type = other RNA
                           organism = synthetic construct SEQUENCE: 85
cactcttgca tt                                                              12

SEQ ID NO: 86              moltype = RNA  length = 10
FEATURE                    Location/Qualifiers
source                     1..10
                           mol_type = other RNA
                           organism = synthetic construct SEQUENCE: 86
atgtatgttg                                                                 10

SEQ ID NO: 87              moltype = RNA  length = 12
FEATURE                    Location/Qualifiers
source                     1..12
                           mol_type = other RNA
                           organism = synthetic construct SEQUENCE: 87
cagcagggga gc                                                              12

SEQ ID NO: 88              moltype = RNA  length = 10
FEATURE                    Location/Qualifiers
source                     1..10
                           mol_type = other RNA
                           organism = synthetic construct SEQUENCE: 88
actcttgcat                                                                 10

SEQ ID NO: 89              moltype = RNA  length = 19
FEATURE                    Location/Qualifiers
source                     1..19
                           mol_type = other RNA
                           organism = synthetic construct SEQUENCE: 89
cggacagcag ggagcgtgc                                                       19

SEQ ID NO: 90              moltype = RNA  length = 17
FEATURE                    Location/Qualifiers
source                     1..17
                           mol_type = other RNA
                           organism = synthetic construct SEQUENCE: 90
ctaatgtatg tgtgtcc                                                         17

SEQ ID NO: 91              moltype = RNA  length = 17
FEATURE                    Location/Qualifiers
source                     1..17
                           mol_type = other RNA
                           organism = synthetic construct SEQUENCE: 91
ggacagcagg gagcgtg                                                         17

SEQ ID NO: 92              moltype = RNA  length = 15
FEATURE                    Location/Qualifiers
source                     1..15
                           mol_type = other RNA
                           organism = synthetic construct SEQUENCE: 92
taatgtatgt gtgtc                                                           15

SEQ ID NO: 93              moltype = RNA  length = 15
FEATURE                    Location/Qualifiers
source                     1..15
                           mol_type = other RNA
                           organism = synthetic construct SEQUENCE: 93
gacagcaggg agcgt                                                           15

SEQ ID NO: 94              moltype = RNA  length = 13
FEATURE                    Location/Qualifiers
source                     1..13
                           mol_type = other RNA
                           organism = synthetic construct

SEQUENCE: 94
```

```
aatgtatgtg tgt                                                                13

SEQ ID NO: 95           moltype = RNA   length = 13
FEATURE                 Location/Qualifiers
source                  1..13
                        mol_type = other RNA
                        organism = synthetic construct
SEQUENCE: 95
acagcaggga gcg                                                                13

SEQ ID NO: 96           moltype = RNA   length = 12
FEATURE                 Location/Qualifiers
source                  1..12
                        mol_type = other RNA
                        organism = synthetic construct
SEQUENCE: 96
cactcttgca tt                                                                 12

SEQ ID NO: 97           moltype = RNA   length = 11
FEATURE                 Location/Qualifiers
source                  1..11
                        mol_type = other RNA
                        organism = synthetic construct
SEQUENCE: 97
atgtatgtgt g                                                                  11

SEQ ID NO: 98           moltype = RNA   length = 11
FEATURE                 Location/Qualifiers
source                  1..11
                        mol_type = other RNA
                        organism = synthetic construct
SEQUENCE: 98
cagcagggag c                                                                  11

SEQ ID NO: 99           moltype = RNA   length = 13
FEATURE                 Location/Qualifiers
source                  1..13
                        mol_type = other RNA
                        organism = synthetic construct
SEQUENCE: 99
tataggctgt gca                                                                13

SEQ ID NO: 100          moltype = RNA   length = 11
FEATURE                 Location/Qualifiers
source                  1..11
                        mol_type = other RNA
                        organism = synthetic construct
SEQUENCE: 100
tgacaggttg t                                                                  11

SEQ ID NO: 101          moltype = RNA   length = 11
FEATURE                 Location/Qualifiers
source                  1..11
                        mol_type = other RNA
                        organism = synthetic construct
SEQUENCE: 101
gcaatactat a                                                                  11

SEQ ID NO: 102          moltype = RNA   length = 42
FEATURE                 Location/Qualifiers
source                  1..42
                        mol_type = other RNA
                        organism = synthetic construct
SEQUENCE: 102
cctattcagg tgcgtgctgg gctggcaggt ggctttacct aa                                42

SEQ ID NO: 103          moltype = RNA   length = 27
FEATURE                 Location/Qualifiers
source                  1..27
                        mol_type = other RNA
                        organism = synthetic construct
SEQUENCE: 103
ttgccatgtg tatgtgggtt ccagcac                                                 27

SEQ ID NO: 104          moltype = RNA   length = 17
FEATURE                 Location/Qualifiers
source                  1..17
                        mol_type = other RNA
                        organism = synthetic construct
```

```
SEQUENCE: 104
gtgctggaac tgactgc                                                17

SEQ ID NO: 105          moltype = RNA   length = 28
FEATURE                 Location/Qualifiers
source                  1..28
                        mol_type = other RNA
                        organism = synthetic construct
SEQUENCE: 105
gcagtcagcc cacatacttt gttgatcc                                    28

SEQ ID NO: 106          moltype = RNA   length = 16
FEATURE                 Location/Qualifiers
source                  1..16
                        mol_type = other RNA
                        organism = synthetic construct
SEQUENCE: 106
ggatcaatca tggcaa                                                 16

SEQ ID NO: 107          moltype = RNA   length = 42
FEATURE                 Location/Qualifiers
source                  1..42
                        mol_type = other RNA
                        organism = synthetic construct
SEQUENCE: 107
gagtatatgt taggcctggg tgagtccttg cgtcttctac cg                    42

SEQ ID NO: 108          moltype = RNA   length = 42
FEATURE                 Location/Qualifiers
source                  1..42
                        mol_type = other RNA
                        organism = synthetic construct
SEQUENCE: 108
cggtagaaga cgcaaggact tgctagttgt ggtactgttc cc                    42

SEQ ID NO: 109          moltype = RNA   length = 41
FEATURE                 Location/Qualifiers
source                  1..41
                        mol_type = other RNA
                        organism = synthetic construct
SEQUENCE: 109
gggaacagta ccacaactag tgtcccggga tagggacata c                     41

SEQ ID NO: 110          moltype = RNA   length = 39
FEATURE                 Location/Qualifiers
source                  1..39
                        mol_type = other RNA
                        organism = synthetic construct
SEQUENCE: 110
tgtatgtccc tatcccggga tgctccgcat gaatacagc                        39

SEQ ID NO: 111          moltype = RNA   length = 39
FEATURE                 Location/Qualifiers
source                  1..39
                        mol_type = other RNA
                        organism = synthetic construct
SEQUENCE: 111
gctgtattca tgcggagtgc ccaggcctaa catatactc                        39

SEQ ID NO: 112          moltype = RNA   length = 25
FEATURE                 Location/Qualifiers
source                  1..25
                        mol_type = other RNA
                        organism = synthetic construct
SEQUENCE: 112
tcgttgccat gtgtatgtgg gcggc                                       25

SEQ ID NO: 113          moltype = RNA   length = 24
FEATURE                 Location/Qualifiers
source                  1..24
                        mol_type = other RNA
                        organism = synthetic construct
SEQUENCE: 113
ccgcccacat actttgttga tcct                                        24

SEQ ID NO: 114          moltype = RNA   length = 20
FEATURE                 Location/Qualifiers
source                  1..20
                        mol_type = other RNA
```

```
                                organism = synthetic construct
SEQUENCE: 114
gggatcaatc atggcaacga                                                       20

SEQ ID NO: 115          moltype = RNA   length = 27
FEATURE                 Location/Qualifiers
source                  1..27
                        mol_type = other RNA
                        organism = synthetic construct
SEQUENCE: 115
ttgccatgtg tatgtgggtt ccagcac                                               27

SEQ ID NO: 116          moltype = RNA   length = 18
FEATURE                 Location/Qualifiers
source                  1..18
                        mol_type = other RNA
                        organism = synthetic construct
SEQUENCE: 116
gtgctggaac tgactgcc                                                         18

SEQ ID NO: 117          moltype = RNA   length = 28
FEATURE                 Location/Qualifiers
source                  1..28
                        mol_type = other RNA
                        organism = synthetic construct
SEQUENCE: 117
gcagtcagcc cacatacttt gttgatcc                                              28

SEQ ID NO: 118          moltype = RNA   length = 16
FEATURE                 Location/Qualifiers
source                  1..16
                        mol_type = other RNA
                        organism = synthetic construct
SEQUENCE: 118
ggatcaatca tggcaa                                                           16

SEQ ID NO: 119          moltype = RNA   length = 18
FEATURE                 Location/Qualifiers
source                  1..18
                        mol_type = other RNA
                        organism = synthetic construct
SEQUENCE: 119
ttgccatgtg tatgtggg                                                         18

SEQ ID NO: 120          moltype = RNA   length = 20
FEATURE                 Location/Qualifiers
source                  1..20
                        mol_type = other RNA
                        organism = synthetic construct
SEQUENCE: 120
cccacatact tgttgattg                                                        20

SEQ ID NO: 121          moltype = RNA   length = 13
FEATURE                 Location/Qualifiers
source                  1..13
                        mol_type = other RNA
                        organism = synthetic construct
SEQUENCE: 121
caaatcatgg caa                                                              13

SEQ ID NO: 122          moltype = RNA   length = 16
FEATURE                 Location/Qualifiers
variation               7..10
                        note = n is a, c, g, or u
source                  1..16
                        mol_type = other RNA
                        organism = synthetic construct
SEQUENCE: 122
atgtgtnnnn gggttc                                                           16

SEQ ID NO: 123          moltype = RNA   length = 16
FEATURE                 Location/Qualifiers
variation               5..9
                        note = n is a, c, g, or u
source                  1..16
                        mol_type = other RNA
                        organism = synthetic construct
SEQUENCE: 123
agccnnnnna ctttgt                                                           16
```

```
SEQ ID NO: 124          moltype = RNA  length = 20
FEATURE                 Location/Qualifiers
source                  1..20
                        mol_type = other RNA
                        organism = synthetic construct
SEQUENCE: 124
cccacatact ttgttgatcc                                                   20

SEQ ID NO: 125          moltype = RNA  length = 36
FEATURE                 Location/Qualifiers
source                  1..36
                        mol_type = other RNA
                        organism = synthetic construct
SEQUENCE: 125
taggtaaagc cacctgcagg tgctaccgat gtaatt                                 36

SEQ ID NO: 126          moltype = RNA  length = 36
FEATURE                 Location/Qualifiers
source                  1..36
                        mol_type = other RNA
                        organism = synthetic construct
SEQUENCE: 126
aattacatcg gtagcacggg ctgtgcgagg ctgaac                                 36

SEQ ID NO: 127          moltype = RNA  length = 31
FEATURE                 Location/Qualifiers
source                  1..31
                        mol_type = other RNA
                        organism = synthetic construct
SEQUENCE: 127
gttcagcctc gcacagccag cacgcacctg a                                      31

SEQ ID NO: 128          moltype = RNA  length = 36
FEATURE                 Location/Qualifiers
source                  1..36
                        mol_type = other RNA
                        organism = synthetic construct
SEQUENCE: 128
tcaggtgcgt gctgggctgg caggtggctt taccta                                 36
```